United States Patent
Sindi et al.

(10) Patent No.: US 12,033,122 B2
(45) Date of Patent: Jul. 9, 2024

(54) SYSTEMS AND METHODS FOR CONFIGURING SERVERLESS AUTHORIZATION STREAM ACCESS (ASA) FOR VIRTUAL BANK ACCOUNT TRANSACTIONS

(71) Applicant: Lithic, Inc., New York, NY (US)

(72) Inventors: Kamil Sindi, New Canaan, CT (US); Jason William Kruse, Portland, OR (US); Jonathan Andrew Oei, Pacific Palisades, CA (US); Zhengyang Cong, New York, NY (US)

(73) Assignee: Lithic, Inc., New York, NY (US)

( * ) Notice: Subject to any disclaimer, the term of this patent is extended or adjusted under 35 U.S.C. 154(b) by 0 days.

(21) Appl. No.: 17/859,977

(22) Filed: Jul. 7, 2022

(65) Prior Publication Data

US 2024/0013177 A1    Jan. 11, 2024

(51) Int. Cl.
    *G06Q 20/10*    (2012.01)
    *G06Q 20/08*    (2012.01)
    *G06Q 20/40*    (2012.01)

(52) U.S. Cl.
    CPC ........ *G06Q 20/108* (2013.01); *G06Q 20/0855* (2013.01); *G06Q 20/401* (2013.01)

(58) Field of Classification Search
    CPC . G06Q 20/108; G06Q 20/0855; G06Q 20/401
    See application file for complete search history.

(56) References Cited

U.S. PATENT DOCUMENTS 6,029,890 A   2/2000  Austin
6,315,193 B1  11/2001 Hogan
(Continued)

FOREIGN PATENT DOCUMENTS

WO   WO 2014/080167 A1   5/2014
WO   WO 2014080167 A1    5/2014
(Continued)

OTHER PUBLICATIONS

U.S. Appl. No. 17/689,582, filed Mar. 8, 2022, Jason Kruse.
U.S. Appl. No. 17/689,599, filed Mar. 8, 2022, Jason Kruse.
U.S. Appl. No. 17/694,503, filed Mar. 14, 2022, Jason Kruse.
U.S. Appl. No. 17/859,943, filed Jul. 7, 2022, Jason Kruse.
(Continued)

*Primary Examiner* — Bennett M Sigmond
*Assistant Examiner* — Raven E Yono
(74) *Attorney, Agent, or Firm* — Baker Botts L.L.P.

(57) ABSTRACT

In one embodiment, a method includes receiving customized schema parameters associated with a request for a customized transaction schema associated with a payment processor from an external server associated with the payment processor by servers of a receiver processor platform, retrieving a pre-configured transaction schema comprising pre-configured schema parameters, generating the customized transaction schema associated with the payment processor by integrating the customized schema parameters into the pre-configured transaction schema, wherein the servers of the receiver processor platform are configured to generate transaction resource configurations based on the customized transaction schema, each transaction resource configuration being configured for processing transaction authorization requests to authorize respective transactions associated with a transfer of resources to a receiving entity from a user associated with the payment processor, and storing the customized transaction schema associated with the payment processor.

20 Claims, 16 Drawing Sheets

(56) References Cited

U.S. PATENT DOCUMENTS

| | | |
|---|---|---|
| 6,636,833 B1 | 10/2003 | Flitcroft |
| 6,793,131 B2 | 9/2004 | Hogan |
| 7,136,835 B1 | 11/2006 | Flitcroft |
| 7,359,880 B2 | 4/2008 | Abel |
| 7,379,919 B2 | 5/2008 | Hogan |
| 7,433,845 B1 | 10/2008 | Flitcroft |
| 7,567,934 B2 | 7/2009 | Flitcroft |
| 7,571,142 B1 | 8/2009 | Flitcroft |
| 7,593,896 B1 | 9/2009 | Flitcroft |
| 7,783,569 B2 | 8/2010 | Abel |
| 7,895,122 B2 | 2/2011 | Flitcroft |
| 8,229,854 B2 | 7/2012 | Kavanagh |
| 8,321,315 B2 | 11/2012 | Abel |
| 8,510,218 B2 | 8/2013 | Abel |
| 8,527,416 B2 | 9/2013 | Flitcroft |
| 8,548,926 B2 | 10/2013 | Balistierri |
| 8,639,623 B2 | 1/2014 | Kavanagh |
| 8,676,707 B2 | 3/2014 | Flitcroft |
| 8,751,381 B2 | 6/2014 | Musser |
| 8,756,150 B2 | 6/2014 | Flitcroft |
| 8,775,318 B2 | 7/2014 | Lee |
| 8,799,153 B2 | 8/2014 | White |
| 8,812,402 B2 | 8/2014 | Evans |
| 8,965,811 B2 | 2/2015 | Wankmueller |
| 10,614,454 B1 | 4/2020 | Brooks |
| 10,692,156 B2 | 6/2020 | Skala |
| 11,010,731 B1 | 5/2021 | McGinlay |
| 11,100,511 B1 | 8/2021 | Rule |
| 11,257,085 B1 | 2/2022 | Barkas |
| 11,405,189 B1 | 8/2022 | Bennison |
| 11,423,374 B2 | 8/2022 | Hardin |
| 11,423,400 B1 | 8/2022 | Hutchison |
| 11,546,345 B2 | 1/2023 | D'Agostino |
| 11,568,406 B2 | 1/2023 | Kruse |
| 11,699,154 B2 | 7/2023 | Kruse |
| 11,741,468 B2 | 8/2023 | Kruse |
| 11,741,469 B2 | 8/2023 | Kruse |
| 2003/0028481 A1 | 2/2003 | Flitcroft |
| 2005/0038721 A1 | 2/2005 | Goeckel |
| 2006/0124756 A1 | 6/2006 | Brown |
| 2006/0249574 A1 | 11/2006 | Brown |
| 2007/0156579 A1 | 7/2007 | Manesh |
| 2008/0120238 A1 | 5/2008 | Flitcroft |
| 2008/0177660 A1 | 7/2008 | Abel |
| 2008/0249926 A1 | 10/2008 | Sgaraglio |
| 2008/0288405 A1 | 11/2008 | John |
| 2009/0030747 A1 | 1/2009 | Smith |
| 2009/0119190 A1 | 5/2009 | Realini |
| 2010/0088237 A1 | 4/2010 | Wankmueller |
| 2011/0125642 A1 | 5/2011 | Kamal |
| 2012/0011063 A1 | 1/2012 | Killian |
| 2012/0215688 A1 | 8/2012 | Musser |
| 2013/0218769 A1 | 8/2013 | Pourfallah |
| 2013/0232035 A1 | 9/2013 | Stijen |
| 2013/0290121 A1* | 10/2013 | Simakov .............. G06Q 20/405 |
| | | 705/44 |
| 2013/0339167 A1 | 12/2013 | Taylor |
| 2013/0346302 A1 | 12/2013 | Purves |
| 2013/0346305 A1 | 12/2013 | Mendes |
| 2014/0074637 A1 | 3/2014 | Hammad |
| 2014/0108172 A1 | 4/2014 | Weber |
| 2014/0297533 A1 | 10/2014 | Mittal |
| 2014/0379562 A1 | 12/2014 | Olson |
| 2015/0012430 A1 | 1/2015 | Chisholm |
| 2015/0254672 A1 | 9/2015 | Huesch |
| 2016/0071069 A1 | 3/2016 | Skala |
| 2016/0071074 A1 | 3/2016 | Baird |
| 2016/0260169 A1 | 9/2016 | Arnold |
| 2017/0061531 A1 | 3/2017 | Smith |
| 2017/0070484 A1 | 3/2017 | Kruse |
| 2018/0075525 A1 | 3/2018 | Qin |
| 2018/0108008 A1 | 4/2018 | Chumbley |
| 2018/0121891 A1 | 5/2018 | Hosny |
| 2018/0121895 A1 | 5/2018 | Mohrlock |
| 2018/0124596 A1 | 5/2018 | Iannace |
| 2018/0174137 A1 | 6/2018 | Subbarayan |
| 2018/0253727 A1 | 9/2018 | Ortiz |
| 2018/0268461 A1 | 9/2018 | Hoag |
| 2018/0300730 A1 | 10/2018 | Telford-Reed |
| 2019/0065585 A1 | 2/2019 | Goenka |
| 2019/0068608 A1 | 2/2019 | Boland |
| 2019/0095989 A1 | 3/2019 | Archer |
| 2020/0005290 A1 | 1/2020 | Madisetti |
| 2020/0019964 A1 | 1/2020 | Miller |
| 2020/0058032 A1 | 2/2020 | Lad |
| 2020/0058068 A1 | 2/2020 | Gandhi |
| 2020/0112585 A1 | 4/2020 | Keohane |
| 2020/0193443 A1* | 6/2020 | Piel .................. G06N 20/00 |
| 2020/0211124 A1 | 7/2020 | Bhagat |
| 2020/0250694 A1 | 8/2020 | Mock |
| 2020/0267153 A1 | 8/2020 | Kang |
| 2020/0294106 A1* | 9/2020 | Seshan .................. G06N 20/00 |
| 2020/0311727 A1 | 10/2020 | Loomis |
| 2020/0349573 A1 | 11/2020 | Dong |
| 2021/0004801 A1* | 1/2021 | Barnum ............... G06Q 20/208 |
| 2021/0004880 A1 | 1/2021 | Benkreira |
| 2021/0012339 A1 | 1/2021 | Rafferty |
| 2021/0133741 A1 | 5/2021 | Spiegel |
| 2021/0201296 A1 | 7/2021 | Rule |
| 2021/0233070 A1 | 7/2021 | Malene |
| 2021/0304287 A1 | 9/2021 | Hoag |
| 2021/0326818 A1 | 10/2021 | Hogg |
| 2021/0344660 A1 | 11/2021 | Benkreira |
| 2021/0383378 A1 | 12/2021 | McCoy |
| 2022/0005022 A1* | 1/2022 | Tu ........................ G06Q 20/02 |
| 2022/0027871 A1 | 1/2022 | Farooq |
| 2022/0058617 A1 | 2/2022 | Tibrewala |
| 2022/0180357 A1 | 6/2022 | Chattopadhyay |
| 2022/0261795 A1* | 8/2022 | Perkins ............. G06Q 20/4014 |
| 2022/0261814 A1 | 8/2022 | Smith |
| 2022/0366411 A1* | 11/2022 | Bajwa .................. G06Q 20/229 |
| 2022/0405753 A1* | 12/2022 | Lee ........................ G06F 16/27 |

FOREIGN PATENT DOCUMENTS

| | | | |
|---|---|---|---|
| WO | WO 2014/184771 A1 | 11/2014 | |
| WO | WO 2014184771 A1 | 11/2014 | |
| WO | WO-2016050990 A1 * | 4/2016 | ............. H04L 63/08 |

OTHER PUBLICATIONS

U.S. Appl. No. 17/859,954, filed Jul. 7, 2022, Jason Kruse.
U.S. Appl. No. 17/859,990, filed Jul. 7, 2022, Jonathan Andrew Oei.
International Search Report and Written Opinion dated Dec. 13, 2016 for International Application No. PCT/US2016/051086, 14 pages.
Marcel J. Mampaey, "Secure Remittance Transaction to Bankless Consumers in a Fragmented Applications Market", Bell Labs Technical Journal, 16(2):219-234 (2011), downloaded on Aug. 27, 2022.
U.S. Appl. No. 17/948,988, filed Sep. 20, 2022, Boynton.
U.S. Appl. No. 17/949,012, filed Sep. 20, 2022, Han.

* cited by examiner

700

710 — Receive, from an external server, a transaction authorization request to authorize a transaction associated with a transfer of resources to a receiving entity from a user, wherein the transaction authorization request is received via an application programming interface (API), and wherein the transfer of resources comprises a payment to the receiving entity by the user 720 — Retrieve, from a virtual bank account (VBAN) database, a transaction resource configuration of a VBAN for transactions associated with the receiving entity and the user, wherein the transaction resource configuration is decoupled from an external resource account associated with the user and the VBAN, wherein the transaction resource configuration comprises a stored value balance associated with the VBAN, wherein the transaction resource configuration is configured to access a stored value balance of a quantity of available resources in the external resource account, wherein the external resource account is further associated with a financial interchange network or an automated clearing house, and wherein one or more additional VBANs are associated with the external resource account 730 — Determine whether one or more parameters of the transaction resource configuration are satisfied based on metadata associated with the transaction authorization request, wherein the one or more parameters of the transaction resource configuration comprise one or more of a type of payment, a type of currency, a type of transaction, an identifier associated with the receiving entity, an identifier associated with a plurality of receiving entities, a category of receiving entities, a geographic identifier associated with the receiving entity, a specified quantity of resources authorized for a single transaction, a specified total quantity of resources authorized for a plurality of transactions, or a specified number of authorized transactions being the number of transactions authorized for a specified period of time, wherein one or more of the parameters of the transaction resource configuration are specified by the user or a payment processor associated with the external resource account, and wherein one or more of the parameters of the transaction resource configuration are default parameters specified by a processing entity associated with the VBAN 740 — Transmit, to the external server, responsive to determining whether the one or more parameters of the transaction resource configuration are satisfied, a transaction authorization response indicating whether the transaction is authorized, wherein the transaction being authorized causes a stored value balance associated with the external resource account to be reduced based on the transfer of resources associated with the transaction 750 — Update, based on contextual data associated with one or more transactions associated with the VBAN, one or more of the parameters of the transaction resource configuration

*FIG. 7*

SYSTEMS AND METHODS FOR CONFIGURING SERVERLESS AUTHORIZATION STREAM ACCESS (ASA) FOR VIRTUAL BANK ACCOUNT TRANSACTIONS

TECHNICAL FIELD

This disclosure generally relates to databases and file management within network environments, and in particular, relates to hardware and software for securing and validating multi-server electronic communications within network environments.

BACKGROUND

Payment systems provided by banks and other financial institutions are used in lieu of tendering cash in domestic and international transactions. A payment system is any system used to transact, clear, and settle payment transactions through the transfer of currency (e.g., monetary currency, virtual currency, etc.). This includes the institutions, instruments, people, entities, services, rules, procedures, standards, and technologies that make its exchange possible. A common type of payment system is called an operational network, which links bank accounts and provides for monetary exchange using bank deposits. Some payment systems also include credit mechanisms, which are essentially agreements with financial entities to lend currency to borrowers to be repaid at a later point in time.

Traditional payment systems include negotiable instruments such as drafts (e.g., cheques) and documentary credits such as letters of credit. With the advent of computers and electronic communications, many alternative electronic payment systems have emerged. The term electronic payment refers to a payment made from one bank account to another using electronic methods, forgoing the need for bank employees to directly facilitate each transaction. In particular, the term electronic payment may refer to e-commerce, i.e., a payment for buying and selling goods or services offered through an electronic transfer of funds (e.g., through the Internet or other suitable computer network environments). In contrast to traditional payment systems, modern payment systems utilize electronic transactions based on debit cards, credit cards, electronic cards, electronic funds transfers, direct credits, direct debits, internet banking, and other forms of e-commerce payment systems.

Payment systems may be physical or electronic, and each payment system may have its own procedures and protocols. Standardization has allowed some of these systems and networks to grow to a global scale, but there are still many country-specific, platform-specific, entity-specific, and/or product-specific systems. Examples of payment systems that have become globally ubiquitous are credit cards and automated teller machine (ATM) networks. Other specific forms of payment systems are also used to settle financial transactions for products in the equity markets, bond markets, currency markets, futures markets, derivatives markets, and options markets. Additionally, various techniques exist to transfer funds between financial institutions. Domestically, this is accomplished using automated clearing house (ACH) and real-time gross settlement (RTGS) systems. Internationally, this is accomplished using the Society for Worldwide Interbank Financial Telecommunication (SWIFT) network.

SUMMARY OF PARTICULAR EMBODIMENTS

In particular embodiments, a receiver processor may automatically secure and validate multi-server electronic communications over a plurality of networks without requiring additional physical or programmatic infrastructure on the intermediary servers/entities. The receiver processor may communicate with different entities in a payment system, either directly or indirectly, to facilitate account/card generation and transaction payment processing. As an example and not by way of limitation, these entities may comprise an account holder such as an individual payer, a commerce entity such as a merchant, an enterprise client, a payment network, a receiver institution such as an issuing bank, an originator institution such as an acquiring bank, a receiver processor, an originator processor, a payment facilitator, other suitable entities, or any combination thereof. In particular embodiments, the receiver processor may utilize (and/or make available) application programming interface (API) resources, which may provide a predictable and programmatic interface to create and configure accounts/cards and facilitate electronic transactions associated with the accounts/cards. As an example and not by way of limitation, based on real-time payment data, the receiver processor may programmatically issue cards, configure card permissions, and set authorization parameters (e.g., spending limits, periodic limits, merchant locking, location matching, risk thresholds, etc.) all through an API generated by, implemented by, and/or provided by a receiver processor. As another example and not by way of limitation, during a transaction, the receiver processor may authenticate requests from individual payers or enterprise clients via the API, and return the authentication results to them via the API. As yet another example and not by way of limitation, during a transaction, the receiver processor may verify transaction requests from merchants, payment networks, acquirer processors, issuing banks, and/or acquiring banks via the API, and return the verification results to them via the API. Although this disclosure describes particular functions of particular issuer processors in a particular manner, this disclosure contemplates any suitable function of any suitable issuer processor in any suitable manner.

In particular embodiments, the receiver processor may provide a dynamic and customizable development platform for implementing solutions to decouple a user's root account, including credentials and stored value balances for the root account, from publicly routable account credentials. The user may be, for example, an individual payer, an enterprise client, or employees of an enterprise client. In particular embodiments, the receiver processor may decouple a user's root account from publicly routable account credentials with a virtual bank account (VBAN) having a Payment Account Number (PAN). Although this disclosure refers to VBAN throughout, this disclosure contemplates any suitable means of decoupling a user's root account from publicly routable account credentials. The receiver processor may allow VBANs to fully participate in financial interchange networks and clearing houses by sending and receiving payments or transactions. By utilizing permission-based VBANs customized for user-specific use cases, the receiver processor may facilitate real-time payments or transactions (as opposed to, e.g., simply caching funds) while protecting sensitive financial information, shielding users against fraud and overbilling, and ensuring that each approved transaction conforms to specific parameters applicable to that transaction. Although this disclosure describes implementing VBANs by particular processors in a particular manner, this disclosure contemplates implementing VBANs by any suitable processor in any suitable manner.

In particular embodiments, the receiver processor may receive, from an external server, a transaction authorization request to authorize a transaction associated with a transfer of resources to a receiving entity from a user. The receiver processor may then retrieve, from an associated database, a transaction resource configuration of a VBAN for transactions associated with the receiving entity and the user. In particular embodiments, the receiver processor may create a new VBAN and a transaction resource configuration for the newly created VBAN. In particular embodiments, the transaction resource configuration may be decoupled from an external resource account associated with the user and the VBAN. The receiver processor may then determine whether one or more parameters of the transaction resource configuration are satisfied based on metadata associated with the transaction authorization request. The receiver processor may further transmit, to the external server, responsive to determining whether one or more parameters of the transaction resource configuration are satisfied, a transaction authorization response indicating whether the transaction is authorized. In particular embodiments, the transaction being authorized may cause a stored value balance associated with the external resource account to be reduced based on the transfer of resources associated with the transaction.

Certain technical challenges exist for processing VBAN-based transaction authorization requests. One technical challenge may include effectively verifying metadata associated with a transaction to a virtual bank account. Solutions presented by the embodiments disclosed herein to address this challenge may utilize machine-learning models trained based on historical transaction data to verify metadata. The machine-learning models may be configured to characterize and evaluate whether transactions should be authorized. Another technical challenge may include effectively implementing risk/fraud controls. Solutions presented by the embodiments disclosed herein to address this challenge may utilize a transaction risk model trained based on patterns identified in metadata of previous fraudulent transactions, in which the identified patterns may be correlated with high-risk usage or fraudulent transactions or attempted transactions.

Certain embodiments disclosed herein may provide one or more technical advantages. A technical advantage of the embodiments disclosed herein may include protecting sensitive financial information using VBANs based on the concept of decoupling stored value balances from publicly routable account credentials. Another technical advantage of the embodiments may include the receiver processor implementing risk/fraud controls to shield users against fraud by using a transaction risk model to identify fraudulent transactions that otherwise satisfy parameters of a VBAN. Another technical advantage of the embodiments disclosed herein may include ensuring that each approved transaction conforms to specific parameters applicable to that transaction. The receiver processor may verify transaction metadata by processing the metadata associated with the transaction authorization request against parameters associated with the VBAN. Certain embodiments disclosed herein may provide none, some, or all of the above technical advantages. One or more other technical advantages may be readily apparent to one skilled in the art in view of the figures, descriptions, and claims of the present disclosure.

In particular embodiments, the receiver processor may prompt a user associated with a transaction authorization request (e.g., a request for a payment transaction) to authorize the transaction authorization request responsive to a verification failure of the transaction authorization request. For example, the verification failure may be based on one or more authorization parameters of a transaction resource configuration for a VBAN. The verification failure may be determined based on an analysis of the metadata associated with the transaction authorization request. Correspondingly, the receiver processor may send a real-time prompt (e.g., a text, a voice message, an automatic phone call, an email, etc.) to the user to authorize the transaction authorization request. In this way, the receiver processor may prevent authentic and legitimate transaction requests from being rejected, while still enabling users to benefit from the protections and efficiencies provided by the VBANs. Although this disclosure describes providing particular authorizations for particular verification failures in a particular manner, this disclosure contemplates providing any suitable authorizations for any suitable verification failures in any suitable manner.

In particular embodiments, the receiver processor may receive, from an external server, a transaction authorization request to authorize a transaction associated with a transfer of resources to a receiving entity from a user. The receiver processor may then retrieve, from an associated database, a transaction resource configuration of a VBAN associated with the receiving entity and the user. In particular embodiments, the receiver processor may create a new VBAN and a transaction resource configuration for the newly created VBAN. In particular embodiments, the transaction resource configuration may be decoupled from an external resource account associated with the user and the VBAN. The receiver processor may determine that one or more parameters of the transaction resource configuration are not satisfied based on metadata associated with the transaction authorization request. The receiver processor may further transmit, to a client device associated with the user, instructions for presenting a notification indicating a transaction authorization failure. In particular embodiments, the notification may comprise an interactive prompt operable for receiving an input indicating whether the transaction authorization request should be authorized. The receiver processor may transmit, to the external server, responsive to receiving the input from the client device associated with the user, a transaction authorization response indicating whether the transaction is authorized. In particular embodiments, the transaction being authorized may cause a stored value balance associated with the external resource account to be reduced based on the transfer of resources associated with the transaction.

Certain technical challenges exist for dynamic authorization for verification failures related to transactions with virtual bank accounts. One technical challenge may include customizing the interactive prompt for receiving a user's input indicating whether the transaction authorization request should be authorized. Solutions presented by the embodiments disclosed herein to address this challenge may include customizing the interactive prompt based on prior user inputs to prior dynamic authorization prompts, metadata associated with the current transaction authorization request, and metadata associated with historical transactions, each of which may reflect the user's preferences and the user's behavior patterns.

Certain embodiments disclosed herein may provide one or more technical advantages. A technical advantage of the embodiments may include preventing authentic and legitimate transaction requests from being rejected while still enabling users to benefit from the protections and efficiencies provided by the VBANs. Certain embodiments disclosed herein may provide none, some, or all of the above technical advantages. One or more other technical advantages may be readily apparent to one skilled in the art in view of the figures, descriptions, and claims of the present disclosure.

In particular embodiments, the receiver processor may enable users (e.g., enterprise clients associated with account processors) to configure customized transaction authorization schema within the system of the receiver processor via an assisted code deployment schema. Users may deploy code snippets with desired parameters, which may then be integrated and collocated within the working environment of the receiver processor for handling authorization stream access (ASA). By doing so, users may quickly launch authorization systems that utilize the ASA transaction schema and backend infrastructure provided by the receiver processor to avoid undesirable latency experiences over public networks, ensure compliance with payment card industry (PCI) security standards, and eliminate the need to build out authorization schema from the ground up. In particular embodiments, users may have their customized transaction schema implemented without using their own servers. However, in particular embodiments, users may have the ability to utilize their own servers for handling particular aspects of transaction authorizations. Although this disclosure describes customizing particular authorization schemas by particular processors in a particular manner, this disclosure contemplates customizing any suitable authorization schema by any suitable processor in any suitable manner.

In particular embodiments, the receiver processor may receive, from an external server associated with a payment processor, one or more customized schema parameters associated with a request for a customized transaction schema associated with the payment processor. The receiver processor may then retrieve, from a database associated with the receiver processor platform, a pre-configured transaction schema comprising a plurality of pre-configured schema parameters. The receiver processor may further generate the customized transaction schema associated with the payment processor by integrating the customized schema parameters into the pre-configured transaction schema. In particular embodiments, the one or more servers associated with the receiver processor platform may be configured to generate, based on the customized transaction schema, one or more transaction resource configurations. Each transaction resource configuration may be configured for processing one or more transaction authorization requests to authorize one or more respective transactions associated with a transfer of resources to a receiving entity from a user associated with the payment processor. In particular embodiments, the receiver processor may store, in the database associated with the receiver processor platform, the customized transaction schema associated with the payment processor.

Certain technical challenges exist for serverless authorization stream access. One technical challenge may include enabling users to effectively execute operations associated with the customized transaction schema and deploy more sophisticated authorization schema. Solutions presented by the embodiments disclosed herein to address this challenge may include providing tools or libraries generated by the receiver processor platform that can be easily accessed via the API generated by, implemented by, and/or provided by a receiver processor as these tools or libraries may be readily configured for various operations and functions.

Certain embodiments disclosed herein may provide one or more technical advantages. A technical advantage of the embodiments may include avoiding undesirable latency experiences over public networks and ensuring compliance with payment card industry (PCI) security standards by enabling users to utilize backend infrastructure provided by the receiver processor for transaction authorizations. Another technical advantage of the embodiments may include eliminating the need to build out authorization schema from the ground up by enabling users to utilize the authorization stream access schema and backend infrastructure provided by the receiver processor to deploy customized transaction schema. Certain embodiments disclosed herein may provide none, some, or all of the above technical advantages. One or more other technical advantages may be readily apparent to one skilled in the art in view of the figures, descriptions, and claims of the present disclosure.

In particular embodiments, the receiver processor may reconcile data from multiple sources. A primary source may be live data (e.g., real-time transaction data) being streamed in real-time, and a secondary source may be historical data (e.g., historical transaction data) aggregated and presented in bulk at a future time. In particular embodiments, the secondary source may serve as a form of ground-truth, taking precedence over the primary source in cases of poor congruence and incompleteness. In particular embodiments, the secondary source may not be sufficient to be solely relied upon when conducting business (e.g., processing transactions), particularly for decisions which may need to be made using real-time data (e.g., the primary source) that is immediately available. In particular embodiments, when the two data sources are incomplete and/or have poor congruence, reconciliation may be utilized to identify any improper, incomplete, or missing entries in either of the two data sources, and may remediate one or more of the identified entries. In particular embodiments, the receiver processor may determine incongruent data entries across the two sources, which may be, for example, business decisions that result from an originally improper entry from the primary source, and determine remediations that are necessary as a result of a final proper entry from the secondary source. The receiver processor may further substantiate the original entry from the primary source with more complete information that may be only available via the secondary source. In particular embodiments, the reconciliation logic to identify and remediate entries may require particular accuracy and/or efficiency for its utility to be realized. For example, incorrect reconciliation may potentially result in false positive remediations and downstream repercussions. As a result, the receiver processor may implement robust reconciliation logic for reconciling data from multiple sources. Although this disclosure describes reconciling particular data sources by particular processors in a particular manner, this disclosure contemplates reconciling any suitable data source by any suitable processor in any suitable manner.

In particular embodiments, the receiver processor may store, in a payment transaction database associated with the receiver processor, a set of first transaction entries comprising real-time transaction data. Each first transaction entry may be associated with one of a plurality of privacy payment transactions for a specified time period. Each privacy payment transaction may be associated with a transfer of funds to a receiving entity, via a privacy payment account of a user, from a funding account of the user that is decoupled from the privacy payment account. In particular embodiments, the receiver processor may then receive, from an external server, one or more network reporting files comprising historical transaction data associated with one or more of the plurality of privacy payment transactions for the specified time period. The receiver processor may identify, from the set of first transaction entries and a set of second transaction entries derived from the historical transaction data, one or more identical pairs of a first transaction entry and a second transaction entry. In particular embodiments, for each identical pair, the first transaction entry and second transaction entry may be excluded from a remaining set of first transaction entries and a remaining set of second transaction entries, respectively. The receiver processor may then identify, for each of one or more matching cycles, from the remaining set of first transaction entries and the remaining set of second transaction entries, one or more matching pairs of a first transaction entry and a second transaction entry. In particular embodiments, each matching pair may be identified based on a determination that a confidence metric for the matching pair is greater than a confidence threshold associated with the matching cycle. For each matching pair, the first transaction entry and second transaction entry may be excluded from the remaining set of first transaction entries and the remaining set of second transaction entries, respectively. In particular embodiments, the receiver processor may further analyze, subsequent to the one or more matching cycles, the remaining set of first transaction entries and the remaining set of second transaction entries to identify a set of incongruous transaction entries and determine one or more remediations for one or more of the incongruous transaction entries.

Certain technical challenges exist for reconciling financial records. One technical challenge may include identifying matching pairs between the real-time transaction data and the historical transaction data. Solutions presented by the embodiments disclosed herein to address this challenge may include identifying, for each of one or more privacy payment transactions, a matching pair based on transaction criteria associated with one or more of the privacy payment transaction, the user, the receiving entity, the privacy payment account, or a transaction network associated with the external server such that the transaction criteria provide a reliable measurement for evaluating the correspondence between the entries of the matching pair.

Certain embodiments disclosed herein may provide one or more technical advantages. A technical advantage of the embodiments may include utilizing the reconciliation logic to effectively identify and remediate improper, incomplete, or missing entries in either of the data sources corresponding to the real-time transaction data and historical transaction data. Certain embodiments disclosed herein may provide none, some, or all of the above technical advantages. One or more other technical advantages may be readily apparent to one skilled in the art in view of the figures, descriptions, and claims of the present disclosure.

The embodiments disclosed herein are only examples, and the scope of this disclosure is not limited to them. Particular embodiments may include all, some, or none of the components, elements, features, functions, operations, or steps of the embodiments disclosed herein. Embodiments according to the invention are in particular disclosed in the attached claims directed to a method, a storage medium, a system and a computer program product, wherein any feature mentioned in one claim category, e.g. method, can be claimed in another claim category, e.g. system, as well. The dependencies or references back in the attached claims are chosen for formal reasons only. However, any subject matter resulting from a deliberate reference back to any previous claims (in particular multiple dependencies) can be claimed as well, so that any combination of claims and the features thereof are disclosed and can be claimed regardless of the dependencies chosen in the attached claims. The subject-matter which can be claimed comprises not only the combinations of features as set out in the attached claims but also any other combination of features in the claims, wherein each feature mentioned in the claims can be combined with any other feature or combination of other features in the claims. Furthermore, any of the embodiments and features described or depicted herein can be claimed in a separate claim and/or in any combination with any embodiment or feature described or depicted herein or with any of the features of the attached claims.

BRIEF DESCRIPTION OF THE DRAWINGS

FIG. 7 illustrates an example method for processing VBAN-based transaction authorization requests.

DESCRIPTION OF EXAMPLE EMBODIMENTS

System Overview

Figure 1:
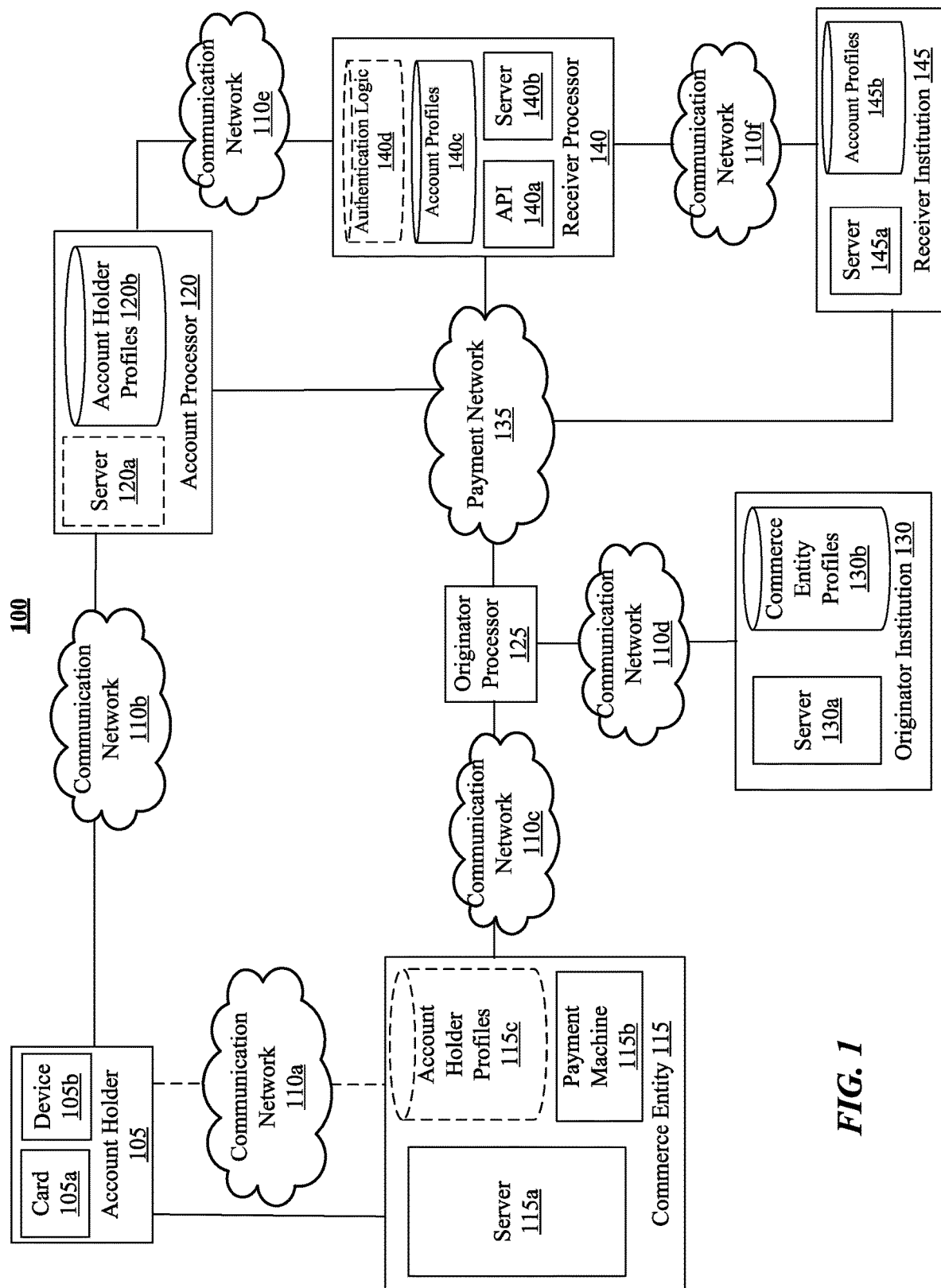
FIG. 1 illustrates an example payment system.

FIG. 1 illustrates an example payment system 100. The payment system 100 includes an account holder 105 (e.g., a payer), a commerce entity 115 (e.g., a merchant), an account processor 120, an originator processor 125, an originator institution 130 (e.g., a financial institution such as an acquiring bank), a receiver processor 140, and a receiver institution 145 (e.g., a financial institution such as an issuing bank), which may be interconnected to another through various networks, including communication networks 110 (e.g., the Internet and/or the like) and a payment network 135 (e.g., credit network, debit network, ATM network, and/or the like). As an example and not by way of limitation, and as illustrated in the example payment system 100, the account holder 105 and the commerce entity 115 may be connected by the communication network 110a; the account holder 105 and the account processor 120 may be connected by the communication network 110b; the commerce entity 115 and the originator processor 125 may be connected by the communication network 110c; the originator processor 125 and the originator institution 130 may be connected by the communication network 110d; the account processor 120 and the receiver processor 140 may be connected by the communication network 110*e*; and the receiver processor 140 and the receiver institution 145 may be connected by the communication network 110*f*. Although FIG. 1 illustrates a particular arrangement of an account holder 105, communication networks 110, a commerce entity 115, an account processor 120, an originator processor 125, an originator institution 130, a payment network 135, a receiver processor 140, and a receiver institution 145, this disclosure contemplates any suitable arrangement of an account holder 105, communication networks 110, a commerce entity 115, an account processor 120, an originator processor 125, an originator institution 130, a payment network 135, a receiver processor 140, and a receiver institution 145. As an example and not by way of limitation, two or more of an account holder 105, a commerce entity 115, and an account processor 120 may be connected to or communicate with each other directly, bypassing the communication network 110. As another example, two or more of an account processor 120 and a receiver processor 140 may be physically or logically co-located with each other in whole or in part. As yet another example, two or more of a receiver processor 140 and a receiver institution 145 may be physically or logically co-located with each other in whole or in part. As yet another example, two or more of an originator institution 130 and a receiver institution 145 may be physically or logically co-located with each other in whole or in part. As yet another example, two or more of an originator processor 125 and an originator institution 130 may be physically or logically co-located with each other in whole or in part. As yet another example, two or more of a payment network 135 and a receiver institution 145 may be physically or logically co-located with each other in whole or in part. Moreover, although FIG. 1 illustrates a particular number of an account holder 105, communication networks 110, a commerce entity 115, an account processor 120, an originator processor 125, an originator institution 130, a payment network 135, a receiver processor 140, and a receiver institution 145, this disclosure contemplates any suitable number of an account holder 105, communication networks, a commerce entity 115, an account processor 120, an originator processor 125, an originator institution 130, a payment network 135, a receiver processor 140, and a receiver institution 145. As an example and not by way of limitation, the payment system 100 may include multiple account holders 105, commerce entities 115, account processors 120, originator processors 125, originator institutions 130, payment networks 135, receiver processors 140, and receiver institutions 145.

This disclosure contemplates any suitable communication network 110 or payment network 135. As an example and not by way of limitation, one or more portions of a communication network 110 or payment network 135 may include an ad hoc network, an intranet, an extranet, a virtual private network (VPN), a local area network (LAN), a wireless LAN (WLAN), a wide area network (WAN), a wireless WAN (WWAN), a metropolitan area network (MAN), a portion of the Internet, a portion of the Public Switched Telephone Network (PSTN), a cellular telephone network, or a combination of two or more of these. A communication network 110 may include one or more communication networks 110 and a payment network 135 may include one or more payment networks 135.

In particular embodiments, an account holder 105 may initialize a payment to a commerce entity 115 at the commerce entity's 115 location for purchasing merchandise or services from the commerce entity 115. The payment may be an electronic payment with or without a card 105*a*. The account holder 105 may use a device 105*b* (e.g., personal computing device such as a smartphone) for such payment. As an example and not by way of limitation, the account holder 105 may use the account holder's device 105*b* to initialize the payment via a digital payment platform without having a card 105*a*. The payment may also be a card payment using a card 105*a*. In particular embodiments, the card 105*a* may be either a credit card or a debit card for the payment. The card 105*a* may be issued by the receiver processor 140 or the receiver institution 145. As an example and not by way of limitation, the card 105*a* may be a physical piece of plastic with a magnetic stripe at the top and/or a chip. As another example, the card 105*a* may be tokenized so that it is a card stored in a smartphone's digital wallet and then used to tap and pay. In alternative embodiments, the account holder 105 may initialize the payment via the communication network 110*a*, which may be part of an online transaction. The account holder 105 may use the account holder's device 105*b* for the online transaction. In particular embodiments, the device 105*b* may be any computing device comprising networking interface circuitry, such as a network interface card (NIC) or similar component, and a processor capable of accessing data over the communication network 110*a*. Non-limiting examples of the device 105*b* may include a workstation computer, a desktop computer, a laptop computer, a notebook computer, a netbook, a tablet, a smartphone, a server, a personal digital assistant (PDA), a handheld electronic device, a cellular telephone, a smartphone, a virtual reality (VR) headset, an augmented reality (AR) smart glasses, other suitable electronic device, or any suitable combination thereof.

In particular embodiments, the commerce entity 115 may comprise a server 115*a* and a payment machine 115*b*, and optionally account holder profiles 115*c*. The payment machine 115*b* may read the card that is used for payment. As an example and not by way of limitation, the payment machine 115*b* may be a card reader, a card terminal, a payment terminal, or a point-of-sale (POS) terminal. In particular embodiments, the account holder 105 may use the card 105*a* to interact with the payment machine 115*b*, e.g., by swiping the card 105*a* through the payment machine 115*b*, inserting the card 105*a* into the payment machine 115*b*, tapping the card 105*a* on the payment machine 115*b*, or tapping the payment machine 115*b* with a smartphone having a virtual card in its digital wallet. For online transactions, the payment machine 115*b* may be considered as a payment gateway, which may be not a physical machine but rather handled via software. For online transactions, the card 105*a* used for payment may be a virtual card that is just the card number shown in a software application.

In particular embodiments, the originator institution 130 may provide the payment machine 115*b* to the commerce entity 115. The originator institution 130 may go out and acquire commerce entities 115 and provide them the tools and facilities to accept and process card-based payments. The originator institution 130 may comprise a server 130*a* and commerce entity profiles 130*b*. The originator institution 130 may utilize a technology provider, e.g., the originator processor 125, that can connect with the payment network 135 to handle transactions from various channels such as credit cards and debit cards for the originator institution 130. In particular embodiments, the originator processor 125 may process the transactions from the commerce entity 115, through the originator institution 130 and then the payment network 135 (or an alternative payment method such as a digital payment platform) to ensure the receiver institution 145 that the commerce entity's 115 transactions with the account holder 105 are authorized and may be settled. In particular embodiments, the originator processor 125 may utilize hardware (e.g., network interface components at a data center) and a fast direct network connection to the payment network 135 to request approval of a payment. In particular embodiments, the originator institution 130 may build this technology in-house (e.g., via its server 130*a*) or may rely on a third-party originator processor 125 to handle this functionality.

In particular embodiments, one or more of the account holder 105, the account holder's card 105*a*, or the account holder's device 105*b* may be associated with a corporation (e.g., a company) that is an enterprise client or partner of the receiver institution 145 and/or the receiver processor 140. As an example and not by way of limitation, the account holder 105 may be an employee of the corporation. As another example and not by way of limitation, the account holder 105 may be a contractor of the corporation. The corporation may be associated with the account processor 120. In particular embodiments, the account processor 120 may comprise account holder profiles 120*b*. The account processor 120 may optionally comprise an account processor server 120*a*. In particular embodiments, the account holder 105 may use the account holder's device 105*b* to communicate with the account processor 120. As an example and not by way of limitation, the account holder 105 may send a request for account generation, card generation, funding, payment approval, etc. to the account processor 120. As another example and not by way of limitation, the account holder 105 may notify the account processor 120 of a potential payment. As yet another example and not by way of limitation, the account processor 120 or the account holder's device 105*b* may detect that the account holder 105 is physically at the commerce entity's 115 location (e.g., based on GPS signal from the personal computing device associated with the account holder 105), and upon such detection, the account processor 120 may initialize account/card generation or transaction verification.

In particular embodiments, the card 105*a* used for payment may be issued by the receiver institution 145. The receiver institution's 145 function may be to underwrite an individual person (e.g., the account holder 105) or an enterprise client or partner (e.g., a corporation) by providing them with a bank account, a debit card, and may optionally grant them access to credit facilities and a credit card. In particular embodiments, the receiver institution 145 may utilize a technology provider (i.e., the receiver processor 140) to connect with the payment network 135. In particular embodiments, the receiver processor 140 may utilize hardware (e.g., network interface components at a data center) and a fast direct network connection to the payment network 135 to approve or decline a payment. The receiver institution 145 may build this technology in-house (e.g., by providing APIs that can be called by the account processor 120 or payment network 135) or may rely on a third-party receiver processor 140 to handle this functionality.

In particular embodiments, the receiver institution 145 may comprise a server 145*a* that may accept requests for account/card creation from the receiver processor 140, and then generate the card/account according to the information provided from the receiver processor server 140*b*. It should be noted that, in some embodiments, the receiver institution 145 may issue what appears to be a full-service credit card or debit card, with no limitations on its use. Functionally, the limitations on use of the new card may be imposed by operation of the receiver processor 140. That is, when the receiver institution server 145*a* receives, from the payment network 135, a request to verify a transaction, the receiver institution server 145*a* may query the receiver processor server 140*b*; and the receiver processor 140 may verify only those transactions where the commerce-entity tag associated with the card/account in the receiver processor account profiles 140*c* (e.g., including payer and/or client profiles) matches the commerce entity 115 identified in the current transaction data. The receiver processor 140 may optionally check parameters associated with the card/account and/or compare other data associated with the transaction, as discussed in greater detail herein. In particular embodiments, the receiver institution 145 may also comprise account profiles 145*b*. In particular embodiments, the receiver institution 145 may be a distinct entity from the receiver processor 140. In alternative embodiments, the receiver processor 140 functionality may be implemented by the receiver institution 145. In alternative embodiments, the receiver processor 140 may be registered to operate as a receiver institution 145. In alternative embodiments, the receiver processor 140 may maintain a contractual relationship with a financial institution, whereby the receiver processor 140 may function in some respects as a receiver institution 145.

In particular embodiments, the receiver processor 140 may comprise an application programming interface (API) 140*a*, a server 140*b*, account profiles 140*c* (e.g., including payer and/or client profiles), and optionally authentication logic 140*d*. The account profiles 140*c* may comprise profiles of individual and enterprise clients. The API 140*a* may provide a programmatic interface to create and configure accounts/cards. In particular embodiments, the account processor 120 may call the API 140*a* to request the receiver processor 140 to provide various account/card/transaction services and the receiver processor 140 may return the relevant results to the account processor 120 via the API 140*a*. As an example and not by way of limitation, the account processor 120 may get real-time payment data, programmatically request issuance of new cards, configure card permissions, and set spending limits through API 140*a*. In particular embodiments, the receiver processor 140 may verify requests from the account processor 120 via the API 140*a*. The requests may be verified with an API key (e.g., cryptographic public/private keys). The receiver processor 140 may return errors via the API 140*a*, which may be used by the account processor 120 to diagnose failed transactions and improve its exception-handling capabilities. As an example and not by way of limitation, an error returned via API 140*a* may be that [query] is not a valid parameter, indicating that a query parameter in the request does not match the valid queries for the endpoint. As another example, an error returned via API 140*a* may be that an account holder 105 has not been authenticated, indicating an invalid or missing API key. As yet another example, an error returned via API 140*a* may be that the API key is not active, indicating that the API key used is no longer active. As yet another example, an error returned via API 140*a* may be that the receiver processor 140 could not identify the API key, indicating the API key provided is not associated with any account processor 120. As yet another example, an error returned via API 140*a* may be requiring an API key in authorization header, indicating the authorization header is not in the request. As yet another example, an error returned via API 140*a* may be that authorization header is not formatted properly. As yet another example, an error returned via API 140*a* may be insufficient privileges or issuing API key required, indicating write access requires an issuing API key. As yet another example, an error returned via API 140*a* may be insufficient privileges to create unlocked cards, indicating creating unlocked cards requires an additional privilege. As yet another example, an error returned via API 140*a* may be authorization failed (in simulation), indicating an authorization fails when simulating an authorization. As yet another example, an error returned via API 140*a* may be rate limited with too many requests per second, indicating an account processor 120 has exceeded their per second rate limit. As yet another example, an error returned via API 140*a* may be rate limited with daily limit reached, indicating an account processor 120 has exceeded their daily rate limit. As yet another example, an error returned via API 140*a* may be rate limited with too many keys tried, indicating one IP has queried too many different API keys. As yet another example, an error returned via API 140*a* may be an internal server error, indicating there was a processing error on the server-side.

In particular embodiments, a single API key may manage a portfolio of end-users (i.e., accounts), each with its own funding sources, cards, and transactions. End-users may be onboarded through the enrollment endpoint, which runs the candidate enrollment through a customer identification program and returns an account token if successful. After the first end-user is enrolled in the production environment, all subsequent API calls should include a uniform resource identifier (URI) parameter indicating which end-user this API request is on behalf of. The reason for this behavior change is because, upon initial provisioning, the API key may map one-to-one to a root account specifically associated with the account processor 120. After requesting enrollment, the API key mapping may become one-to-many, so the API 140*a* may require an account-token parameter and/or a URI parameter to indicate which individual account, within the portfolio of accounts, to perform an action on behalf of. If one or more end-users have been enrolled and no account-token argument is supplied, the API 140*a* may assume the root account.

In particular embodiments, different parties (e.g., a financial institution such as a bank, an account holder 105, the receiver processor 140, etc.) may set rules on accounts created by the receiver processor 140 via the API 140*a*. As an example and not by way of limitation, the receiver institution 145 may set account specific transaction limits. As another example and not by way of limitation, a payer, as an account holder 105, may set up parental controls if a minor of the account holder 105 also has access to the account. As yet another example and not by way of limitation, the originator processor 125 or originator institution 130 may set rules to protect the commerce entity 115.

In particular embodiments, the account processor 120 may set rules on accounts to control spending via the API 140*a*. The account configuration schema may comprise the account token, the account state, and one or more parameters for the account (e.g., a spending limit/frequency). The account token may be a globally unique identifier for the account. The account states may include an active, paused, closed, locked, restricted, banned/suspended, and/or flagged state. Spending limit parameters for an account may comprise limitations on an individual transaction or a plurality of transactions. As an example and not by way of limitation, a single transaction may be limited to a maximum permitted payment value. As another example and not by way of limitation, a set of multiple transactions may be limited based on the volume or frequency of transactions (e.g., maximum number of transactions within a day or week). As yet another example, a set of multiple transactions may be limited based on combined transaction values (e.g., maximum total spending permitted daily, monthly, and/or over the lifetime of the account). Any charges to a card associated with this account may be declined (or alternatively paused/held or flagged for additional authorization) once their transaction volume and/or total value has surpassed the limit in the applicable time period, which may be on a rolling basis. A lifetime spending limit value of 0 or null in the account configuration may indicate that the lifetime spending limit feature is disabled such that there is no lifetime spending limit for that account. In particular embodiments, the account processor 120 may access account spending limits for one or more specified accounts via the API 140*a*. This endpoint may only be used on individual accounts within the portfolio of accounts associated with the root account that the calling API key manages. If an account token is specified, this endpoint may return an account-configuration object representing the account specified. If an account token is not specified, a list of account-configurations (e.g., account state and account parameters) for the individual accounts in the portfolio of accounts associated with the root account may be returned. If querying for a single account, the account processor 120 may not include pagination queries as there is only one account. In particular embodiments, the account processor 120 may set spending limits for a specified account (e.g., a root account), which may be applied to the accounts in the portfolio of accounts associated with the specified account that are managed by this API key. As an example and not by way of limitation, the account processor 120 may set a new amount for an account's daily spending limit, monthly spending limit, and lifetime spending limit. When one of these limits is reached, no transactions may be accepted on any card created for this account for the corresponding period unless the spending limit is updated. In particular embodiments, the account processor 120 may set the account state for a specified account via the API 140*a*, which may be applied to the accounts in the portfolio of accounts associated with the specified account that are managed by this API key. Accounts that are set as being in the paused account state may not be able to transact or create new cards.

In particular embodiments, the account processor 120 may enroll end-users (e.g., account holder 105) via the API 140*a*. The account processor 120 may enroll a new individual account into the root account managed by the API key. This endpoint may run the candidate enrollment through the customer identification program (CIP) and return an account token if successful. As an example and not by way of limitation, the request for enrollment may comprise one or more of date of birth (as an ISO 8601 date), email (if utilizing the receiver processor 140 for chargeback processing, this email address may be used to communicate dispute status and resolution), account holder's 105 first name, an ISO 8601 timestamp at which precomputed KYC (know-your-customer) was completed, a KYC-type specifying the KYC workflow to run on the account holder 105 for which the individual account is being created, account holder's 105 last name, account holder's 105 phone number which may improve the chances of a positive identity match and successful API response, social security number which may be required for identity verification and compliance with US banking regulations, valid address, an ISO 8601 timestamp at which the terms of service of the receiver processor 140 were accepted by account holder 105, or postal code. When a KYC evaluation fails, one or more of the failure reasons in Table 1 (below) may be returned in the API response.

TABLE 1

Example failure reasons for KYC evaluations.

| | |
|---|---|
| ADDRESS_VERIFICATION_FAILURE | The address provided could not be matched. |
| AGE_THRESHOLD_FAILURE | The user did not fall within an acceptable age range. |
| BANKRUPTCY_RELATED_FAILURE | The user has a bankruptcy on record. |
| BLOCKLIST_ALERT_FAILURE | The user appeared on one or more blocklists. |
| COMPLETE_VERIFICATION_FAILURE | The user could not be matched to a person in any data source. |
| DATA_STRENGTH_FAILURE | The user's public record has insufficient information that can be used for verification. |
| DOB_VERIFICATION_FAILURE | The date of birth provided could not be matched. |
| EMAIL_VERIFICATION_FAILURE | The email provided is not valid or is improperly formatted. |
| MULTIPLE_RECORDS_FAILURE | The user has several valid records with conflicting information. |
| NAME_VERIFICATION_FAILURE | The name provided could not be matched. |
| PHONE_VERIFICATION_FAILURE | The phone number provided could not be matched. |
| RISK_THRESHOLD_FAILURE | The user was flagged for high risk of fraud. |
| SSN_VERIFICATION_FAILURE | The social security number provided could not be matched. |
| OTHER_VERIFICATION_FAILURE | The user was rejected for a reason other than one specified above. |

In particular embodiments, the account processor 120 may use KYC to onboard and verify its customers. Building out KYC for products associated with the account processor 120 may be a substantial build that include third-party vendor selection and contract negotiation. In particular embodiments, through the API 140a, the account processor 120 may perform basic KYC, advanced KYC, and bring your own (BYO) KYC. Basic KYC may include identity verification for an individual, with a simple accepted or rejected decision. An example workflow for basic KYC may be as follows. The account processor 120 may submit, via the API 140a, required information identifying account holder 105, for which the receiver processor 140 may return, via the API 140a, an accepted or rejected status for the account holder 105. Advanced KYC may include identity verification for an individual, with a remediation path if the initially submitted information was not successfully verified (not all cases may be eligible). An example workflow for advanced KYC may be as follows. The account processor 120 may submit, via the API 140a, required information identifying account holder 105, for which the receiver processor 140 may return, via the API 140a, an accepted, rejected, pending resubmit, or pending document status for the account holder 105. If the status is pending resubmit, the account processor 120 may submit, via the API 140a, revised information, for which the receiver processor 140 may return, via the API 140a, an accepted, rejected, pending resubmit, or pending document status. If the status is "pending document", the account processor 120 may identify document type to be submitted, for which the receiver processor 140 may return URLs to which documents may be submitted. Once the account processor 120 submits documents with provided URLs, the API 140a may send a webhook to the account processor 120 once accepted or rejected status is available. BYO KYC may include an account creation process where the account processor 120 may bypass KYC enabled by the receiver processor 140 via the API 140a. The following is an example workflow for BYO KYC. The account processor 120 may submit, via the API 140a, required information with its own KYC workflow identifying account holder 105, for which the receiver processor 140 may return, via the API 140a, an accepted status for the account holder 105.

In particular embodiments, besides KYC, the account processor 120 may use know your business (KYB) to get to market faster by reducing the number of partners needed to launch a card program. The account processor 120 may perform basic KYB and BYO KYB. In particular embodiments, basic KYB may include identity verification for a business, with a simple accepted or rejected decision. An example workflow for basic KYB may be as follows. The account processor 120 may submit, via the API 140a, required information identifying account holder 105, for which the receiver processor 140 may return, via the API 140a, a pending status for the account. The API 140a may then send a webhook to the account processor 120 once accepted or rejected status is available. In particular embodiments, BYO KYB may include an account creation process where the account processor 120 may bypass KYB enabled by the receiver processor 140 via the API 140a. The following is an example workflow for BYO KYB. The account processor 120 may submit, via the API 140a, required information with its own KYB workflow identifying account holder 105, for which the receiver processor 140 may return, via the API 140a, an accepted status for the account holder 105.

In particular embodiments, the account processor 120 may create, update, manage, and reissue cards (both virtual cards and physical cards) via the API 140a. As an example and not by way of limitation, the card schema may comprise one or more of an ISO 8601 timestamp for when the card was created, three digit card verification value (CVV) printed on the back of the card, funding, expiry month and year, hostname of card's locked merchant (empty if not applicable), last four digits of the card number, nickname to identify the card, card number, spending limit (transaction requests above the spend limit may be declined), spending limit duration (e.g., transaction, monthly, annually, forever), state (e.g., open, paused, closed, pending fulfillment, pending activation), token (i.e., globally unique identifier), or type (single use, merchant locked, unlocked, physical). All physical cards may have digital wallet functionality and may be unlocked. Tables 2-4 (below) provide example card types, states, and spending limit durations.

TABLE 2

Example card types.

| | |
|---|---|
| SINGLE_USE | Card may close shortly after the first transaction. |
| MERCHANT_LOCKED | Card may be locked to first merchant that successfully authorizes the card. |
| UNLOCKED (Issuing) | Card may authorize at any merchant. Creating these cards may require additional privileges. |
| PHYSICAL (Enterprise) | Manufactured and sent to the cardholder. The issuer processor may offer white label branding, credit, ATM, PIN debit, chip/EMV, NFC and magstripe functionality. |
| DIGITAL_WALLET (Enterprise) | Cards that may be provisioned to a digital wallet. |

TABLE 3

Example card states.

| | |
|---|---|
| OPEN | Card may approve authorizations (if they match card and account parameters). |
| PAUSED | Card may decline authorizations but may be resumed at a later time. |
| CLOSED | Card may no longer approve authorizations. Closing a card may not be undone. |
| PENDING_FULFILLMENT | The initial state for cards of type PHYSICAL. The card may be provisioned pending manufacturing and fulfillment. Cards in this state may accept authorizations for e-commerce purchases, but not for "Card Present" purchases where the physical card itself is present. |
| PENDING_ACTIVATION | Each day at a certain time, cards of type PHYSICAL in state PENDING_FULFILLMENT may be sent to the card production warehouse and updated to state PENDING_ACTIVATION. Similar to PENDING_FULFILLMENT, cards in this state may be used for e-commerce transactions. API clients may update the card's state to OPEN after the cardholder confirms receipt of the card. |

TABLE 4

Example card spending limit durations.

| | |
|---|---|
| TRANSACTION | Card may authorize multiple transactions if each individual transaction is under the spending limit. |
| MONTHLY | Card may authorize transactions up to a spending limit for the trailing month. (Note month may be calculated as this calendar date one month prior). |
| ANNUALLY | Card may authorize transactions up to a spending limit in a calendar year. |
| FOREVER | Card may authorize up to a spending limit for the entire lifetime of the card. |

In particular embodiments, the account processor 120 may embed card PANs (primary account numbers) and CVV codes via the API 140*a*. Handling card PANs and CVV codes may require compliance with the payment card industry data security standards (PCI DSS). An enterprise client may choose to reduce their compliance obligations by using an embedded card UI (user interface) solution provided by the receiver processor 140. In this setup, PANs and CVV codes may be presented to the end-user (e.g., account holder 105) via a card UI that the receiver processor 140 provides, optionally styled in the enterprise client's branding using a specified CSS stylesheet. The request for the embedded card UI may be made directly to the receiver processor 140 (e.g., via a browser) such that the card PANs and CVVs are not transmitted or exposed to the account processor servers 120*a*, but are still displayed and visible to the end-users. The API response may comprise an HTML document, and the URL for the request may be inserted directly into the source attribute (SRC) of an inline frame (iframe) element. In particular embodiments, the account processor 120 may compute the request payload server-side at account processor server 120*a*. The account processor 120 may render the request payload (or the whole iframe) on the server 120*a*, or may make an AJAX call from the front-end code. The request for the embedded card UI may comprise an embed request to specify which card to load and a hash-based message authentication code (HMAC). In particular embodiments, the embed request schema (for issuing) may comprise one or more of a token, a publicly available URI, an account token, or an expiration time/date. The token may be a globally unique identifier for the card to be displayed. With the publicly available URI, the white-labeled card element can be styled with the enterprise client's branding, The account token may be included if one or more end-users (e.g., account holder 105) have been enrolled. The expiration may be an ISO 8601 timestamp for when the request should expire. In particular embodiments, the endpoint may return an HTML document. The account processor 120 may be responsible for providing CSS styles for the elements in the embed request. The account processor 120 may provide its own CSS URL in the request to style a card.

In particular embodiments, the account processor 120 may enable its cardholders (e.g., account holders 105) to directly add payment cards to their devices' 105*b* digital wallets with one touch. This may require some additional setup and configuration. As an example and not by way of limitation, the account processor 120 may specify one or more of a unique token for the card being added to the device's 105*b* digital wallet, the type of digital wallet, an account token (for multi-account users) identifying the account associated with the card, and optionally provided by the device's 105*b* wallet, a nonce, a nonce signature, and/or a certificate. The receiver processor 140 may return a provisioning payload, which may be a cryptographic payload representing a payment card 105*a* that can be passed to a device's 105*b* digital wallet. In particular embodiments, each digital wallet may utilize a different API 140*a*.

In particular embodiments, the account processor 120 may make funds available to its cards 105*a* via the API 140*a*. As an example and not by way of limitation, the funding account schema may comprise an account name identifying the funding source, an ISO 8601 string representing the time when the funding source was added, the last 4 digits of a funding account (e.g., bank account and debit card) associated with the funding source, a nickname given to the funding account (or null if it has no nickname), a state of the funding account (e.g., "enabled" (indicating the funding account is available to use for card creation and transactions), "pending" (indicating the funding account is still being verified)), a token (globally unique identifier) for the funding account, and/or the type of funding source (e.g., checking account, savings account, credit card account, cryptocurrency account). In particular embodiments, the account processor 120 may add a bank account as a funding source using routing and account numbers via the API 140*a*. As an example and not by way of limitation, the account processor 120 may specify in the request for adding a bank account one or more of the routing number of the bank account, the account number of the bank account, the account name, or the account token (for multi-account users) identifying the account that the bank account may be associated with. The receiver processor 140 may return a funding-account object comprising the bank information. In particular embodiments, funding accounts may be initially set to the pending state until a micro-deposit validation is completed, while in other embodiments, funding accounts may be set to the enabled state automatically (e.g., trusted funding sources; testing environments).

In particular embodiments, the account processor 120 may validate a bank account as a funding source by providing received micro-deposit amounts. As an example and not by way of limitation, the account processor 120 may specify in the validation request one or more of the token of the bank account to validate, an array of monetary amounts received in two credit transactions, or the account token (for multi-account users) identifying the account that the bank is associated with. In particular embodiments, the account processor 120 may update a bank account funding source using the given parameter (e.g., the token of the bank account) via the API 140*a*. As an example and not by way of limitation, the account processor 120 may specify in the updating request one or more of the token of the bank account to edit, the desired state of the bank account (e.g., enabled and deleted), or the account token (for multi-account users) identifying the account that the bank is associated with. If a bank account is set to be deleted, all cards linked to this account may no longer be associated with it. If there are no other funding accounts set to an enabled state on the account, authorizations may not be accepted on any cards linked to the account until a new funding account is added. In particular embodiments, the account processor 120 may list and display all the funding accounts via the API 140*a*.

In particular embodiments, the account processor 120 may create a virtual or physical card via the API 140*a*. As an example and not by way of limitation, the account processor 120 may specify one or more of memo which is a nickname to identify the card, a card type (e.g., single use, merchant locked, digital wallet, unlocked, and physical), a token for the desired funding account to use when making transactions with the card, a spending limit, a spending limit duration (e.g., transaction, monthly, annually, forever), a card state (e.g., open, paused), a card program token which may identify the card program under which to create the card (different card programs may have their own configurations, e.g., digital wallet card art, BIN type), an expiration month and year (either may be generated if not provided), an account token (e.g., for multi-account users), an account token identifying the account the card may be associated with, a PIN, a product identifier which may specify a manufacturing and design configuration (e.g., physical card art) for the card, or a shipping address.

In particular embodiments, the account processor 120 may update specified properties of the card via the API 140*a*. Unsupplied properties may remain unchanged. As an example and not by way of limitation, the account processor 120 may specify updates for one or more of a unique card token, a card state (e.g., open, paused, and closed), a token for a desired funding account, memo which is a friendly name to identify the card, a spending limit, a spending limit duration (e.g., transaction, monthly, annually, forever), an account token (for multi-account users) identifying the account which owns the card, or a PIN.

In particular embodiments, the account processor 120 may list cards via the API 140*a*. As an example and not by way of limitation, the account processor 120 may specify one or more of page for pagination, page size, begin date (cards created after the specified date may be included), end date (cards created before the specified date may be included), card token for returning a specific card, or account token (for multi-account users) for returning cards associated with this account. Physical cards may be provisioned for ATM/PIN debit access which may require a cardholder PIN. In particular embodiments, the account processor 120 may set and update the cardholder PIN via the API 140*a*. The API 140*a* may additionally enable setting a cryptographic nonce to create additional entropy and prevent replay attacks, which may be unique per request. In particular embodiments, the account processor 120 may reissue cards, i.e., initiating print and shipment of a duplicate card via the API 140*a*. As an example and not by way of limitation, the account processor 120 may specify one or more of card token which is the unique token of the card to update, shipping address, or product identifier which specifies the configuration (e.g., physical card art) that the card should be manufactured with.

In particular embodiments, the account processor 120 may learn more about transactions via the API 140a. As an example and not by way of limitation, a transaction schema may comprise one or more of the authorization amount of the transaction with a positive amount representing a debit and a negative amount representing a credit, which may change over time, the card schema, date and time when the transaction first occurred, a list of all events that have modified this transaction, a list of objects that describe how this transaction was funded, where a reference to the funding account for the card that made this transaction may appear here and the token may match the token for the funding account in the card field (if any promotional credit was used in paying for this transaction, its type may be promotion), the merchant schema, the transaction result with approved or decline reason, the amount of the transaction that has been settled, which may change over time, status (e.g., pending, voided, settling, settled, bounced, declined), or the token which is a globally unique identifier. Table 5 (below) enumerates example transaction status. Table 6 (below) enumerates example transaction results. In particular embodiments, a single card transaction may include multiple events that affect the transaction state and lifecycle. An event schema may comprise one or more of the amount of the transaction event, date and time this event entered the system, the result of approved or decline reason, the token which is a globally unique identifier, or the type (e.g., authorization, authorization advice, clearing, void, return). The amount of the transaction event may be always a positive value, unlike the transaction amount in the transaction schema. Whether the amount is a debit or credit may depend on the event type: authorization, authorization advice, and clearing may be debits whereas void and return may be credits. In particular embodiments, the merchant schema may comprise one or more of an identifier for the payment card acceptor, a city of the card acceptor, a country of the card acceptor, a short description of the card acceptor, a merchant category code, or a geographic state of the card acceptor. In particular embodiments, the account processor 120 may list the transactions via the API 140a. As an example and not by way of limitation, the account processor 120 may specify in the request one or more of approval status, page for pagination, page size for pagination, begin date (transactions created after the specified date may be included), end date (transactions created before the specified date may be included), card token which may filter transactions associated with a specific card, transaction token which may return a specific transaction, or account token (for multi-account users) which may return transactions associated with this account.

TABLE 5

Example transaction status.

| | |
|---|---|
| PENDING | Authorization is pending completion from the merchant |
| VOIDED | The merchant has voided the previously pending authorization |
| SETTLING | The merchant has completed the transaction and the funding source is being debited |
| SETTLED | The transaction is complete |
| BOUNCED | There was an error settling the transaction against the funding source. Your API account may be disabled |
| DECLINED | The transaction was declined |

TABLE 6

Example transaction results.

| | |
|---|---|
| APPROVED | |
| CARD_PAUSED | Card state was paused at the time of authorization. |
| CARD_CLOSED | Card state was closed at the time of authorization. |
| GLOBAL_TRANSACTION_LIMIT | Platform spending limit exceeded. |
| GLOBAL_WEEKLY_LIMIT | Platform spending limit exceeded. |
| GLOBAL_MONTHLY_LIMIT | Platform spending limit exceeded. |
| USER_TRANSACTION_LIMIT | User-set spending limit exceeded. |
| UNAUTHORIZED_MERCHANT | Merchant locked a card attempted at different merchants. |
| SINGLE_USE_RECHARGED | Single-use card attempted multiple times. |
| BANK_CONNECTION_ERROR | Please reconnect a funding source. |
| INSUFFICIENT_FUNDS | Please ensure the funding source is connected and up to date. |
| INSUFFICIENT_FUNDS_PRELOAD | Result given when client responds to authorization request with insufficient funds. |
| MERCHANT_BLACKLIST | This merchant is disallowed on the platform. |
| INVALID_CARD_DETAILS | Incorrect CVV or expiry date. |
| BANK_NOT_VERIFIED | Please confirm the funding source. |
| INACTIVE_ACCOUNT | |
| ACCOUNT_STATE_TRANSACTION_FAIL | |
| UNKNOWN_HOST_TIMEOUT | Network error, re-attempt the transaction. |
| SWITCH_INOPERATIVE_ADVICE | Network error, re-attempt the transaction. |
| FRAUD_ADVICE | Transaction declined due to risk. |
| INCORRECT_PIN | PIN verification failed. |

In particular embodiments, the account processor 120 may receive notifications about API events, sent as they occur. The transaction messages from the issuers processor 140 may be the main vehicle through which live transaction handling is performed. Each message may comprise a full transaction object. Transaction messages may generally be separated along two dimensions: financial versus non-financial messages, and requests versus advice. Financial messages may prompt movement of funds between accounts (e.g., a clearing message that prompts an ACH debit from the user's connected account), while non-financial messages may not prompt movement of funds (e.g., an authorization request that induces a hold on funds but doesn't trigger a payment to the merchant until the transaction is settled). Authorization holds may be temporary, as transactions that are subsequently declined may have the associated funds returned to the end-user for future use. On the other axis, requests may be messages that require a response (i.e., approval or decline) to the receiver processor 140, while advice messages may not require a response other than a notification that the advice was received. In particular embodiments, the receiver processor 140 may provide one or more services that provide access to different types of messages. As an example and not by way of limitation, one service may provide the ability to receive advice. As another example, another service may provide the ability to receive and respond to requests.

In particular embodiments, the receiver processor 140 may include a web-based software application, accessible under a software-as-a-service (SaaS) model, such that the receiver processor 140 and related software applications are executed by the receiver processor server 140b and little to no software processes are required by the payer's personal computing device or the account processor 120. As an example and not by way of limitation, the account processor 120 may execute a web browser application that executes software routines to access webpages, but execute few software routines for the receiver processor 140. In this example, the web browser may comprise a plugin that may execute software routines that communicate data with the receiver processor 140, and the majority of the routines associated with the receiver processor 140 may be executed by the issuer process server 140b. It should be appreciated that the division of functions between the account processor 120 and the issuer processor server 140b may vary across embodiments, and may be tailored for the power of the account processor 120 and/or the available bandwidth (e.g., if only a relatively low-bandwidth communication network 110 is available, the processing may be allocated to reduce the amount of information passed between the account processor 120 and the receiver processor server 140b).

In particular embodiments, the software routines of the receiver processor 140 may register account holder/client data that is stored into account profiles 140c, monitor transactions, and execute a number of routines to secure a transaction when a new transaction initiation is detected by the receiver processor 140. The receiver processor server 140b may include one or more computing devices having processors configured to execute the one or more software components or modules that provide the account holder 105 or account processor 120 the various features of the receiver processor 140 described herein. An issuer processor server 140b may comprise network interface circuitry, such as a network interface card (NIC) or similar component, allowing the issuer processor server 140b to communicate with various devices in the payment system 100, over a communication network 110 or a payment network 135. The receiver processor server 140b may be configured to continuously communicate and monitor the activity of the account holder 105 or account processor 120, and may determine or detect that the account holder 105 is engaged in or engages into a transaction with a commerce entity 115. In particular embodiments, the account holder's 105 personal computing device or the account processor 120 may have an issuer component, such as a web browser plugin, installed locally, where the browser plugin (or other component) may detect the instance of online transaction and can then establish one or more secure authenticating processes with the issuer processor server 140b. That is, in such embodiments, when the account holder's 105 personal computing device or the account processor 120 navigates to a webpage comprising a web transaction form, the issuer component or browser plugin may detect that the browser is at webpage with a transaction form and consequently transmit an indication signal to the receiver processor server 140b indicating that the account holder's 105 personal computing device or the account processor 120 has landed at the online transaction form. In this example, the receiver processor server 140b may then be triggered to execute secure authenticating processes.

In particular embodiments, the receiver processor 140 may comprise account profiles 140c, which may be hosted on one or more computing devices comprising non-transitory machine-readable storage media configured to store profile data. In operation, the receiver processor server 140b may be communicatively coupled to a database comprising the account profiles 140c via a network, where the network may include a private network that is internal to the receiver processor 140. The receiver processor server 140b may register new account holders 105 or enterprise clients, generate new card accounts, and perform authorization checks for transactions received from the payment network 135.

During registration, the receiver processor server 140b may receive data inputs from the account holder 105 or account processor 120, including funding account identifiers. A funding account may be the source of funds associated with a particular account, such as a bank account, payment card account (credit, debit, stored value, etc.), and/or cryptocurrency account. Although embodiments described herein describe funding accounts as being a checking account, debit card, or credit card, it should be appreciated that the disclosed embodiments can be configured to be funding account source payment system-agnostic. Non-limiting examples of a funding account may include a bank account (e.g., checking, savings), a payment card account (e.g., credit, debit, stored value card, gift card), non-payment card credit (e.g., fixed term loan, alternative lending, etc.) and cryptocurrency (e.g., Bitcoin). Nothing described herein should be construed as limiting upon the nature of the receiver processor 140 employed as the funding account for an account or a card.

The receiver processor server 140b may then establish encrypted connections with those funding accounts, which may be at any of a variety of entities, including banks and/or other financial institutions. When instructed to generate a new account, the receiver processor server 140b may request that a receiver institution 145 and/or server 145a (or other funding source or server) link the new account to that funding account. The receiver processor server 140b may also access this funding account for billing purposes. In some instances, the receiver processor 140 may function as a receiver institution 145, or vice versa, and thus may be understood as the same entity/actor and/or be contractually related.

In particular embodiments, the issuer-component may generate a public-private key (or parameter) pair associated with the account holder's 105 account or the enterprise client's account. The private key/parameter may be stored with the issuer-component on the account holder's 105 personal computing device or the account processor 120, and the public key/parameter may be transmitted to the receiver processor server 140b (and stored in an associated account profile 140c). The private key may then be used to sign data transmitted with requests to generate new cards/accounts. The public key may be stored into the account holder's/client's profile and may be used by the receiver processor server 140b to determine the authenticity of the request for a new card/account.

During a process for generating a new card/account, after the receiver processor server 140b is instructed to generate a new card/account, the receiver processor server 140b may determine the authenticity of the request based on any number of factors about the account holder/client, account holder's personal computing device, account processor 120, and other factors, which may include thousands of data points. The receiver processor server 140b may store data/one or more records indicating the commerce entity 115 involved/associated with an ongoing transaction (referred to herein as a "tag" or "merchant tag"), for which the account holder 105 or account processor 120 has requested a new card/account. The receiver processor server 140b may store this tag into a record for the new card/account into the account holder's/client's profile, along with the other relevant information associated with the new card/account (e.g., card number, CVV, payment network 135).

During a transaction authorization process, the receiver processor server 140b may receive or intercept an authorization query issued from the payment network 135 to a receiver institution 145. In some cases, the issuer-component may alert the receiver processor server 140b to the transaction and the receiver processor server 140b may receive the transaction data before an authorization request is sent from the commerce entity 115 to the payment network 135. The receiver processor server 140b may ultimately determine whether to authorize the transaction, as the receiver processor server 140b informs the receiver institution 145 or the payment network 135 whether the card is acceptable for the particular transaction. The receiver processor server 140b may query the account profiles 140c to determine whether the data about the card and the account holder/client matches what is stored for the card in the account profiles 140c. In some cases, the receiver processor server 140b may determine whether the commerce entity 115 identified in the transaction data matches to a commerce entity 115 associated with the particular card/account being analyzed, as indicated by the commerce-entity tag stored in a record of the card/account in the account profiles 140c (in some embodiments stored in and/or associated with a account holder/client profile or record).

In particular embodiments, the receiver processor 140 may optionally comprise authentication logic 140d. The authentication logic 140d may be provided by the account processor 120. The authentication logic 140d may provide the enterprise client with the ability to make custom transaction approval decisions even if the account processor 120 does not comprise a server.

In particular embodiments, the payment network 135 may be referred to as a "card scheme" or just as a "network." The payment network 135 may provide the rails for transactions to occur. The payment network 135 may sit in between acquirers and issuers and pass messages back and forth to make the transaction happen. The payment network 135 may also set the communication rules and standards that the acquirers and issuers need to adhere to. In particular embodiments, the payment network 135 may receive payment authorization requests from commerce-entity servers 115a, during or after transactions. New cards/accounts, like any other credit or debit cards, may be issued through the payment network 135. When a commerce-entity server 115a queries the payment network 135 on whether a card should be authorized for a transaction, the payment network 135 may review the card digits (e.g., Payment Account Number (PAN), Bank Identification Number (BIN), or Issuer Identification Number (IIN), etc.) to identify the receiver institution 145. The payment network 135 may then query the receiver institution server 145a whether to authorize the card. In particular embodiments, several numbers of the account/card number associated with a transaction may be configured to identify the receiver institution 145 as the appropriate party to authorize the transaction. As such, the payment network 135 may use these numbers to route the payment authorization request and transaction data to the receiver institution 145. In some implementations, the receiver institution server 145a may forward the authorization query to the receiver processor 140, which may then perform the requisite determinations, including whether the transaction data identifies the correct commerce entity 115 that matches the card's commerce-entity tag. The payment network 135 may then return an approval or rejection to the commerce-entity server 115a based upon how the receiver institution server 145a and receiver processor server 140b respond.

Figure 2:
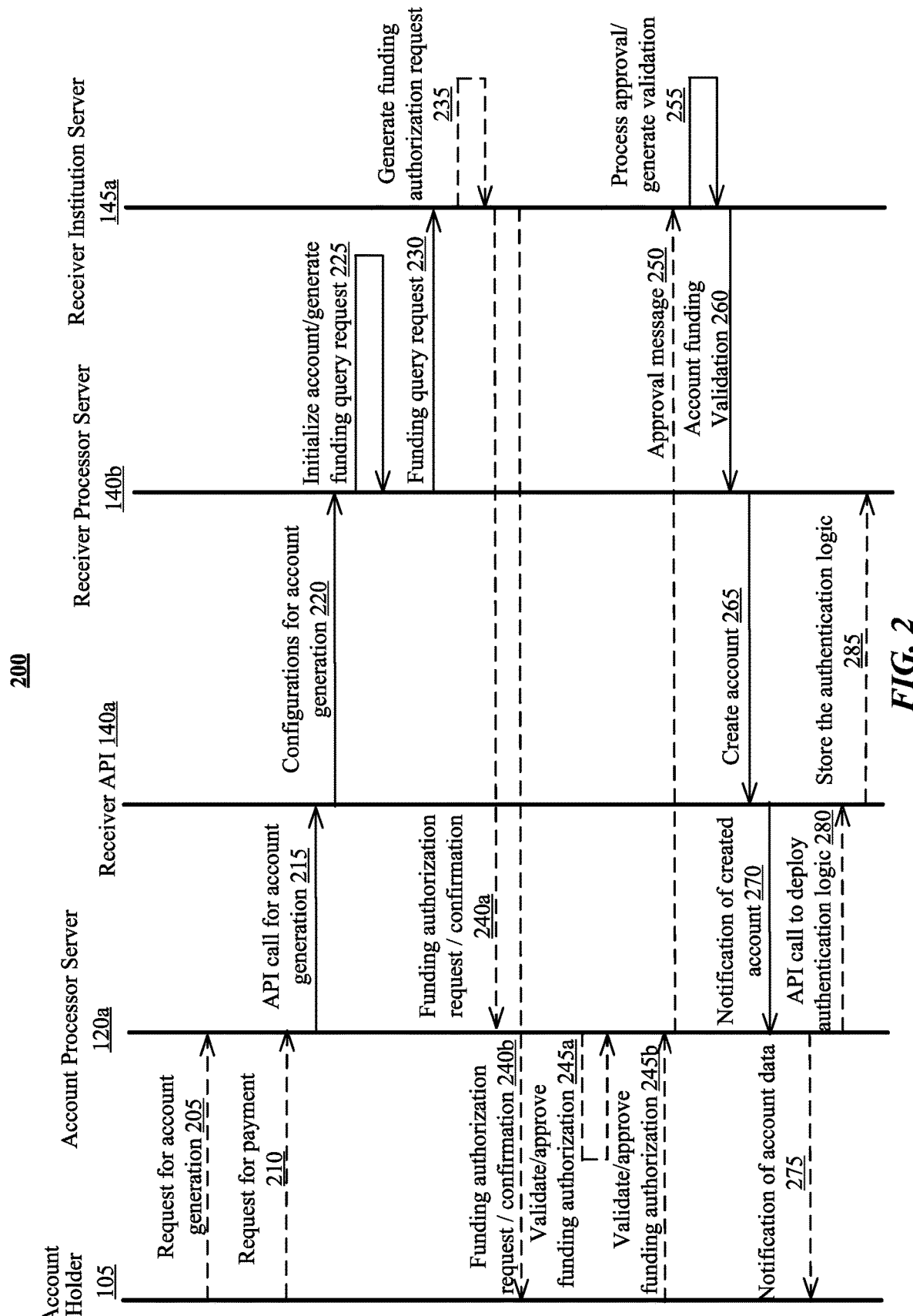
FIG. 2 illustrates an example flow diagram for account initiation and validation.

FIG. 2 illustrates an example flow diagram 200 for account initiation and validation. The account initiation may be optionally started by the account holder 105. In particular embodiments, the account holder 105 may send a request for account generation 205 to the account processor server 120a. In alternative embodiments, the account holder 105 may send a request for payment 210 to the account processor server 120a. In particular embodiments, the account holder 105 sending a request for payment 210 comprises a request for account generation 205. As an example and not by way of limitation, the request for payment 210 may be based on the account holder's 105 attempt to make a purchase online. In particular embodiments, the account processor server 120a may make an API call for account generation 215. The API call may be responsive to the request for account creation 205 or request for payment 210. In alternative embodiments, the account processor server 120a may make the API call without any payer input. As an example and not by way of limitation, the enterprise client associated with the account processor server 120a may need to create individual accounts for its employees or contractors for its own business. The API call for account generation 215 may be based on the receiver processor API 140a. Through the receiver processor API 140a, the receiver processor server 140b may get the configurations for account generation 220. As an example and not by way of limitation, the configurations may comprise various account creation data, including email, password, access code (if applicable), name, address, birthday, and/or the like. The configurations may also comprise general information about the enterprise client or the account holder 105 (including preferences, interests, demographics, etc.) and/or know-your-customer (KYC) and/or other regulatory data. The configurations may further comprise one or more funding sources, such as the enterprise client's root account associated with the receiver institutions 145 (e.g., credit card accounts, checking accounts, savings accounts, or other financial accounts), that the enterprise client wishes to use as a funding source to generate the individual accounts. Although embodiments described herein describe funding accounts as being a checking account, savings account, debit card account, or credit card account, it should be appreciated that some embodiments can be configured to be agnostic to the funding source and/or payment system. Non-limiting examples of funding accounts/sources include a bank account (e.g., checking, savings), a payment card account (e.g., credit, debit, stored value card, gift card), and cryptocurrency (e.g., Bitcoin).

In particular embodiments, the receiver processor server 140*b* may use the configurations 220 to initialize an account/generate funding query request 225. During account initialization, the receiver processor server 140*b* may perform geographic analysis, temporal/geographic analysis, and behavioral pattern analysis. The analysis may be based on data collected by the aggregated transaction data. In some implementations, the receiver processor server 140*b* may obtain an identifier (ID, account identifier, etc.) for a payer/client requesting an account. The receiver processor server 140*b* may query a database, such as an receiver database and/or payment network database, for specific data collected by aggregated account transaction data records of the payer/client. The receiver processor server 140*b* may also query the databases for all possible field values that can be taken by each of the field values (e.g., time, AM/PM, postal code, merchant name, merchant identifier, transaction amount, cost, etc.). Using the field values of all the fields, the receiver processor server 140*b* may generate field value pairs for use in a correlation analysis on the field value pairs. An example field value pair is: "time" is "AM (Pacific)", and "merchant" is "Best Coffee Shop." The receiver processor server 140*b* may then generate/determine probability estimates for each field value pair occurring, for example, in the aggregated transaction data records. As an example and not by way of limitation, the receiver processor server 140*b* may select a field value pair and determine the number of records within the aggregated transaction data records where the field value pair occurs. The receiver processor server 140*b* may then calculate a probability quotient for the field value pair, for example, by dividing the number determined for the occurrences of the field value pair by the total number of aggregate transaction data records. The receiver processor server 140*b* may also assign a confidence level for the probability quotient based on the sample size (e.g., total number of records in the aggregated transaction data records). The receiver processor server 140*b* may generate and store a record, such as described above, including the field value pair, the probability quotient, and the confidence level associated with the probability quotient. The receiver processor server 140*b* may perform such a computation for each field value pair generated. The field value pairs and associated records may be used by the receiver processor server 140*b* when determining if a request is valid, and/or when determining whether to require additional validating information from the account holder/client (such as described above when the account holder 105 is outside of specified geographic area), and the account holder/client may be prompted to re-authenticate.

In particular embodiments, the receiver processor server 140*b* may also analyze the commerce entity's location or the location from which the account generation is being requested to determine if the commerce entity 115 is valid. Such analysis may be based on commerce entity's information collected by the account processor server 120*a*, history of the commerce entity 115, owner of the commerce entity 115, location of the commerce entity 115, location of the owner of the commerce entity 115, whether the commerce entity 115 is on a fraud list (or the probability the commerce entity 115 is related to a commerce entity 115 on a fraud list), etc. If the receiver processor server 140*b* determines that the commerce entity 115 exceeds a specified risk threshold (e.g., either because of collected information or lack of available information), or otherwise determines the commerce entity 115 is not valid, the receiver processor server 140*b* may transmit a notification to the account processor server 120*a* and/or the account holder 105 that the commerce entity 115 is not valid (or has the potential to be invalid). In some embodiments, a determination about the validity of a commerce entity 115 may prevent the payer/client from receiving an account for the commerce entity 115, while in other embodiments, the receiver processor server 140*b* may allow the account holder/client, once notified about the risk, to proceed with the transaction and accept the risk. In particular embodiments, the receiver processor server 140*b* may determine if the account holder/client already has an existing account that is tagged to the commerce entity 115, and if so, may retrieve the information for the existing tagged account, provide the account information to the account holder 105 or account processor server 120*a*, and update the corresponding record.

In particular embodiments, the goal of funding query request 225 may be to make sure an individual account can be funded and/or confirm that the stated information (e.g., identity, location, funding information, and/or the like) is accurate/truthful. In some embodiments, a funding source may be required for creating an account, while in other embodiments, a specified funding source may be not initially required for creating an account, though in such embodiments, a validated funding source may be required prior to providing account for use in a transaction.

In particular embodiments, the receiver processor server 140*b* may send the funding query request 230 to the receiver institution server 145*a* (e.g., a bank server associated with a funding checking account indicated by the client-provided information). Optionally, the receiver institution server 145*a* may generate a funding authorization request 235. The receiver institution server 145*a* may then either send the funding authorization request/confirmation 240*a* to the account processor server 120*a* or send the funding authorization request/confirmation 240*b* to the account holder 105 for validation/approval. In one embodiment, the account processor server 120*a* may validate/approve the funding authorization 245*a*. In another embodiment, the account holder 105 may validate/approve the funding authorization 245*b*, which may be returned to the account processor server 120*a*. As an example and not by way of limitation, the receiver institution server 145*a* may generate a message to the account holder 105, such as a text message, mobile application message, email, and/or the like, to which the account holder 105 may reply and/or confirm that the requested funding information is approved/acceptable. The account processor server 120*a* may then send the approval message 250 to the receiver institution server 145*a*. As another example and not by way of limitation, the receiver institution server 145*a* may approve or conduct a micro-transaction (e.g., a transaction for a small amount such as $0.13, $1.07, etc.) that shows up on the account holder's 105 or enterprise client's funding account and the account holder 105 or account processor server 120*a* may provide that specified amount and/or a code associated with the microtransaction in response to show that the account holder 105 or account processor server 120*a* has access to the account, in order to validate the funding account. In particular embodiments, upon receiving the approval message 250, the receiver institution server 145*a* may validate the funding query request, i.e., process approval/generate validation 255. In particular embodiments, the receiver institution server 145*a* may perform process approval/generate validation 255 without sending an authorization request to the account holder 105 or account processor server 120*a*.

In particular embodiments, the receiver institution server 145*a* may provide an account funding validation 260 to the receiver processor server 140*b*. Once the receiver processor server 140*b* has received the funding account validation 260, it may create an individual account (including updating/creating a corresponding record in a database of the receiver processor 140). In particular embodiments, the individual account may be tagged to one or more specific commerce entities 115. The individual account may be generated as a bank account by the bank, issuer, or other type of financial institution whose servers are configured to receive instructions from the issuer processor server 140*b*. In particular embodiments, the receiver processor server 140*b* may store the new account information into the account profiles 140*c*. The receiver processor server 140*b* may also generate data indicating that the particular account is limited to use for the particular commerce entity 115. This data (referred to herein as a "tag") may be stored into and/or associated with the record of the new account or account profile 140*c*, and may be referenced by the receiver processor server 140*b* in the future to determine whether to authorize transactions attempting to submit the new account's number to a commerce entity 115 as a method of payment. Depending on the implementation, the record, account profile 140*c*, account (s), tag(s), etc. may be stored in a single record or in multiple, linked/associated records on one or more servers and/or databases.

In particular embodiments, the account creation 265 may be sent to the receiver processor API 140*a*, which may then transmit a notification of created account 270 to the account processor server 120*a*, indicating the requested account has been created for them. The account processor server 120*a* may download, access, and/or otherwise receive/retrieve related software program(s)/module(s), that, when activated/instantiated/run, can monitor the account holder's 105 actions/behaviors/interaction, such as browsing, transactions initiated by the account holder's 105 personal computing device (and associated programs), and interact with the receiver processor 140. In particular embodiments, the account processor server 120*a* may optionally send a notification of account data 275 to the account holder 105. As an example and not by way of limitation, the account data may comprise account number, routing number, merchant tag, etc.

In particular embodiments, the account processor server 120*a* may optionally make another API call to deploy its own authentication logic 280. Upon receiving the API call, the receiver processor server 140*b* may store the authentication logic 285. The authentication logic may provide the account processor 120 the ability to make custom transaction approval decisions without implementing it on its account processor server 120*a* or even if the account processor 120 does not have a server. Instead, the receiver processor 140 may implement and run the authentication logic on its server 140*b*.

Figure 3:
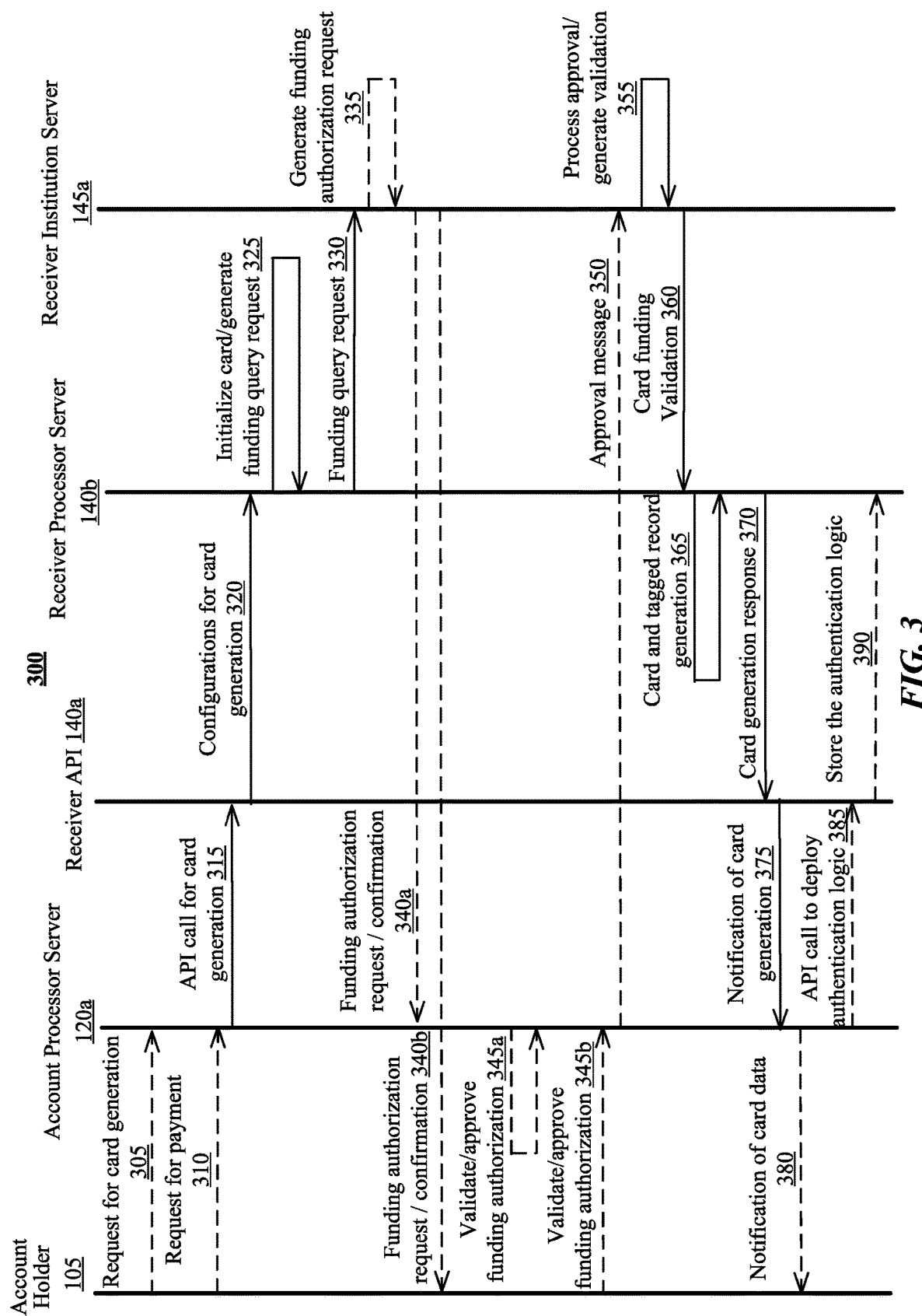
FIG. 3 illustrates an example flow diagram for card initiation and validation.

FIG. 3 illustrates an example flow diagram 300 for card initiation and validation. The card initiation may optionally be started by the account holder 105. In particular embodiments, the account holder 105 may send a request for card generation 305 to the account processor server 120*a*. In alternative embodiments, the account holder 105 may send a request for payment 310 to the account processor server 120*a*. As an example and not by way of limitation, the request for payment 310 may be based on the account holder's 105 attempt to make a purchase online. In particular embodiments, the account processor server 120*a* may make an API call for card generation 315. The API call may be responsive to the request for card creation 305 or request for payment 310. However, the account processor server 120*a* may make the API call without any payer input. As an example and not by way of limitation, the enterprise client associated with the account processor server 120*a* may need to create individual cards for its employees or contractors for its own business. The API call for card generation 315 may be based on the receiver processor API 140*a*. Through the receiver processor API 140*a*, the receiver processor server 140*b* may get the configurations for card generation 320. As an example and not by way of limitation, the configurations may comprise various card creation data, including email, password, access code (if applicable), name, address, birthday, and/or the like. The configurations may also comprise general information about the enterprise client or the account holder 105 (including preferences, interests, demographics, etc.) and/or know-your-customer (KYC) and/or other regulatory data. The configurations may further comprise one or more funding sources, such as the enterprise client's root account associated with the receiver institutions 145 (e.g., credit card accounts, checking accounts, savings accounts, or other financial accounts) the enterprise client wishes to use as a funding source to generate the individual cards. Although embodiments described herein describe funding accounts as being a checking account, savings account, debit card account, or credit card account, it should be appreciated that some embodiments can be configured to be funding account source agnostic/payment system agnostic. Non-limiting examples of a funding accounts/sources include a bank account (e.g., checking, savings), a payment card account (e.g., credit, debit, stored value card, gift card), and cryptocurrency (e.g., Bitcoin).

In particular embodiments, the receiver processor server 140*b* may use the configurations to initialize card/generate funding query request 325. During card initialization, the receiver processor server 140*b* may perform geographic analysis, temporal/geographic analysis, and behavioral pattern analysis. The analysis may be based on data collected by the aggregated transaction data. In some implementations, the receiver processor server 140*b* may obtain an identifier (ID, account identifier, etc.) for an account holder/client requesting a card. The receiver processor server 140*b* may query a database, such as a receiver database and/or payment network database, for specific data collected by aggregated card transaction data records of the account holder/client. The receiver processor server 140*b* may also query the databases for all possible field values that can be taken by each of the field values (e.g., time, AM/PM, postal code, merchant name, merchant identifier, transaction amount, cost, etc.). Using the field values of all the fields, the receiver processor server 140*b* may generate field value pairs for use in a correlation analysis on the field value pairs. An example field value pair is: "time" is "AM (Pacific)" and "merchant" is "Best Coffee Shop" The receiver processor server 140*b* may then generate/determine probability estimates for each field value pair occurring, As an example and not by way of limitation, occurring in the aggregated transaction data records. As another example and not by way of limitation, the receiver processor server 140b may select a field value pair and determine the number of records within the aggregated transaction data records where the field value pair occurs. The receiver processor server 140b may then calculate a probability quotient for the field value pair, for example, by dividing the number determined for the occurrences of the field value pair by the total number of aggregate transaction data records. The receiver processor server 140b may also assign a confidence level for the probability quotient based on the sample size (e.g., total number of records in the aggregated transaction data records). The receiver processor server 140b may generate and store a record, such as described above, including the field value pair, the probability quotient, and the confidence level associated with the probability quotient. The receiver processor server 140b may perform such a computation for each field value pair generated. The field value pairs and associated records may be used by the receiver processor server 140b when determining if a request is valid, and/or when determining whether to require additional validating information from the account holder/client (such as described above when the payer is outside of specified geographic area), and the account holder 105 may be prompted to re-authenticate.

In particular embodiments, the receiver processor server 140b may also analyze the commerce entity's location for or from which the card is being requested to determine if the commerce entity 115 is valid. Such analysis may be based on commerce entity's information collected by the account processor server 120a, history of the commerce entity 115, owner of the commerce entity 115, location of the commerce entity 115, location of the owner of the commerce entity 115, whether the commerce entity 115 is on a fraud list (or the probability the commerce entity 115 is related to a commerce entity 115 on a fraud list), etc. If the receiver processor server 140b determines that the commerce entity 115 exceeds a specified risk threshold (e.g., either because of collected information or lack of available information), or otherwise determines the commerce entity 115 is not valid, the receiver processor server 140b may transmit a notification to the account processor server 120a and/or the account holder 105 that the commerce entity 115 is not valid (or has the potential to be invalid). In some embodiments, a determination about the validity of a commerce entity 115 may prevent the account holder/client from receiving a card for the commerce entity 115, while in other embodiments, the receiver processor server 140b may allow the account holder/client, once notified about the risk, to proceed with the transaction and accept the risk.

In particular embodiments, the receiver processor server 140b may determine if the account holder/client already has an existing card that is tagged to the commerce entity 115 (typically a multi-use card, as single-use cards may be limited to a single transaction), and if so, may retrieve the information for the existing tagged card, provide the card information to the account processor server 120a or account holder 105, and update the corresponding record. If the receiver processor server 140b determines that the commerce entity 115 is not already associated with an existing card for the account holder/client, the receiver processor server 140b may determine (in some embodiments, based on account holder/client specified information and/or parameters) if a new card for the commerce entity 115 is to be a single-use card or a multi-use card (e.g., for recurring payments, such as a monthly subscription). If single use, the receiver processor server 140b may generate a merchant-tagged single-use card and corresponding record (as detailed above) and provide/transmit the single-use card information to the account holder/client (and in turn the information may be provided to the account holder 105 and commerce entity 115 corresponding to the tag). If multi-use, the receiver processor server 140b may generate a merchant-tagged multi-use card and corresponding record and transmit information regarding that tagged multi-use card to the account processor server 120a or account holder 105 in recurring payments. In some embodiments, the multi-use tagged card may be configured for recurring payments to the tagged commerce entity 115 (e.g., a monthly subscription for a particular commerce entity 115), where the amount is unlikely to vary widely, if at all, and the timing of payment/charge is likely to be at a particular time each time period (e.g., the first of every month, or the first week of every month). In other embodiments, the merchant-tagged, multi-use card may be configured such that an account holder 105 can use the card at the tagged commerce entity 115 for a specified or unlimited amount of transactions, and may further be configured to limit the transaction amount per period and/or per transaction. In such embodiments, the receiver processor server 140b may still perform the analytics on the payer/client behavior, merchant information, and/or other collected data to confirm that each card request/transaction request and each payment validation is valid, and the matching may be performed for each.

In particular embodiments, the goal of funding query request 325 may be to make sure that an individual card can be funded and/or confirm that the stated information (e.g., identity, location, funding information, and/or the like) is accurate/truthful. In some embodiments, a funding source may be required for creating a card, while in other embodiments, a specified funding source may be not initially required for creating a card, though in such embodiments, a validated funding source may be required prior to providing a card for use in a transaction.

In particular embodiments, the receiver processor server 140b may send the funding query request 330 to the receiver institution server 145a (e.g., a bank server associated with a funding checking account indicated by the client-provided information). Optionally, the receiver institution server 145a may generate a funding authorization request 335. The receiver institution server 145a may then either send the funding authorization request/confirmation 340a to the account processor server 120a or send the funding authorization request/confirmation 340b to the account holder 105 for validation/approval. In one embodiment, the account processor server 120a may validate/approve the funding authorization 345a. In another embodiment, the account holder 105 may validate/approve the funding authorization 345b, which may be returned to the account processor server 120a. As an example and not by way of limitation, the receiver institution server 145a may generate a message to the account holder 105, such as a text message, mobile application message, email, and/or the like, to which the account holder 105 may reply and/or or confirm that the requested funding information is approved/acceptable. The account processor server 120 may then send the approval message 350 to the receiver institution server 145a. As another example and not by way of limitation, the receiver institution server 145a may approve or conduct a micro-transaction (e.g., a transaction for a small amount such as $0.13, $1.07, etc.) that shows up on the account holder's 105 or enterprise client's funding account and the account holder 105 or account processor server 120a may provide that specified amount and/or a code associated with the microtransaction in response to show that the account holder 105 or account processor server 120a has access to the account, in order to validate the funding account. In particular embodiments, upon receiving the approval message 350, the receiver institution server 145a may validate the funding query request, i.e., process approval/generate validation 355. In particular embodiments, the receiver institution server 145a may perform process approval/generate validation 355 without sending an authorization request to the account holder 105 or account processor server 120a.

In particular embodiments, the receiver institution server 145a may provide a card funding validation 360 to the receiver processor server 140b. Once the receiver processor server 140b has received the card funding validation 360, the receiver processor server 140b may perform card and tagged record generation 365. Specifically, the receiver processor server 140b may create an individual card (including updating/creating a corresponding record in a database of the receiver processor 140). The receiver processor server 140b may also tag the individual card to one or more specific commerce entities 115. The individual card may be generated as an actual debit/credit card account or virtual card by the bank, issuer, or other type of financial institution whose servers are configured to receive instructions from the receiver processor server 140b. For a physical card, the receiver processor server 140b may access a card issuer server to request generation of the physical card. In particular embodiments, the receiver processor server 140b may store the new card information into the account profiles 140c. The receiver processor server 140b may also generate data indicating that the particular card is limited to use for the particular commerce entity 115. This data (referred to herein as a "tag") may be stored into and/or associated with the record of the new card or account profile 140c, and may be referenced by the receiver processor server 140b in the future to determine whether to authorize transactions attempting to use the new card at a commerce entity 115 as a method of payment. Depending on the implementation, the record, account profile 140c, card(s), tag(s), etc. may be stored in a single record or in multiple, linked/associated records on one or more servers and/or databases.

In particular embodiments, the receiver processor server 140b may send a card generation response 370 to the receiver processor API 140a, which may then transmit a notification of card generation 375 to the account processor server 120a, indicating the requested card has been created for them. The account processor server 120a may download, access, and/or otherwise receive/retrieve related software program(s)/module(s), that, when activated/instantiated/run, can monitor the account holder's 105 actions/behaviors/interaction, such as using the card at commerce entities 115, browsing, transactions initiated by the account holder's 105 personal computing device (and associated programs), and interact with the receiver processor 140. In particular embodiments, the account processor server 120a may optionally send a notification of card data 380 to the account holder 105. As an example and not by way of limitation, the card data may comprise card number, authorization code (CVV), expiration date, merchant tag, etc.

In particular embodiments, the account processor server 120 may optionally make another API call to deploy its own authentication logic 385. Upon receiving the API call, the receiver processor server 140b may store the authentication logic 390. The authentication logic may provide the account processor 120 the ability to make custom transaction approval decisions without implementing it on its account processor server 120a or even if the account processor 120 does not have a server. Instead, the receiver processor 140 may implement and run the authentication logic on its server 140c.

Figure 4:
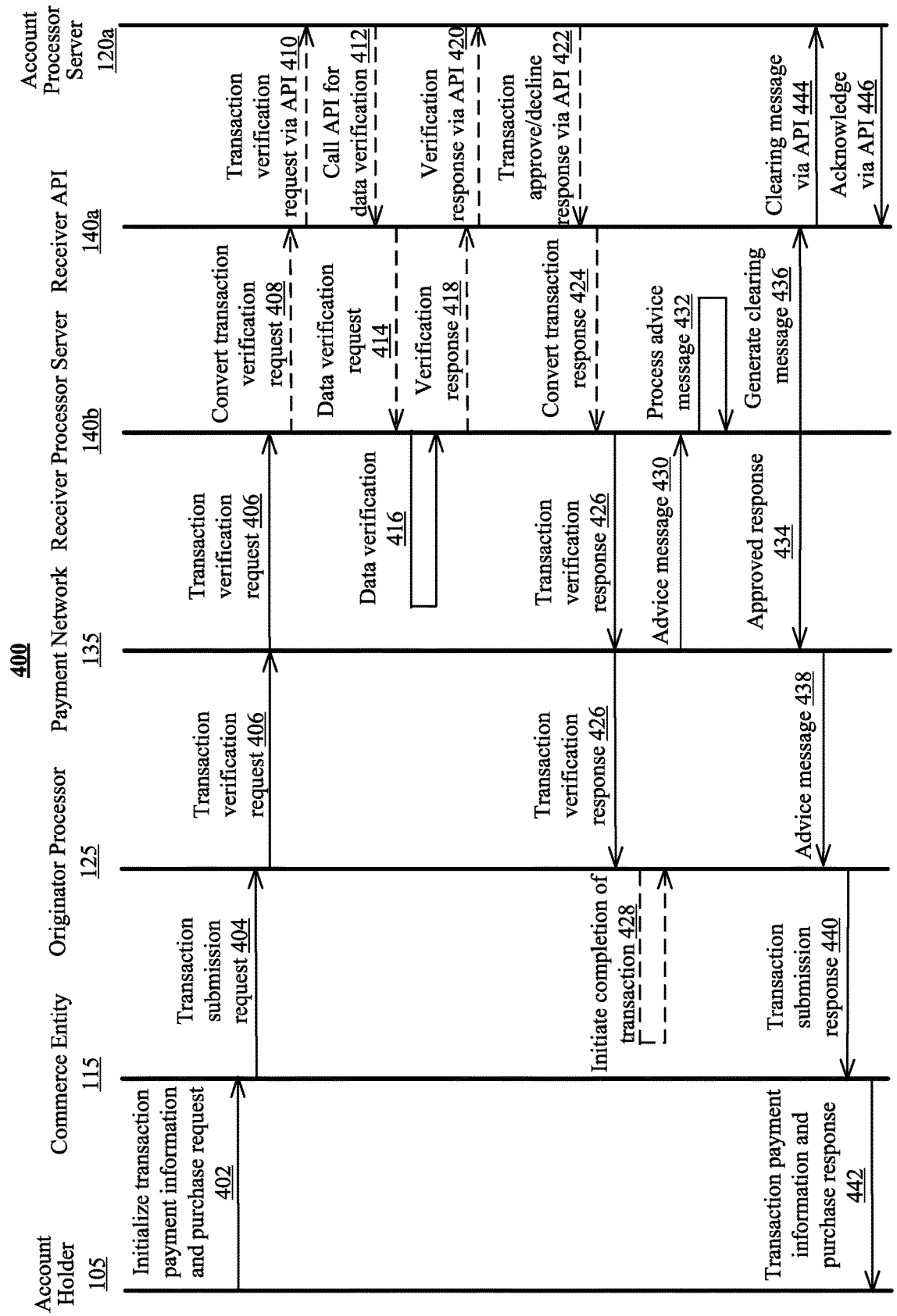
FIG. 4 illustrates an example flow diagram for enabling a transaction by the receiver processor.

FIG. 4 illustrates an example flow diagram 400 for enabling a transaction by the receiver processor 140. In particular embodiments, the account holder 105 may initialize transaction payment information and purchase request 402 to the commerce entity 115. As an example and not by way of limitation, the account holder 105 may use a card at a payment machine 115b associated with the commerce entity 115. As another example, for online transaction, the account holder 105 may provide input into a personal computing device, such as mobile application input (e.g., via a user interface such as a touch screen, voice commands, gestures, eye-tracking, etc.) and web navigation input (via keyboard, mouse, other peripheral, etc.). Additional input may be monitored, tracked, and/or recorded, including direct input from the account holder 105, information/data from another program or application running on the personal computing device, information/data from sensors of the personal computing device (e.g., GPS data, BLUETOOTH data, wireless network data, camera data, video data, photo data, microphone data, accelerometer data, etc.), and/or the like.

In particular embodiments, the commerce entity 115 may collect the transaction data (including the account/card information) and purchase request (e.g., via the payment machine 115b). For online transactions, the commerce entity 115 may comprise any number of servers 115a responsible for processing incoming online transaction data, or the commerce entity 115 may transmit the data from the online transaction to the servers of a third-party payment-processing vendor. In either case, the account/card information and any other relevant data may be submitted to the appropriate verifying party, after the online transaction data comprising the payment information is received from the account holder's 105 personal computing device.

In particular embodiments, the commerce entity 115 may then transmit the transaction data (e.g., as a transaction submission request 404) to the originator processor 125 (for the appropriate originator institution 130). The originator processor 125 may in turn transmit a transaction verification request 406 including the transaction data (typically via the payment network 135) to the receiver processor server 140b.

In particular embodiments, the transaction data that is provided by the commerce entity 115 and goes through to the receiver processor server 140b may comprise one or more of card information, payment/charge amount, billing information, or card acceptor name and location. The card acceptor name and location may be defined, for example, to be 43 characters in length, divided into 4 distinct subproperties: positions 1-25 is address data, positions 26-38 is city data, positions 39-40 is state data, positions 41-43 is country data. The disclosed messages may conform to the appropriate ISO protocols, and, unlike other payment methods that require use of new data formats, communications equipment, complex security token, and/or complex user-defined rules, may not require any additional burden, bandwidth, or processing power on the part of the commerce entity 115, the originator processor 125, the receiver processor server 140b, and/or the payment network 135 (depending on which are implicated in the transaction). The transaction data received by the receiver processor server 140b may be analyzed, such as by tag matching and/or as detailed below.

As noted above, the receiver processor 140 may not require additional bandwidth, or even additional processing on the part of the commerce entity 115 or intermediary parties—the card issued by the receiver processor 140 may be handled by them in the same way as a traditional credit card without requiring the commerce entity 115 to provide additional information, making the receiver processor 140 function for commerce entities 115 relying on payment methods used more than a decade ago while also be functional with commerce entities 115 that have the latest payment methods (e.g., tokenized payment, mobile wallet, QR payment, etc.). As such, when the receiver processor server 140*b* receives card acceptor name and location, the format and content of that information may vary widely.

In particular embodiments, the receiver processor server 140*b* may optionally convert the transaction verification request 408 for the receiver processor API 140*a* and provide it to the receiver processor API 140*a*. A transaction request via the API 410 may be then sent to the account processor server 120*a*. It should be understood that, in some implementations, the originator institution 130/originator processor 125, receiver institution 145/receiver processor 140, and/or the payment network 135 may not be included and/or may represent/be associated with the same entity (e.g., if the originator institution 130 is also the receiver institution 145), and in any event the relevant information starting with the information provided by the commerce entity 115 may be ultimately provided to the receiver processor server 140*b* (e.g., in the form a transaction verification request 406). In particular embodiments, the account processor server 120*a* may verify the data by itself. In alternative embodiments, the account processor server 120*a* may call the API for data verification 412 by the receiver processor 140. The receiver processor API 140*a* may transmit the data verification request 414 to the receiver processor server 140*b*.

In particular embodiments, the receiver processor server 140*b* may perform data verification 416, which may be responsive to the transaction verification request 406 or data verification request 414. During data verification 416, the receiver processor server 140*b* may determine whether to authorize the payment by comparing fields of the transaction data against fields stored in the account profiles 140*c*. As an example and not by way of limitation, the receiver processor server 140*b* may receive the card number and then cross-reference the card number against the corresponding record in account profiles 140*c*. Using the transaction data, the receiver processor server 140*b* may determine not only whether the data associated with the card number is generally correct (e.g., card number, CVV, name, address), and may also determine whether the transaction data identifies the commerce entity 115 as the particular commerce entity 115 tagged to the particular card number. Conventional systems may determine whether the inputted data is accurate and satisfies the required data field inputs. Some conventional systems may link cards/accounts to categories of commerce entities 115 through the well-known MCC coding standards, which may limit the category for the card number. In some cases, conventional systems may limit the number of uses for the card number. Some conventional systems may be available to commerce entities 115 wanting to publish their own merchant-specific branded cards, such as gift cards, but these may be unwieldy, and may be not brand agnostic. Here, the transaction data may comprise an indicator for the particular commerce entity 115 associated with the transaction, which may then be matched to a tag stored in the record of the card. Thus, the limitations may be addressed, but there may be additional protection over known authorization techniques, because a card number stolen from Merchant A cannot be later used to pay for transactions to Merchant B, as the receiver processor server 140*b* may automatically review the transaction data before issuing a verification response to the payment network 135.

In particular embodiments, the transaction data that is received by the receiver processor server 140*b* may be unstructured, making it difficult to match the transaction message with the commerce entity 115 that originated the transaction. The address field may generally be used for the name of the commerce entity/service (though the name is sometime incomplete or missing), and the city field may be sometimes used for city, other times with the domain name, phone number, service name, etc., and state and country may sometimes be offshore for a domestic business.

In particular embodiments, when the receiver processor server 140*b* receives a transaction verification request 406, a confidence score may be calculated for whether the charge matches the metadata captured when generating the corresponding card. In some implementations, first the card acceptor name and location address and city subfields may be lexically parsed and tokenized by splitting on any non-alphanumeric characters. This may yield what can be understood or defined as a bag-of-words (BOW), and the BOW of the lexically parsed and tokenized subfields defined as a first BOW ("BOW A"). The BOW may comprise data where text is represented as the multiset of its components, in some embodiments disregarding grammar and word order while keeping multiplicity. A second BOW ("BOW B") may comprise the stored metadata from the configurations for card generation 320 collected when the card was generated/created. Depending on the implementation, a variety of processes may be applied, for example, words of two characters or less may be stripped from both bags. Similarly, commonly occurring strings such as www, inc, llc may additionally or alternatively be stripped out from both bags.

Then, BOW A and BOW B may be input to a function (e.g., Bayesian probability function, k-means clustering algorithm, etc.) that returns a percentage confidence score that BOW A is related to BOW B. If the probability is over a specified threshold T, then the receiver processor server 140*b* may communicate that the charge is accepted, else the receiver processor server 140*b* may communicate that the charge is declined. In some embodiments, threshold T may change as more transactions are processed and/or as a probability function (e.g., Bayes function) and/or cluster analysis (e.g., k-means clustering algorithm) is trained and/or updated with historical data. In some embodiments, if the threshold T was not reached, the receiver processor server 140*b* may determine if the card was created within a given time period (e.g., within the past five minutes) and if so, provided the other parameters are within tolerances (e.g., payment amount), the charge may be approved based on temporal locality as an indicator of validity (presuming the probability function returned a false negative). For online transactions, the authorization decisioning of the receiver processor server 140*b* may be enhanced by comparing entered information, such as billing information, at checkout with corresponding information, such as AVS (address verification system) information passed within the authorization message. Some information entered at time of billing may, in some embodiments, comprise coded or tagged information based on the card generation. In some embodiments, the receiver processor server 140*b* may determine if the authorization amount matches what was collected as the total on card created (in some embodiments, within specified tolerances to account for service fees and/or service/convenience charges).

In particular embodiments, the receiver processor server 140b may utilize stream training and matching for authorization. In some implementations, the receiver processor server 140b may utilize clustering analysis, for example, to analyze two or more BOWs. In one embodiment, BOWs may be input to a k-means clustering algorithm. In some implementations, a k-means cluster may be retrained every time a new card is generated/created. In some embodiments, a k-means cluster may utilize the number of clusters to compute when the model is trained, and each commerce entity 115 for which a card is created may be a cluster. For each cluster, the receiver processor server 140b may tokenize every word (and/or every word meeting specifications, such as a length greater than 1 character, etc.) and vectorize it to create a BOW. For an example merchant "Merchant A", an example card request may generate a BOW having the form of. ["merchant A", "your", "wallet", "utf8", "2062664064", "reno", "nv", "usa" ]. Depending on the implementation, the k-means cluster may include more than 100, 500, 1000, 2000, 3000, 4000, 5000, 6000, 7000, 8000, 9000, 10000, 11000, 12000, 13000, 14000, 15000, 20000, 25000, 30000, 40000, 50000, or more than 100000 unique clusters. The receiver processor server 140b may, in some embodiments, retrain the k-means clustering on each card-create request, to retrain the k-means cluster with the new, additional cluster added.

In particular embodiments, the receiver processor server 140b may use behavioral pattern analysis in validating an incoming transaction. In some embodiments, the receiver processor server 140b may also utilize machine learning to provide dynamic (i.e., real-time and/or near real-time) fraud and risk management, including fraud/risk scoring. The receiver processor server 140b may collect many different data points per account holder/client and transaction which may be aggregated in a centralized database. This data may be secured and augmented with third-party data. Machine-learning models may be applied to analyze the data and assign a risk score (e.g., from 1-100, based on increasing risk). This risk score may allow the receiver processor server 140b to further analyze/determine whether a transaction should be authorized or rejected. This score may also allow the receiver processor server 140b to determine what risk management actions it may take with an account holder/client, including but not limited to lending and underwriting as well as fraud monitoring and prevention. In some instances, the risk score may be dynamic because the machine-learning models may run continuously and may be constantly refining themselves based on the latest data inputs.

In particular embodiments, after data verification 416, a verification response 418 may be provided to the receiver processor API 140a. The receiver processor API 140a may further transmit the verification response via API 420 to the account processor server 120a. In particular embodiments, the transaction approve/decline response via API 422 may be returned to the receiver processor API 140a. The receiver processor API 140a may then convert the transaction response 424 for the receiver processor server 140b.

In particular embodiments, after the receiver processor server 140b or account processor server 120a determines from the transaction data that the commerce entity 115 is not the commerce entity 115 identified by the tag stored in the record for the card number, as indicated in the account profiles 140c, the receiver processor server 140b or account processor server 120a may then return a rejection/decline indicator message. It should be noted that the card owner's true and accurate information may be submitted for verification, but the transaction may still be declined. A bad actor, such as a hacker, may be able to steal enough accurate data about the card/bank account from its owner to be capable of submitting the requisite information. The payment, however, may be rejected when the transaction data for the commerce entity 115 is not matched to the tag associated with the card number under scrutiny.

In particular embodiments, after the receiver processor server 140b or account processor server 120a determines from the transaction data that the commerce entity 115 is the commerce entity 115 identified by the tag stored in the record for the card number, as indicated in the account profiles 140c, the receiver processor server 140b or account processor server 120a may then return an approval indicator message.

In particular embodiments, the receiver processor server 140b may send the transaction verification response 426 via the payment network 135 to the originator processor 125. The originator processor 125 may optionally initiate completion of transaction 428. In particular embodiments, the payment network 135 may send an advice message 430 to the receiver processor server 140b, which may process the advice message 432. The receiver processor server 140b may send the approved response 434 to the payment network 135. In particular embodiments, the payment network 135 may generate an advice message 438 based on the approved response 434 and send it to the originator processor 125. The originator processor 125 may send the transaction submission response 440 to the commerce entity 115. The commerce entity 115 may then return the transaction payment information and purchase response 442 to the account holder 105.

In particular embodiments, while sending the approved response 434 to the payment network 135, the receiver processor server 140b may generate a clearing message 436 for the receiver processor API 140a. The receiver processor API 140a may send the clearing message via API 444 to the account processor server 120a. The account processor server 120a may then acknowledge via API 446 the receipt of the clearing message.

Permission-Based Virtual Bank Account (VBAN) Payments

In particular embodiments, the receiver processor 140 may provide a dynamic and customizable development platform for implementing VBAN solutions to decouple a user's root account, including stored value balances for the root account, from publicly routable account credentials. The user may be, for example, an account holder 105, an enterprise client, or employees of an enterprise client. In particular embodiments, the receiver processor 140 may decouple a user's root account credentials from publicly routable account credentials with a virtual bank account (VBAN) having a Payment Account Number (PAN). Although this disclosure refers to VBAN throughout, this disclosure contemplates any suitable means of decoupling a user's root account credentials from publicly routable account credentials. The receiver processor 140 may allow VBANs to fully participate in financial interchange networks and clearing houses by sending and receiving payments or transactions. By utilizing permission-based VBANs customized for user-specific use cases, the receiver processor 140 may facilitate real-time payments or transactions (as opposed to, e.g., simply caching funds) while protecting sensitive financial information, shielding users against fraud and overbilling, and ensuring that each approved transaction conforms to specific parameters applicable to that transaction. Although this disclosure describes implementing VBANs by particular processors in a particular manner, this disclosure contemplates implementing VBANs by any suitable processor in any suitable manner.

In particular embodiments, the receiver processor 140 may receive, from an external server, a transaction authorization request to authorize a transaction associated with a transfer of resources to a receiving entity from a user. The receiver processor 140 may then retrieve, from an associated database, a transaction resource configuration of a VBAN for transactions associated with the receiving entity and the user. In particular embodiments, the receiver processor 140 may create a new VBAN and a transaction resource configuration for the newly created VBAN. In particular embodiments, the transaction resource configuration may be decoupled from an external resource account associated with the user and the VBAN. The receiver processor 140 may then determine whether one or more parameters of the transaction resource configuration are satisfied based on metadata associated with the transaction authorization request. The receiver processor 140 may further transmit, to the external server, responsive to determining whether the one or more parameters of the transaction resource configuration are satisfied, a transaction authorization response indicating whether the transaction is authorized. In particular embodiments, the transaction being authorized may cause a stored value balance associated with the external resource account to be reduced based on the transfer of resources associated with the transaction.

A traditional bank account may have publicly routable account credentials, including a routing number, an account number, and a stored value balance. A traditional bank account may allow the account holder to send and receive transactions (e.g., ACH, wire, ATM withdrawal, etc.). A traditional bank account may also enable the account holder to display a list of previous transactions. A traditional bank account may be accessed by one or more account holders. Different from a traditional bank account, a VBAN may decouple the concept of stored value balance from publicly routable account credentials. For example, a VBAN may shield a user's root account's credentials and stored value balances from being transmitted to other entities for a given transaction (e.g., a merchant, an issuing bank, a financial interchange network or clearing house). As a result, the embodiments disclosed herein may have a technical advantage of protecting sensitive financial information of a user.

VBANs, the transaction authorization requests may be allowed to go through. If a particular preset constraint or a threshold number of preset constraints are violated, the receiver processor 140 may automatically reject the corresponding transaction authorization request.

In particular embodiments, the receiver processor 140 may receive an indication that the user has requested a VBAN to be generated for transactions associated with the receiving entity. As an example and not by way of limitation, the account holder 105 or the account processor 120 may be the user and may request the receiver processor 140 to either issue a new VBAN or identify an existing VBAN. The request may be received at the receiver processor 140 via the API 140a. In particular embodiments, the receiver processor 140 may generate, determine, receive, and/or retrieve specific parameters associated with the VBAN when issuing a new VBAN. The receiver processor 140 may retrieve specific parameters associated with the VBAN when retrieving an existing VBAN.

In particular embodiments, the new VBAN or existing VBAN may be associated with the account holder 105 or the account processor 120. The new VBAN or existing VBAN may also be associated with a receiving entity, e.g., a commerce entity 115. In particular embodiments, the VBAN may have a transaction resource configuration specifying whether the VBAN is authorized for single-use, multi-use, or unlimited use.

In particular embodiments, the transaction resource configuration may comprise a stored value balance associated with the VBAN. The transaction resource configuration may be configured to access a stored value balance of a quantity of available resources in the external resource account (i.e., a root bank account). In particular embodiments, a user may provision zero or more VBANs that may be associated with, and draw resources from, a primary external resource account. In particular embodiments, one or more additional external resource accounts may be associated with VBANs provisioned by the user. In particular embodiments, the primary external resource account may take precedence over the one or more additional external resource accounts. In particular embodiments, one or more of the external resource accounts may be associated with a financial interchange network or an automated clearing house. Each VBAN may have preset parameters (e.g., entitlements, constraints, etc.) that define the behavior and circumstances in which it is authorized to conduct particular transactions.

TABLE 7

Example VBAN parameters.

| Name | Example |
| --- | --- |
| Allowed transaction types | Only allow ACH and wire transfer |
| Allowed receiving entities | Only allow ACME Co. to submit transactions |
| Maximum transaction amount | Allow transactions up to $100 |
| Maximum monthly transaction velocity | Allow transactions up to $500 per month |

Many businesses may not allow remotely originated debits to their bank accounts. Instead, a designated professional (e.g., a controller) may login to their bank portal and push out payments to all debit requesters, which may be inefficient. By contrast, VBANs may enable the receiver processor 140 to streamline payments or transactions by allowing for the receipt of transaction authorization requests. If received transaction authorization requests conform to preset parameters (e.g., entitlements, constraints, etc.) of the In particular embodiments, the one or more parameters of the transaction resource configuration may comprise one or more of an identifier associated with the receiving entity, an identifier associated with a plurality of receiving entities, a category of receiving entities, or a geographic identifier associated with the receiving entity. As an example and not by way of limitation, the identifier associated with the receiving entity may correspond to an allowed receiving entity (e.g., a specific merchant). As another example and not by way of limitation, the category of receiving entities may indicate the merchant type, e.g., restaurant, retailer, and beauty, etc. As yet another example and not by way of limitation, the geographic identifier associated with the receiving entity may indicate a geographic location of the receiving entity. In particular embodiments, the geographic identifier may be based on a postal code, a street address, a state, a region, or a country. As an example and not by way of limitation, the geographic identifier for a country may be based on country name, country code, or country abbreviation.

In particular embodiments, the one or more parameters of the transaction resource configuration may comprise one or more of a specified number of authorized transactions, a specified quantity of resources authorized for a single transaction, or a specified total quantity of resources authorized for a plurality of transactions. As an example and not by way of limitation, the specified number of authorized transactions may indicate a number of allowed transactions for a specific allowed receiving entity, e.g., single-use, multi-use, or unlimited use. In particular embodiments, the specified number of authorized transactions may be the number of transactions authorized for a specified period of time, e.g., a day, a week, or a month. As another example and not by way of limitation, the specified quantity of resources authorized for a single transaction may indicate a spending limit, e.g., 1000 US dollars for a single transaction. As yet another example and not by way of limitation, the specified total quantity of resources authorized for a plurality of transactions may indicate a periodic spending limit (e.g., 50,000 US dollars for a month) for a VBAN within a month.

In particular embodiments, the transaction resource configuration may be generated based on a customized transaction schema associated with a payment processor. As an example and not by way of limitation, the payment processor may be an enterprise client of the receiver processor 140. The payment processor may be associated with the account processor 120 and may issue VBANs and cards associated with VBANs to account holders 105. In particular embodiments, the customized transaction schema may be generated based on one or more customized schema parameters received from the payment processor.

In particular embodiments, the transfer of resources may comprise a payment to the receiving entity by the user. Accordingly, the one or more parameters may comprise one or more of a type of payment, a type of currency, or a type of transaction. As an example and not by way of limitation, the type of payment may include ACH, interchange, etc. As another example and not by way of limitation, the type of currency may be US dollars, Euros, Japanese Yen, or a type of cryptocurrency. As another example and not by way of limitation, the type of transactions may include cash, non-cash, or credit.

In particular embodiments, one or more of the parameters of the transaction resource configuration may be specified by the user. As an example and not by way of limitation, the user (e.g., payer 105 or payer processor 120) may provide the parameters to the receiver processor 140, e.g., via the API 140*a*. In particular embodiments, one or more of the parameters of the transaction resource configuration may be default parameters specified by a processing entity associated with the VBAN. As an example and not by way of limitation, the receiver processor 140 may be a processing entity and may specify default parameters for VBANs. As another example and not by way of limitation, the account processor 120 may be a processing entity and may specify default parameters for VBANs. In particular embodiments, one or more of the parameters of the transaction resource configuration may be specified by a payment processor associated with the external resource account, e.g., via the API 140*a*. As an example and not by way of limitation, a receiver institution 145 may specify one or more of the parameters of the transaction resource configuration to the receiver processor 140.

In particular embodiments, the receiver processor 140 may determine, based on one or more machine-learning models trained on historical transaction data, one or more of the parameters of the transaction resource configuration. Such machine-learning models may be able to determine and update the parameters responsive to each request for transaction authorization or account generation. In particular embodiments, the receiver processor 140 may dynamically update the parameters based on various factors. As an example and not by way of limitation, the receiver processor 140 may update, based on contextual data (e.g., location or time) associated with one or more transactions associated with the VBAN, one or more of the parameters of the transaction resource configuration. As another example and not by way of limitation, updating the parameters may be based on requests from the account processor 120 and/or transaction data associated with the VBAN.

Figure 5:
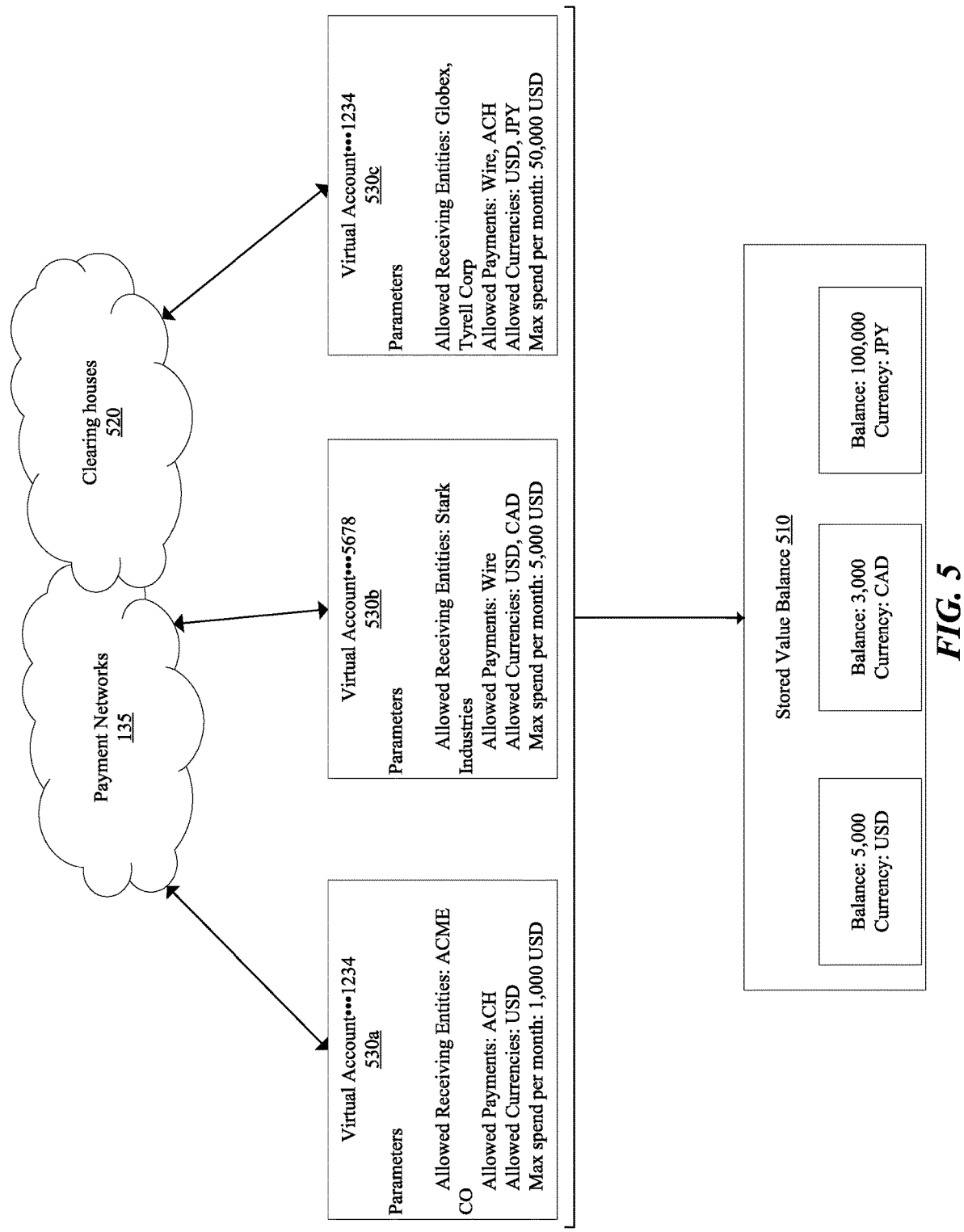
FIG. 5 illustrates an example decoupling of routable account credentials from a stored value balance.

FIG. 5 illustrates an example decoupling of routable account credentials from a stored value balance. As illustrated in FIG. 5, the stored value balance 510 may comprise 5,000 US dollars, 3,000 Canadian dollars, and 100,000 Japanese yen. In particular embodiments, the stored value balance 510 may be shielded from entities involved in a transaction (e.g., merchants, public payment networks 135, and clearing houses 520) by the VBANs 530. In particular embodiments, VBANs 530 may provide publicly routable account credentials that may be used to send and receive transactions over existing payment networks 135. As an example and not by way of limitation, there may be three VBANs 530 associated with the stored value balance 510. The VBANs 530 may have preset parameters based on, for example, allowed receiving entities, allowed payment limits, allowed currencies, and allowed maximum spending limits over a specified period of time (e.g., a month). As an example and not by way of limitation, the allowed receiving entities for the first VBAN 530*a* may comprise ACME CO; the allowed payments for the first VBAN 530*a* may comprise ACH; the allowed currencies for the first VBAN 530*a* may comprise US dollars; and the max spend per month for the first VBAN 530*a* may be 1,000 US dollars. As another example, the allowed receiving entities for the second VBAN 530*b* may comprise Stark Industries; the allowed payments for the second VBAN 530*b* may comprise wire transfer; the allowed currencies for the second VBAN 530*b* may comprise US dollars and Canadian dollars; and the max spend per month for the second VBAN 530*b* may be 5,000 US dollars (or equivalent Canadian dollars). As yet another example, the allowed receiving entities for the third VBAN 530*c* may comprise Globex and Tyrell Corp; the allowed payments for the third VBAN 530*c* may comprise wire transfer and ACH; the allowed currencies for the third VBAN 530*c* may comprise US dollars and Japanese yen; and the max spend per month for the third VBAN 530*c* may be 50,000 US dollars (or equivalent Japanese yen). Each of the VBANs 530 may maintain zero balance. Each of the VBANs 530 may draw from the stored value balance 510 if the payment conforms to the corresponding VBAN's 530 parameters or the account holder 105 or account processor 120 associated with the corresponding VBAN 530 provides explicit authorization.

Figure 6:
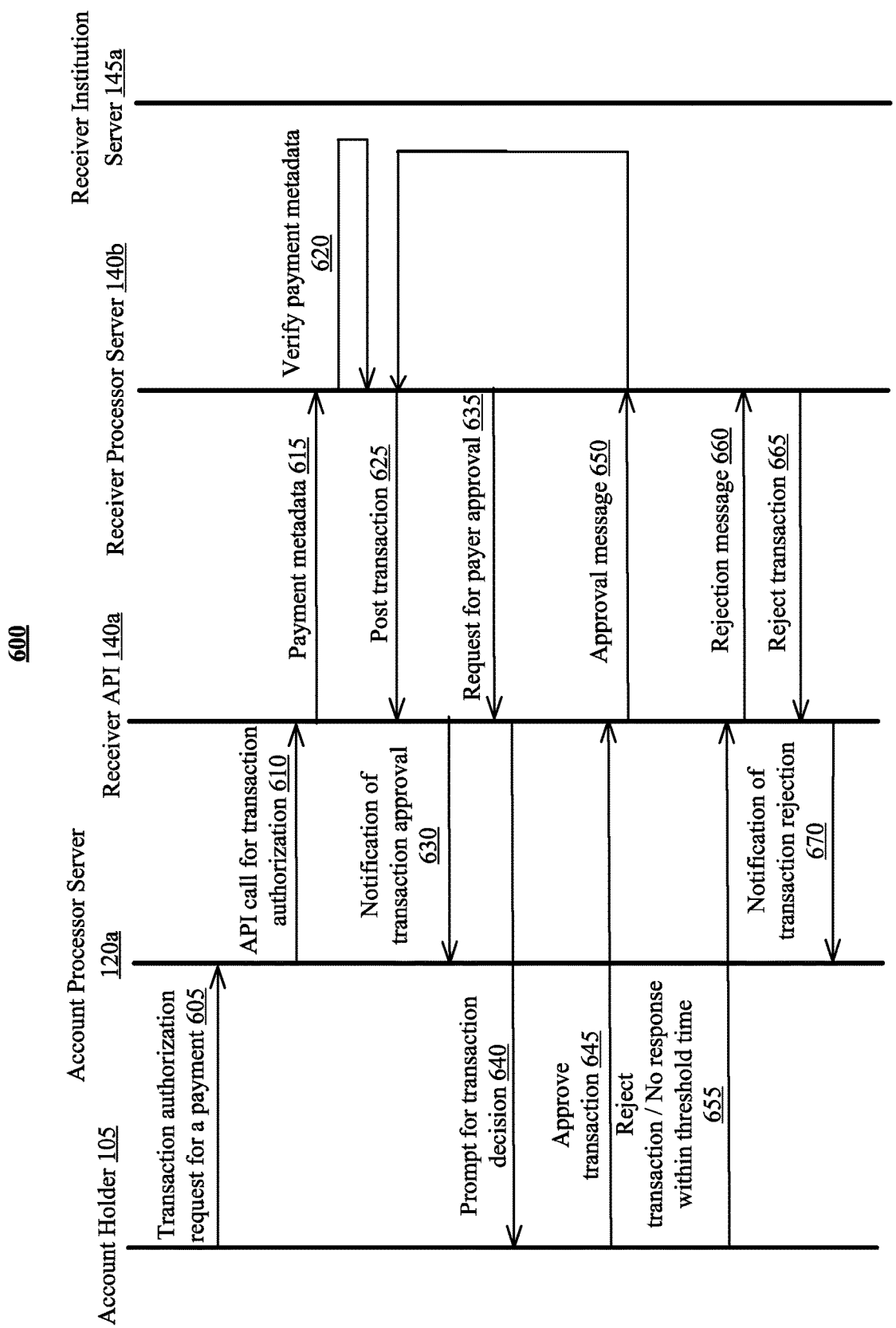
FIG. 6 illustrates an example flow diagram of processing a transaction authorization request on a VBAN.

FIG. 6 illustrates an example flow diagram 600 of processing a transaction authorization request on a VBAN. In particular embodiments, the receiver processor 140 may receive a transaction authorization request for a payment to a receiving entity from a user. As an example and not by way of limitation, the transaction authorization request may comprise a payment transaction request via ACH, wire transfer, etc. The transaction authorization request may be received via an application programming interface (API) 140a. As illustrated in FIG. 6, payer 105 may initiate a transaction authorization request for a payment 605, which may be transmitted to the account processor server 120a. The account processor server 120a may generate an API call for transaction authorization 610 via the receiver processor API 140a.

In particular embodiments, the receiver processor API 140a may send the payment metadata 615 associated with the transaction request to the receiver processor server 140b. The receiver processor server 140b may then verify payment metadata 620 in response to determining the payment transaction request should be verified. As a result, the embodiments disclosed herein may have a technical advantage of ensuring that each approved transaction conforms to specific parameters applicable to that transaction. In particular embodiments, the receiver processor server 140b may verify payment metadata by processing the metadata associated with the payment transaction request against the parameters associated with the VBAN. As an example and not by way of limitation, the receiver processor server 140b may compare the payment metadata against the parameters of the VBAN. As an example and not by way of limitation, verifying payment metadata may comprise determining whether the receiving entity is authenticated, e.g., based on a comparison between the allowed receiving entity associated with the VBAN and the receiving entity. As another example and not by way of limitation, the receiver processor server 140b may verify whether the transaction amount is within the pre-configured limits (e.g., per transaction amount, per receiving entity monthly limit, etc.) based on a comparison between the allowed transaction amount associated with the VBAN and the transaction amount associated with the payment transaction request. In particular embodiments, the receiver processor server 140b may compare the requested payment value against the available stored value balance associated with the VBAN to make sure that is sufficient for completing the payment transaction. In particular embodiments, the receiver processor server 140b may use one or more machine-learning models to verify payment metadata. As an example and not by way of limitation, the machine-learning models may be trained based on historical transaction data. Such machine-learning models may be able to verify payment metadata responsive to each payment transaction. Utilizing machine-learning models trained based on historical transaction data to verify metadata may be an effective solution for addressing the technical challenge of effectively verifying metadata associated with a transaction to a virtual bank account. The machine-learning models may be configured to characterize and evaluate whether transactions should be authorized.

In particular embodiments, the receiver processor server 140b may further use one or more machine-learning models, e.g., a risk model, to identify fraudulent transactions that otherwise satisfy parameters of a VBAN, thereby achieving risk/fraud controls. The receiver processor server 140b may determine, based on a risk model for determining whether a transaction is fraudulent, a likelihood that the transaction authorization request is fraudulent. The receiver processor server 140b may then transmit, based on the likelihood that the transaction authorization request is fraudulent, a transaction authorization response indicating that the transaction is not authorized. In particular embodiments, the likelihood that the transaction authorization request is fraudulent may be determined based on one or more patterns identified in metadata associated with one or more previous fraudulent transactions. As an example and not by way of limitation, the risk model may search for transaction patterns that indicate high-risk usage (credit or otherwise) or attempts to defraud. Utilizing a transaction risk model trained based on patterns identified in metadata of previous fraudulent transactions, in which the identified patterns are correlated with high-risk usage or fraudulent transactions or attempted transactions, may be an effective solution for addressing the technical challenge of effective risk/fraud controls. In particular embodiments, the receiver processor server 140b may reduce fraud or erroneous billing by declining the transaction. As a result, the risk/fraud control may be considered a firewall on top of the user's account with stored value balance. As a result, the embodiments disclosed herein may have a technical advantage of the receiver processor 140 implementing risk/fraud controls to shield users against fraud by using a transaction risk model to identify fraudulent transactions that otherwise satisfy parameters of a VBAN.

If the verification is successful, the receiver processor 140 may post the transaction 625 using the VBAN. In particular embodiments, the receiver institution server 145a may be uninvolved during the process of verifying payment metadata 620 and posting transaction 625. In other words, the receiver processor server 140b may bypass the receiver institution server 145a. The account processor server 120a may then receive, via the receiver processor API 140a, a notification of transaction approval 630. If the verification is failed, the receiver processor server 140b may generate a request for payer approval 635. The receiver processor API 140a may then generate a prompt for transaction decision 640, which is directed to the account holder 105. The prompt may ask if they would like to approve the transaction for the payment or reject the transaction for the payment. If account holder 105 approves transaction 645, the receiver processor API 140a may generate an approval message 650 accordingly. The receiver processor server 140b may then post the transaction 625 using the VBAN. If account holder 105 rejects transaction or does not respond to the approval request within a threshold amount of time 655, the receiver processor API 140a may generate a rejection message. Responsive to the rejection message 660, the receiver processor server 140b may reject the transaction at 665. The receiver processor API 140a may further send a notification of transaction rejection 670 to the account processor server 120a.

In particular embodiments, the VBANs may enable the receiver processor 140 to provide cross selling or marketing by shifting the data flow onto VBANs from card-based transactions. VBANs may be applied to a variety of use cases. One example use case may include enabling neobanks that don't already have a card issuance system to issue virtual bank accounts to their customers. Another example use case may be the service industry, where companies may have to deal with frequent transactions with different receiving entities. For example, a food delivery company may issue cards associated with VBANs to its delivering staff so that they can use these cards to pay the restaurants when picking up food orders. Another example use case may include spending limit or expense management platforms, where an administrator may conveniently control the spending limit or expenses via the VBANs issued to different employees. Another example use case may be niche industries. For example, a company handling car warranties or claims may issue its customers VBANs so that they can easily submit claims via these VBANs.

In particular embodiments, the receiver processor 140 may store real-time transaction data associated with transactions in a set of first transaction entries. The set of first transaction entries may additionally comprise real-time transaction data associated with one or more additional transactions for a specified time period (e.g., last week or last month). The receiver processor 140 may then receive, from the external server, one or more network reporting files comprising historical transaction data associated with the transaction and the one or more additional transactions for the specified time period. In particular embodiments, the receiver processor 140 may identify, from the set of first transaction entries and a set of second transaction entries derived from the historical transaction data, one or more identical pairs of a first transaction entry and a second transaction entry. For each identical pair, the first transaction entry and second transaction entry may be excluded from a remaining set of first transaction entries and a remaining set of second transaction entries, respectively. The receiver processor 140 may then identify, for each of one or more matching cycles, from the remaining set of first transaction entries and the remaining set of second transaction entries, one or more matching pairs of a first transaction entry and a second transaction entry. In particular embodiments, each matching pair may be identified based on a determination that a confidence metric for the matching pair is greater than a confidence threshold associated with the matching cycle. For each matching pair, the first transaction entry and second transaction may be excluded from the remaining set of first transaction entries and the remaining set of second transaction entries, respectively. The receiver processor 140 may further analyze, subsequent to the one or more matching cycles, the remaining set of first transaction entries and the remaining set of second transaction entries to identify a set of incongruous transaction entries and determine one or more remediations for one or more of the incongruous transaction entries.

FIG. 7 illustrates an example method 700 for processing VBAN based transaction authorization requests. The method may begin at step 710, where the receiver processor 140 may receive, from an external server, a transaction authorization request to authorize a transaction associated with a transfer of resources to a receiving entity from a user, wherein the transaction authorization request is received via an application programming interface (API 140*a*), and wherein the transfer of resources comprises a payment to the receiving entity by the user. At step 720, the receiver processor 140 may retrieve, from a VBAN database, a VBAN comprising a transaction resource configuration for transactions associated with the receiving entity and the user, wherein the transaction resource configuration is decoupled from an external resource account associated with the user and the VBAN, wherein the transaction resource configuration comprises a stored value balance associated with the VBAN, wherein the transaction resource configuration is configured to access a stored value balance of a quantity of available resources in the external resource account, wherein the external resource account is further associated with a financial interchange network or an automated clearing house, and wherein one or more additional VBANs are associated with the external resource account. At step 730, the receiver processor 140 may determine whether one or more parameters of the transaction resource configuration are satisfied based on metadata associated with the transaction authorization request, wherein the one or more parameters of the transaction resource configuration comprise one or more of a type of payment, a type of currency, a type of transaction, an identifier associated with the receiving entity, an identifier associated with a plurality of receiving entities, a category of receiving entities, a geographic identifier associated with the receiving entity, a specified quantity of resources authorized for a single transaction, a specified total quantity of resources authorized for a plurality of transactions, or a specified number of authorized transactions being the number of transactions authorized for a specified period of time, wherein one or more of the parameters of the transaction resource configuration are specified by the user or a payment processor associated with the external resource account, and wherein one or more of the parameters of the transaction resource configuration are default parameters specified by a processing entity associated with the VBAN. At step 740, the receiver processor 140 may transmit, to the external server, responsive to determining whether the one or more parameters of the transaction resource configuration are satisfied, a transaction authorization response indicating whether the transaction is authorized, wherein the transaction being authorized causes a stored value balance associated with the external resource account to be reduced based on the transfer of resources associated with the transaction. At step 750, the receiver processor 140 may update, based on contextual data associated with one or more transactions associated with the VBAN, one or more of the parameters of the transaction resource configuration. Particular embodiments may repeat one or more steps of the method of FIG. 7, where appropriate. Although this disclosure describes and illustrates particular steps of the method of FIG. 7 as occurring in a particular order, this disclosure contemplates any suitable steps of the method of FIG. 7 occurring in any suitable order. Moreover, although this disclosure describes and illustrates an example method for processing VBAN based transaction authorization requests including the particular steps of the method of FIG. 7, this disclosure contemplates any suitable method for processing VBAN based transaction authorization requests including any suitable steps, which may include all, some, or none of the steps of the method of FIG. 7, where appropriate. Furthermore, although this disclosure describes and illustrates particular components, devices, or systems carrying out particular steps of the method of FIG. 7, this disclosure contemplates any suitable combination of any suitable components, devices, or systems carrying out any suitable steps of the method of FIG. 7.

Dynamic Authorization for Virtual Bank Account Verification Failures

In particular embodiments, the receiver processor 140 may prompt a user associated with a transaction authorization request (e.g., a payment receiver) to authorize a transaction (e.g., payment) request responsive to a verification failure of the transaction request. For example, the verification failure may be based on one or more authorization parameters of a transaction resource configuration for a VBAN. The verification failure may be determined based on an analysis of the metadata associated with the transaction authorization request. Correspondingly, the receiver processor 140 may send a real-time prompt (e.g., a text, a voice message, an automatic phone call, an email, etc.) to the user to authorize the transaction request. In this way, the receiver processor 140 may prevent authentic and legitimate transaction requests from being rejected, while users may still benefit from the protections and efficiencies provided by the VBANs. Although this disclosure describes providing particular authorizations for particular verification failures in particular manners, this disclosure contemplates providing any suitable authorizations for any suitable verification failures in any suitable manner.

In particular embodiments, the receiver processor 140 may receive, from an external server, a transaction authorization request to authorize a transaction associated with a transfer of resources to a receiving entity from a user. The receiver processor 140 may then retrieve, from a VBAN database, a transaction resource configuration of a VBAN associated with the receiving entity and the user. In particular embodiments, the receiver processor 140 may create a new VBAN and a transaction resource configuration for the newly created VBAN. In particular embodiments, the transaction resource configuration may be decoupled from an external resource account associated with the user and the VBAN. The receiver processor 140 may determine that one or more parameters of the transaction resource configuration are not satisfied based on metadata associated with the transaction authorization request. The receiver processor 140 may further transmit, to a client device associated with the user, instructions for presenting a notification indicating a transaction authorization failure. In particular embodiments, the notification may comprise an interactive prompt operable for receiving an input indicating whether the transaction authorization request should be authorized. The receiver processor 140 may transmit, to the external server, responsive to receiving the input from the client device associated with the user, a transaction authorization response indicating whether the transaction is authorized. In particular embodiments, the transaction being authorized may cause a stored value balance associated with the external resource account to be reduced based on the transfer of resources associated with the transaction.

As previously described in FIG. 6, the receiver processor 140 may receive a transaction authorization request to authorize a transaction associated with a transfer of resources to a receiving entity from a user at step 610. The transaction authorization request may be received via an application programming interface (API 140*a*).

In particular embodiments, the one or more parameters of the transaction resource configuration may comprise one or more of an identifier associated with the receiving entity, a category of entities associated with the receiving entity, a geographic identifier associated with the receiving entity, a digital identifier associated with the receiving entity, a specified number of authorized transactions, a specified quantity of resources authorized for each transaction, or a specified total quantity of resources authorized for a plurality of transactions. As an example and not by way of limitation, the identifier associated with the receiving entity may correspond to an allowed receiving entity. As another example and not by way of limitation, the category of entities may indicate the merchant type, e.g., restaurant, retailer, and beauty, etc. As yet another example and not by way of limitation, the geographic identifier associated with the receiving entity may indicate the location. In particular embodiments, the geographic identifier may be based on postal code, detailed street address, country. As an example and not by way of limitation, the geographic identifier for a country may be based on country name, country code, or country abbreviation. As yet another example and not by way of limitation, the digital identifier associated with the receiving entity may be a number or a code. As yet another example and not by way of limitation, the specified number of authorized transactions may indicate, for a specific allowed receiving entity, how many times the VBAN could be used in authorized transactions, e.g., single-use, multi-use, or unlimited-use. In particular embodiments, the specified number of authorized transactions may be the number of transactions authorized for a specified period of time, e.g., a day, a week, or a month. As yet another example and not by way of limitation, the specified quantity of resources authorized for each transaction may indicate a spending limit, e.g., 1000 US dollars for each transaction. As yet another example and not by way of limitation, the specified total quantity of resources authorized for a plurality of transactions may indicate a periodic spending limit (e.g., 50,000 US dollars for a month) for VBAN transactions within a month.

In particular embodiments, the transaction resource configuration may be generated based on a customized transaction schema associated with a payment processor. As an example and not by way of limitation, the payment processor may be an enterprise client of the receiver processor 140. The payment processor may be associated with the account processor 120 and may issue VBANs and cards associated with VBANs to account holders 105. In particular embodiments, the customized transaction schema may be generated based on one or more customized schema parameters received from the payment processor.

In particular embodiments, the transfer of resources may comprise a payment to the receiving entity by the user. Accordingly, the one or more parameters may comprise one or more of a type of payment, a type of currency, or a type of transaction. As an example and not by way of limitation, the type of payment may include ACH, interchange, etc. As another example and not by way of limitation, the type of currency may be US dollars, Euros, or Japanese Yen. As another example and not by way of limitation, the type of transactions may include cash, non-cash, or credit.

During the payment metadata verification at step 620, the receiver processor 140 may determine that one or more of the verification conditions are not satisfied. The receiver processor 140 may further determine, based on the determination that one or more parameters of the transaction resource configuration are not satisfied, that the transaction authorization request may require one or more explicit authorizations to be authorized. In alternative embodiments, the receiver processor 140 may determine, based on a risk model for determining whether a transaction is fraudulent, a likelihood that the transaction authorization request is fraudulent. The likelihood that the transaction authorization request is fraudulent may be determined based on one or more patterns identified in metadata associated with one or more previous fraudulent transactions. As an example and not by way of limitation, the risk model may search for transaction patterns that indicate high-risk usage (credit or otherwise) or attempts to defraud. Accordingly, the instructions for presenting a notification indicating the transaction authorization failure may be transmitted based on the likelihood that the transaction authorization request is fraudulent.

In particular embodiments, the one or more explicit authorizations may comprise an explicit authorization by the user. As an example and not by way of limitation, an unsatisfied verification condition may be an unverified merchant (e.g., a merchant who may have changed its name), and the receiver processor 140 may determine to prompt a user for explicit authorization of a payment request from the receiving entity. In particular embodiments, the one or more explicit authorizations may comprise an explicit authorization by a processing entity associated with the VBAN. As an example and not by way of limitation, the account processor 120 may be a processing entity and provide the explicit authorization.

In particular embodiments, the receiver processor 140 may push a transaction failure notification to a device of the user, asking for explicit authorization. As an example and not by way of limitation, at step 640 in FIG. 6, the receiver processor 140 may prompt the user if they would like to approve the transaction. In particular embodiments, the notification may comprise one or more of a text message, a voice message, a notification within an application, an automated phone call, or an electronic mail.

In particular embodiments, the interactive prompt comprised in the notification may be operable for receiving an input indicating whether the transaction authorization request should be authorized. If the input specifies the transaction authorization request should be authorized, the type of explicit authorization may be considered a single exception. With single exception, the receiver processor 140 may only authorize the current transaction request. In particular embodiments, the interactive prompt may be further operable for receiving an input indicating whether one or more future transaction authorization requests associated with the transaction authorization request should be approved. In one embodiment, the input may specify a number (e.g., three) of future transaction authorization requests that should be approved. In another embodiment, the input may specify a period of time (e.g., one week) associated with the future transaction authorization requests that should be approved. For both these embodiments, the type of explicit authorization may be considered limited exceptions. With limited exceptions, the receiver processor 140 may authorize the specified number of future transaction requests or the future transaction requests within the specified period of time. In particular embodiment, the input may specify that all future transaction authorization requests should be approved, for which the receiver processor 140 may authorize all future transaction requests. As a result, the embodiments disclosed herein may have a technical advantage of preventing authentic and legitimate transaction requests from being rejected while still enabling users to benefit from the protections and efficiencies provided by the VBANs.

In particular embodiments, the type of the interactive prompt may be customized. As an example and not by way of limitation, the receiver processor 140 may use one or more machine-learning models to customize the type of the interactive prompt based on prior responses from the user. As an example and not by way of limitation, if the prior responses from the user were always approving the transaction requests just for once, the machine-learning models trained based on these responses may help the receiver processor 140 determine to prompt the user to only approve the transaction request for once or reject it.

In particular embodiments, the interactive prompt may be customized based on the metadata associated with the transaction authorization request. As an example and not by way of limitation, the metadata may comprise the total amount of the transaction, the time of the transaction, or the location of the receiving entity. For instance, if the total amount is smaller than a threshold amount, e.g., 500 US dollars, the receiver processor 140 may push the interactive prompt to the user. But if the total amount is larger than the threshold amount, the issuer processor may not push the interactive prompt but just decline the transaction request. As another example, if the time of the transaction is between 10 pm and 7 am, the receiver processor 140 may not push the interactive prompt but just decline the transaction request. But if the time is not between 10 pm and 7 am, the receiver processor 140 may push the interactive prompt to the user. As yet another example, if the location of the receiving entity is within the country where the user is located at, the receiver processor 140 may push the interactive prompt to the user. But if the location is a different country, the issuer processor may not push the interactive prompt but just decline the transaction request.

In particular embodiments, the interactive prompt may be further customized based on metadata associated with one or more historical transactions associated with the user. As an example and not by way of limitation, the receiver processor 140 may use one or more machine-learning models to selectively push the interactive prompt to the user. The machine-learning models may be trained based on historical transactions associated with the user. As an example and not by way of limitation, if the historical transactions were all based on US dollars, the machine-learning models trained based on them may help the receiver processor 140 determine to prompt the user when a transaction request is suddenly based on Canadian dollars. As another example and not by way of limitation, the machine-learning models may be trained based on other payment receivers' prior responses to various prompts for authorizations. For example, other payment receivers' prior responses may comprise rejections for a particular user. Therefore, the machine-learning models trained based on these responses may help the receiver processor 140 determine not to prompt the user but decline the transaction request instead. Customizing the interactive prompt based on prior responses and metadata associated with the current transaction and historical transactions may be an effective solution for addressing the technical challenge of customizing the interactive prompt for receiving a user's response as these data can reflect the user's preferences and the user's behavior patterns.

In particular embodiments, if the user affirmatively rejects the transaction, the receiver processor 140 may reject the transaction authorization request. If the user explicitly approves the transaction (either temporarily or ongoing for that receiving entity), the receiver processor 140 may post the transaction. In particular embodiments, if the user is non-responsive after a threshold amount of time (e.g., 30 minutes), the receiver processor 140 may reject the transaction authorization request. Specifically, the receiver processor 140 may determine a period of time between transmitting the instructions for presenting the notification and receiving the input from the client device. The receiver processor 140 may then determine that the transaction should not be authorized based on the period of time exceeding a threshold period of time.

In particular embodiments, the receiver processor 140 may store real-time transaction data associated with the transaction in a set of first transaction entries. The set of first transaction entries may additionally comprise real-time transaction data associated with one or more additional transactions for a specified time period (e.g., last week or last month). The receiver processor 140 may then receive, from the external server, one or more network reporting files comprising historical transaction data associated with the transaction and the one or more additional transactions for the specified time period. In particular embodiments, the receiver processor 140 may identify, from the set of first transaction entries and a set of second transaction entries derived from the historical transaction data, one or more identical pairs of a first transaction entry and a second transaction entry. For each identical pair, the first transaction entry and second transaction entry may be excluded from a remaining set of first transaction entries and a remaining set of second transaction entries, respectively. The receiver processor 140 may then identify, for each of one or more matching cycles, from the remaining set of first transaction entries and the remaining set of second transaction entries, one or more matching pairs of a first transaction entry and a second transaction entry. In particular embodiments, each matching pair may be identified based on a determination that a confidence metric for the matching pair is greater than a confidence threshold associated with the matching cycle. For each matching pair, the first transaction entry and second transaction may be excluded from the remaining set of first transaction entries and the remaining set of second transaction entries, respectively. The receiver processor 140 may further analyze, subsequent to the one or more matching cycles, the remaining set of first transaction entries and the remaining set of second transaction entries to identify a set of incongruous transaction entries and determine one or more remediations for one or more of the incongruous transaction entries.

Figure 8:
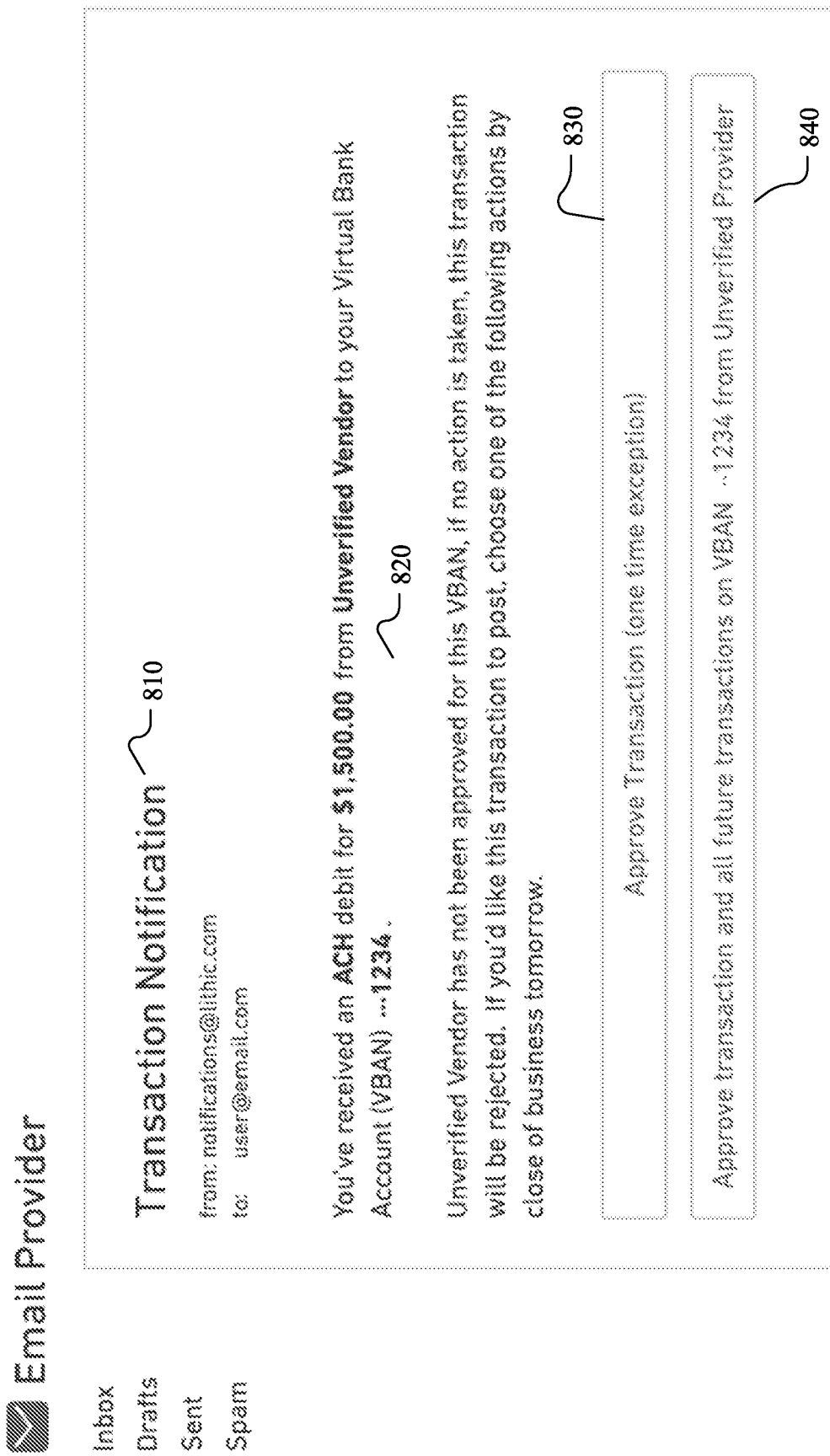
FIG. 8 illustrates an example transaction notification.

FIG. 8 illustrates an example transaction notification 810. In this example, the notification 810 may be an email. The notification 810 may comprise a description 820 of a transaction authorization request and the status of the transaction authorization request. As an example and not by way of limitation, the description 820 may be "you've received an ACH debit for $1,500 from unverified vendor to your virtual bank account (VBAN) 1234. Unverified vendor has not been approved for this VBAN." The notification 810 may further prompt the user if they would like to approve the transaction. As an example and not by way of limitation, there may be two options. One option may be "approve transaction (one time except). 830" If the user selects this option, the receiver processor 140 may approve the transaction authorization request just for this time. In the future if there is another transaction authorization request from this unverified vendor, the receiver processor 140 may still prompt the user to approve or reject the transaction. Another option may be "approve transaction and all future transactions on VBAN 1234 form unverified provider. 840" If the user selects this option, the receiver processor 140 may approve the transaction and any future transactions on VBAN 1234 form this unverified provider without prompting the user anymore.

Figure 9:
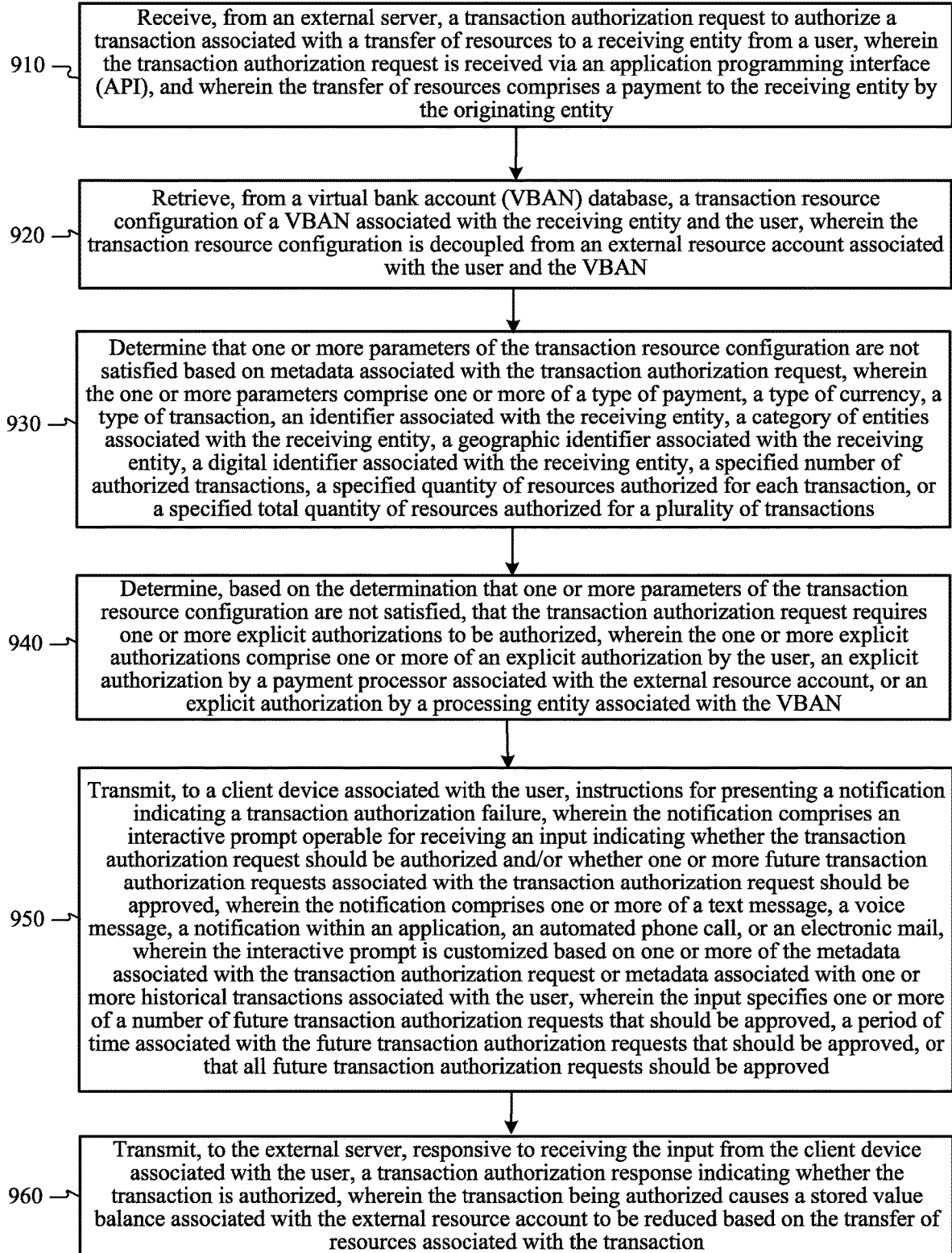
FIG. 9 illustrates an example method for dynamic authorization for virtual bank account verification failures.

FIG. 9 illustrates an example method 900 for dynamic authorization for virtual bank account verification failures. The method may begin at step 910, where the receiver processor 140 may receive, from an external server, a transaction authorization request to authorize a transaction associated with a transfer of resources to a receiving entity from a user, wherein the transaction authorization request is received via an application programming interface (API 140*a*), and wherein the transfer of resources comprises a payment to the receiving entity by the user. At step 920, the receiver processor 140 may retrieve, from a VBAN database, a transaction resource configuration of a VBAN associated with the receiving entity and the user, wherein the transaction resource configuration is decoupled from an external resource account associated with the user and the VBAN. At step 930, the receiver processor 140 may determine that one or more parameters of the transaction resource configuration are not satisfied based on metadata associated with the transaction authorization request, wherein the one or more parameters comprise one or more of a type of payment, a type of currency, a type of transaction, an identifier associated with the receiving entity, a category of entities associated with the receiving entity, a geographic identifier associated with the receiving entity, a digital identifier associated with the receiving entity, a specified number of authorized transactions, a specified quantity of resources authorized for each transaction, or a specified total quantity of resources authorized for a plurality of transactions. At step 940, the receiver processor 140 may determine, based on the determination that one or more parameters of the transaction resource configuration are not satisfied, that the transaction authorization request requires one or more explicit authorizations to be authorized, wherein the one or more explicit authorizations comprise one or more of an explicit authorization by the user, an explicit authorization by a payment processor associated with the external resource account, or an explicit authorization by a processing entity associated with the VBAN. At step 950, the receiver processor 140 may transmit, to a client device associated with the user, instructions for presenting a notification indicating a transaction authorization failure, wherein the notification comprises an interactive prompt operable for receiving an input indicating whether the transaction authorization request should be authorized and/or whether one or more future transaction authorization requests associated with the transaction authorization request should be approved, wherein the notification comprises one or more of a text message, a voice message, a notification within an application, an automated phone call, or an electronic mail, wherein the interactive prompt is customized based on one or more of the metadata associated with the transaction authorization request or metadata associated with one or more historical transactions associated with the user, wherein the input specifies one or more of a number of future transaction authorization requests that should be approved, a period of time associated with the future transaction authorization requests that should be approved, or that all future transaction authorization requests should be approved. At step 960, the receiver processor 140 may transmit, to the external server, responsive to receiving the input from the client device associated with the user, a transaction authorization response indicating whether the transaction is authorized, wherein the transaction being authorized causes a stored value balance associated with the external resource account to be reduced based on the transfer of resources associated with the transaction. Particular embodiments may repeat one or more steps of the method of FIG. 9, where appropriate. Although this disclosure describes and illustrates particular steps of the method of FIG. 9 as occurring in a particular order, this disclosure contemplates any suitable steps of the method of FIG. 9 occurring in any suitable order. Moreover, although this disclosure describes and illustrates an example method for dynamic authorization for VBAN verification failures including the particular steps of the method of FIG. 9, this disclosure contemplates any suitable method for dynamic authorization for VBAN verification failures including any suitable steps, which may include all, some, or none of the steps of the method of FIG. 9, where appropriate. Furthermore, although this disclosure describes and illustrates particular components, devices, or systems carrying out particular steps of the method of FIG. 9, this disclosure contemplates any suitable combination of any suitable components, devices, or systems carrying out any suitable steps of the method of FIG. 9.

Serverless Authorization Stream Access (ASA)

In particular embodiments, the receiver processor 140 may enable users (e.g., enterprise clients associated with the account processors 120) to configure customized transaction authorization schema within the system of the receiver processor 140 via an assisted code deployment schema. Users may deploy code snippets with desired parameters, which may then be integrated and collocated within the working environment of the receiver processor 140 for handling authorization stream access (ASA). By doing so, users may quickly launch authorization systems that utilize the ASA transaction schema and backend infrastructure provided by the receiver processor 140 to avoid undesirable latency experiences over public networks, ensure compliance with payment card industry (PCI) security standards, and eliminate the need to build out authorization schema from the ground up. In particular embodiments, users may have their customized transaction schema implemented without using their own servers. However, in particular embodiments, users may have the ability to utilize their own servers for handling particular aspects of transaction authorizations. Although this disclosure describes customizing particular authorization schemas by particular processors in a particular manner, this disclosure contemplates customizing any suitable authorization schema by any suitable processor in any suitable manner.

In particular embodiments, the receiver processor 140 may receive, from an external server associated with a payment processor, one or more customized schema parameters associated with a request for a customized transaction schema associated with the payment processor. The receiver processor 140 may then retrieve, from a database associated with the receiver processor 140 platform, a pre-configured transaction schema comprising a plurality of pre-configured schema parameters. The receiver processor 140 may further generate the customized transaction schema associated with the payment processor by integrating the customized schema parameters into the pre-configured transaction schema. In particular embodiments, the one or more servers associated with the receiver processor 140 platform may be configured to generate, based on the customized transaction schema, one or more transaction resource configurations. Each transaction resource configuration may be configured for processing one or more transaction authorization requests to authorize one or more respective transactions associated with a transfer of resources to a receiving entity from a user associated with the payment processor. In particular embodiments, the receiver processor 140 may store, in the database associated with the receiver processor 140 platform, the customized transaction schema associated with the payment processor.

In particular embodiments, the API 140*a* of the receiver processor 140 may provide authorization stream access (ASA). The authorization stream access may provide users the ability to make customized transaction approval decisions through an HTTP interface to the ISO 8583 message stream. ASA requests may be delivered as an HTTP POST during authorization. The ASA request body may adhere to the transaction schema of the API 140*a*, with some additional fields added for use in decisioning. A response may be sent with HTTP response code 200 and the approval decision in the response body. This response may be converted by the receiver processor 140 back into ISO-8583 format and forwarded to the network. However, deploying customized authorization logic may be time consuming for users for the following reasons. Firstly, users may need to register a webhook endpoint with the receiver processor 140. Secondly, users may need to build an application on their end that listens for events from the receiver processor 140. Thirdly, any sophisticated schema such as rules-based or that requires history may increase the complexity even more. All in all, it may take a user several weeks if not months to deploy their own authorization schema. Furthermore, having to send a transaction message to the account processor 120 over the public communication network 110*e* may be fraught with complications including added latency to transactions (e.g., up hundreds of milliseconds round trip) and compliance complexity (e.g., users may need to be PCI compliant).

To gain lower latency for better user experience and faster deploy times by deploying code snippets from the servers 140*b* of the receiver processor 140, the receiver processor 140 may provide the assisted code deployment schema to enable users to configure customized transaction authorization schema. Serverless authorization stream access may simplify it for the users to only have to provide business schema instead of setting up infrastructure to receive and respond to the message from the receiver processor 140. In addition, the receiver processor 140 may provide libraries and tools to dynamically authorize transaction requests using machine-learning models based on current and historical transaction data. As a result, the embodiments disclosed herein may have a technical advantage of eliminating the need to build out authorization schema from the ground up as users may utilize the authorization stream access schema and backend infrastructure provided by the receiver processor 140 to deploy customized transaction schema.

In particular embodiments, the one or more customized schema parameters may be received via an application programming interface (API) 140*a* associated with the receiver processor 140 platform. To use the authorization stream access, a user (e.g., a developer associated with the payment processor) may sign into a dashboard via the API 140*a*. The user may deploy functions that handle authorization stream access in the working environment of the receiver processor 140. The deployed functions may be based on the customized schema parameters. In particular embodiments, the customized schema parameters may comprise one or more verification requirements based on transaction metadata associated with each transaction authorization request. As an example and not by way of limitation, the transaction metadata may comprise one or more of a specified type of currency, a specified transaction network, a specified type of transaction, an identifier associated with a transaction, a specified number of authorized transactions, a specified quantity of resources authorized for a single transaction, or a specified total quantity of resources authorized for a plurality of transactions. Accordingly, the verification requirements may comprise one or more of a requirement for the type of currency, a requirement for the transaction network (e.g., VISA™ or MASTERCARD™), a requirement for the type of transaction (e.g., cash or credit), a requirement for the identifier (e.g., merchant ID), a requirement for the number of authorized transactions, a requirement for the quantity of resources authorized for a single transaction (e.g., 1000 US dollars), a requirement for the total quantity of resources authorized for a number of transactions (e.g., total amount of 5000 US dollars for 10 transactions).

In particular embodiments, the customized schema parameters may comprise one or more verification requirements based on location metadata associated with each transaction authorization request. As an example and not by way of limitation, the location metadata may be associated with one or more of a location of a user, a location of a receiving entity, or a location of a transaction. Accordingly, the verification requirements may comprise one or more of a requirement for the location of the user (e.g., in US only), a requirement for the location of a receiving entity (e.g., in North America only), a requirement for the location of the transaction (e.g., in the city where the user lives). The verification requirements may also require that the locations of the user, receiving entity, and/or transaction are the same, e.g., a person is buying something in a physical store of a merchant. As another example and not by way of limitation, the location metadata may comprise one or more of a geographic location, a geographic region, a country, a physical address, or a postal code. Accordingly, the verification requirements may comprise one or more of a requirement for the geographic location (e.g., in a particular municipal district), a requirement for the geographic region (e.g., in Europe only), a requirement for the country (e.g., in Canada only), a requirement for the physical address (e.g., in ABC street), or a requirement for the postal code.

In particular embodiments, the customized schema parameters may comprise one or more verification requirements based on entity metadata associated with each transaction authorization request. The entity metadata may be associated with one or more of a receiving entity (e.g., a commerce entity 115), a user (e.g., an account holder 105), or a payment processor (e.g., an enterprise that issues accounts/cards to account holders 105). In particular embodiments, the entity metadata associated with the receiving entity may comprise one or more of an identifier associated with the receiving entity (e.g., a merchant ID), a digital address associated with the receiving entity (e.g., an IP address of an e-commerce merchant), an identifier associated with a plurality of receiving entities (e.g., a merchant ID of a corporation that has multiple retailer stores), a category of receiving entities (e.g., restaurant or transportation), or a risk score associated with the receiving entity (e.g., the risk score reflecting how likely the receiving entity may be a scam).

In particular embodiments, the entity metadata associated with the user may comprise one or more of a period of time the user has been associated with the payment processor, an age of a digital address (e.g., an IP address) associated with the user, a risk score associated with the user, an identifier associated with the user, or an identifier associated with a plurality of users. As an example and not by way of limitation, the user may be an employee of the payment processor and the period of time may reflect how long the employee has been employed by the payment processor. As another example and not by way of limitation, the risk score may reflect how likely the user may be involved in fraudulent transactions. In particular embodiments, the risk score associated with the user may be based on a risk model for determining a likelihood that a transaction is fraudulent. The risk score associated with the user may be further based on historical risk scores associated with the user for a specified period of time.

Table 8 lists example parameters configured in the customized transaction schema for functions to be deployed. As an example and not by way of limitation, the user may deploy schema related to address verification, merchant locking, country control, fraud risk heuristics (e.g., the payment networks 135 may pass a fraud score that the receiver processor 140 relays to the account processor 120 so that it may reject a payment transaction request if the fraud score is above a threshold score and the transaction amount is above a threshold amount), other business schema arounds amounts, etc. In particular embodiments, the user may deploy a schema that enables them to send back an approval or decline message during the transaction flow. Upon receiving the functions input by the user, the receiver processor 140 may generate user-specific customized transaction schema by incorporating the input functions into the pre-configured transaction schema, e.g., a VBAN implementation.

TABLE 8

Example parameters configured in the customized transaction schema for functions to be deployed.

| | |
|---|---|
| acquirer fee | Fee assessed by the merchant and paid for by the cardholder or account holder. May be zero if no fee is assessed. Rebates may be transmitted as a negative value to indicate credited fees. |
| amount | Authorization amount of the transaction. This may change over time. |
| authorization amount | The base transaction amount plus the acquirer fee field. This may be the amount the account processor 120 should authorize against unless the account processor 120 is paying the acquirer fee on behalf of the cardholder. |
| AVS | Contains address validation (AVS) information entered by the payer to be verified by the account processor 120. |
| card | Debit or credit. May be based on VBAN. |
| created | Date and time when the transaction first occurred. |
| events (issuing) | A list of all events that have modified this transaction. |
| funding | A list of objects that describe how this transaction was funded, with the amount represented. A reference to the funding account for the card hat made this transaction may appear here and the token may match the token for the funding account in the card field. If any promotional credit was used in paying for this transaction, its type may be PROMO. |
| merchant | The receiving entity. |
| merchant amount | The amount that the merchant may receive, denominated in merchant currency and in the smallest currency unit. Note the amount may include acquirer fee, similar to authorization amount. It may be different from authorization amount if the merchant is taking payment in a different currency. |
| merchant currency | ISO 4217 alpha 3 code for the currency of the transaction. |
| POS | Point of sale. |
| settled amount | Amount of the transaction that has been settled. This may change over time. |
| status | AUTHORIZATION, FINANCIAL_AUTHORIZATION, and BALANCE_INQUIRY. It may indicate that this request requires an ASA response body in HTTP 200 |

TABLE 8-continued

Example parameters configured in the customized transaction schema for functions to be deployed.

| | |
|---|---|
| | response. FINANCIAL_AUTHORIZATION may be a final single-message transaction with no subsequent clearing, BALANCE_INQUIRY may be a zero-fund authorization that should prompt a response with the appropriate balance. |
| token | Globally unique identifier. |

In particular embodiments, the receiver processor 140 may provide, to the account processor 120, access to one or more tools or libraries generated by the receiver processor 140 platform. The one or more of the tools or libraries may be configured to execute one or more operations associated with the customized transaction schema. In particular embodiments, the one or more operations may comprise one or more of generating VBANs associated with users, linking external resource accounts to VBANs associated with users, generating reports associated with VBANs and transactions associated with VBANs, modifying an automated processing of repeated transaction authorization requests, or applying one or more risk models for determining a likelihood that a transaction is fraudulent. In particular embodiments, one or more of the risk models may be based on one or more machine-learning models trained on historical transaction data. As an example and not by way of limitation, the account processor 120 may leverage the tools and/or libraries provided by the receiver processor 140 to implement a more sophisticated authorization schema. As an example and not by way of limitation, the account processor 120 may check the transaction history using the tools and/or libraries. In particular embodiments, the receiver processor 140 may provide tools and/or libraries for account processors 120 in their ASA responder to call the APIs 140a where the receiver processor 140 may provide various information such as fraud risk scores. Providing tools or libraries generated by the receiver processor 140 platform that can be easily accessed via the API 140a generated by, implemented by, and/or provided by an issuer processor 140 may be an effective solution for addressing the technical challenge of enabling users to effectively execute operations associated with the customized transaction schema and deploy more sophisticated authorization schema as these tools or libraries may be readily configured for various operations and functions.

In particular embodiments, a user may deploy a schema that enumerates various information associated with a transaction, comprising one or more of point of sale (POS), POS type, method of entry, cardholder status, ASA response result, or AVS response result. Table 9 lists example enumerations for point of sale. The POS type may comprise one or more of ATM, authorization, coupon machine, dial terminal, ecommerce, electronic cash register (ECR), fuel machine, home terminal, magnetic ink character recognition (MICR), off premise, payment, PDA, phone, point, POS terminal, self-service, television, teller, travelers check machine, vending, or voice. The method of entry may comprise one or more of auto entry, bar code, contactless, ecommerce, error keyed, error magnetic stripe, ICC, key entered, magnetic stripe, manual, optical character recognition (OCR), secure cardless, or unspecified. The cardholder status may comprise one or more of deferred billing, installment, mail order, not present, preauthorized, present, reoccurring, or telephone order. Table 10 lists example enumerations of the ASA response result. The AVS response result may comprise one or more of fail, match, matched address only, or matched postal code only.

TABLE 9

Example enumerations for point of sale.

| | |
|---|---|
| terminal.attended | True if a clerk is present at the sale. |
| terminal.on_premise | True if the sale was made at the place of business (v.s. mobile). |
| terminal.operator | The person that is designed to swipe the card, possible values: CARDHOLDER, CARD_ACCEPTOR, ADMINISTRATIVE. |
| terminal.partial_approval_capable | True if the terminal is capable of partial approval. Partial approval is when part of a transaction is approved and another payment must be used for the remainder. Example scenario: A $40 transaction is attempted on a prepaid card with a $25 balance. If partial approval is enabled, $25 can be authorized, at which point the POS will prompt the user for an additional payment of $15. |
| terminal.pin_capability | Status of whether the POS is able to accept PINs, possible values: CAPABLE, INOPERATIVE, NOT_CAPABLE, UNSPECIFIED. |
| terminal.type | POS type. |
| entry_mode.card | Card status, possible values: PRESENT, NOT_PRESENT, PREAUTHORIZED. |
| entry_mode.cardholder | Cardholder status. |
| entry_mode.pan | Method of entry for the PAN. |
| entry_mode.pin_entered | True if the PIN was entered. |

TABLE 10

Enumerations of example ASA response results.

| Decline reason | Description |
| --- | --- |
| ACCOUNT_INACTIVE | Same as CARD_PAUSED. |
| AVS_INVALID | Prevent acquirers from approving the transaction despite incorrect AVS. Note: AVS response may be not required for this decline type. |
| CARD_CLOSED | Card may be permanently closed. Using CARD_CLOSED may result in subsequent authorizations being declined on the ASA client's behalf. |
| CARD_PAUSED | Card may be not yet activated or in a paused state. |
| INSUFFICIENT_FUNDS | User may have insufficient funds. Acquirers may retry the transaction at a later time. |
| UNAUTHORIZED_MERCHANT | May be used for restricted MCCs, countries, or transaction types (e.g., money transfer transactions). |
| VELOCITY_EXCEEDED | Transaction may have exceeded issuer-set velocity limits. Acquirers may retry the transaction at a later date. |

In particular embodiments, the receiver processor 140 may enable users to incorporate context schema (e.g., cardholder address) for the cardholder account into the serverless authorization stream access. The context schema may provide more context about the cardholder account so that the account processor 120 may make authorization decisions outside of just the transaction context. In particular embodiments, the context schema may comprise data the user associated with the account processor 120 wants to store with the receiver processor 140 so that they may look up important authorization information for their business schema quickly without having to call their systems.

In particular embodiments, the receiver processor 140 may receive a transaction authorization request to authorize a transaction associated with a transfer of resources to a receiving entity from a user. The receiver processor 140 may then retrieve, from a VBAN database, a VBAN comprising a transaction resource configuration for transactions associated with the receiving entity and the user. In particular embodiments, the issuer processor may create a new VBAN and a transaction resource configuration for the newly created VBAN. In particular embodiments, the transaction resource configuration may be generated based on the customized transaction schema. The transaction resource configuration may be decoupled from an external resource account associated with the user and the VBAN. In particular embodiments, the receiver processor 140 may then determine whether one or more parameters of the transaction resource configuration are satisfied based on metadata associated with the transaction authorization request. The receiver processor 140 may further generate, responsive to determining whether the one or more parameters of the transaction resource configuration are satisfied, a transaction authorization response indicating whether the transaction is authorized. In particular embodiments, the transaction being authorized may cause a stored value balance associated with the external resource account to be reduced based on the transfer of resources associated with the transaction.

In particular embodiments, the receiver processor 140 may receive, from a third-party server, a transaction authorization request to authorize a first transaction associated with a first user and a first receiving entity. As an example and not by way of limitation, the third-party server may be associated with a payment network 135. The first user may be an account holder 105 and the first receiving entity may be a commerce entity 115. The receiver processor 140 may then determine whether one or more authorization parameters of a transaction resource configuration associated with the first entity are satisfied based on metadata associated with the transaction authorization request. The receiver processor 140 may further transmit, to the third-party server, responsive to determining whether the one or more authorization parameters of the transaction resource configuration are satisfied, a transaction authorization response indicating whether the transaction is authorized.

In particular embodiments, the transaction authorization response may further comprise one or more of a transaction token, a resource balance value of a VBAN associated with the first entity, an available resource balance value of a VBAN associated with the first entity, or a result of one or more verification requirements based on one or more of the customized schema parameters. As an example and not by way of limitation, the transaction token may be used to uniquely identify the transaction. As another example and not by way of limitation, the resource balance value of the VBAN may be the balance value of a root account, which may be both in monetary value. As yet another example and not by way of limitation, the available resource balance value of the VBAN may be the total amount of US dollars. As yet another example and not by way of limitation, the result of one or more verification requirements based on one or more of the customized schema parameters may indicate whether these verification requirements are satisfied or not.

In particular embodiments, the one or more verification requirements may be associated with one or more of an account status of the VBAN associated with the first entity, an authorization status of the first receiving entity, or a frequency status of the first transaction based on one or more second transactions associated with the first user over a specified period of time. As an example and not by way of limitation, the account status may indicate whether the VBAN is active or frozen. As another example and not by way of limitation, the authorization status may indicate whether the first receiving entity is authorized. As yet another example and not by way of limitation, the frequency status of the first transaction based on one or more second transactions associated with the first users over a specified period of time may indicate how often transactions occur for the users entity over, e.g., last month.

In particular embodiments, the account processor 120 may provide a client response to the receiver processor 140 after the customized transaction schema is applied to a transaction authorization request by the receiver processor 140. As an example and not by way of limitation, the client response may comprise one or more of a result, a transaction token, an address verification result, or a balance. If the result is "approved", it may indicate an acceptance of the authorization by the account processor 120. Any other results may cause the decline of the authorization. In particular embodiments, the account processor 120 may return "approved" with address verification (AVS) match indicator that may be evaluated by the originator processor 125. In particular embodiments, address verification (AVS) may check two pieces of information including the postal code and the billing street address. Responding with AVS may be optional. If AVS is present and a response is not received, the receiver processor 140 may return AVS validated. If AVS attributes are not included in the authorization, any AVS response result may be ignored. In particular embodiments, the balance may indicate respective available amount and settled amount values. ASA messages may require a settled and available amount to be returned. The amount may represent the balance held on the account/card. The available balance may represent the balance available for the account holder or cardholder to spend. This may be calculated as the settled amount minus any pending authorizations on the account/card. If no balance is returned, the receiver processor 140 may return zero for both attributes. These values may be used by commerce entities 115 for authorization decisions as well as balance display at point of sale or ATM. In particular embodiments, the response time, i.e., the request timeout, may be configurable per request, with a default of, e.g., 5 seconds. Response before the timeout may not guarantee that the authorization will succeed.

In particular embodiments, the account processor 120 may utilize the serverless authorization stream access to make non-transaction authorization decisions. As an example and not by way of limitation, the account processor 120 may deploy schema to determine information of account holder or cardholder such as number of years regarding fraud risk, email address age, number of years as a customer, etc. In particular embodiments, the account processor 120 may implement non-transactional decisions with or without the context schema.

Figure 10:
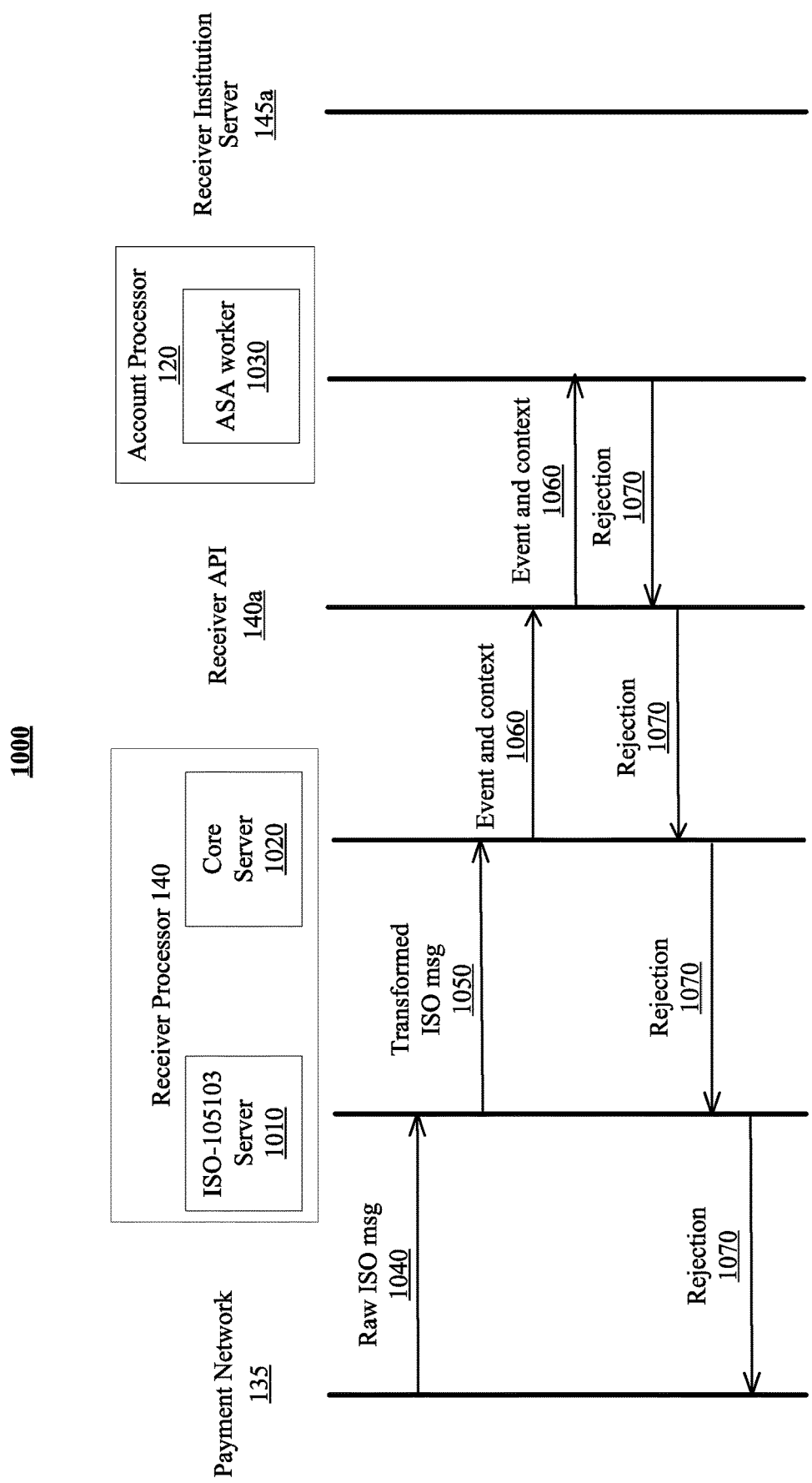
FIG. 10 illustrates an example sequence diagram for processing transaction authorization requests using customized transaction schema.

FIG. 10 illustrates an example sequence diagram 1000 for processing transaction authorization requests using customized transaction schema. In particular embodiments, the receiver processor 140 may enable the user to utilize the customized transaction schema to process a transaction authorization request with the added/modified functionality that was input by the user. As indicated in FIG. 10, the payment network 135 may send a raw ISO message 1040 to an ISO-105103 server 1010 of the receiver processor 140. In particular embodiments, the payment network 135 may bypass the issuing bank server 145*a* when sending the raw ISO message 1040 to the ISO-105103 server 1010. The ISO-105103 server 1010 may transform the raw ISO message 1040 and send a transformed ISO message 1050 to a core server 1020 of the receiver processor 140. Based on the transformed ISO message 1050, the core server 1020 may determine the event and context 1060 based on the customized transaction schema. The issuer processor API 140*a* may then send the event and context 1060 to an ASA worker 1030 of the account processor 120. As an example and not by way of limitation, the ASA worker 1030 may reject the transaction authorization request based on the event and context 1060. The ASA worker 1030 may then send a rejection 1070 to the receiver API 140*a*. The core server 1020 may further receive, via the issuer processor API 140*a*, the rejection 1070. The core server 1020 may return the rejection 1070 to the ISO-105103 server 1010, which may further return the rejection 1070 to the payment network 135. In particular embodiments, the receiver institution server 145*a* may be not involved in any of the communication between the receiver processor 140 and the account processor 120. In other words, the ASA worker 1030 may receive event and context 1060 and send the rejection 1070 via the issuer processor API 140*a* without any communication with the issuing bank server 145*a*.

In particular embodiments, the receiver processor 140 may access a set of first transaction entries comprising real-time transaction data. Each first transaction entry may be associated with one of a plurality of transactions for a specified time period. In particular embodiments, one or more of the plurality of transactions may be authorized based on a first transaction resource configuration generated based on a first customized transaction schema. The receiver processor 140 may then access one or more network reporting files comprising historical transaction data associated with one or more of the transactions associated with the real-time transaction data for the specified time period in the set of first transaction entries. The receiver processor 140 may then identify, from the set of first transaction entries and a set of second transaction entries derived from the historical transaction data, one or more identical pairs of a first transaction entry and a second transaction entry. In particular embodiments, for each identical pair, the first transaction entry and second transaction entry may be excluded from a remaining set of first transaction entries and a remaining set of second transaction entries, respectively. The receiver processor 140 may then identify, for each of one or more matching cycles, from the remaining set of first transaction entries and the remaining set of second transaction entries, one or more matching pairs of a first transaction entry and a second transaction entry. In particular embodiments, each matching pair may be identified based on a determination that a confidence metric for the matching pair is greater than a confidence threshold associated with the matching cycle. For each matching pair, the first transaction entry and second transaction may be excluded from the remaining set of first transaction entries and the remaining set of second transaction entries, respectively. In particular embodiments, the receiver processor 140 may further analyze, subsequent to the one or more matching cycles, the remaining set of first transaction entries and the remaining set of second transaction entries to identify a set of incongruous transaction entries and determine one or more remediations for one or more of the incongruous transaction entries.

Figure 11:
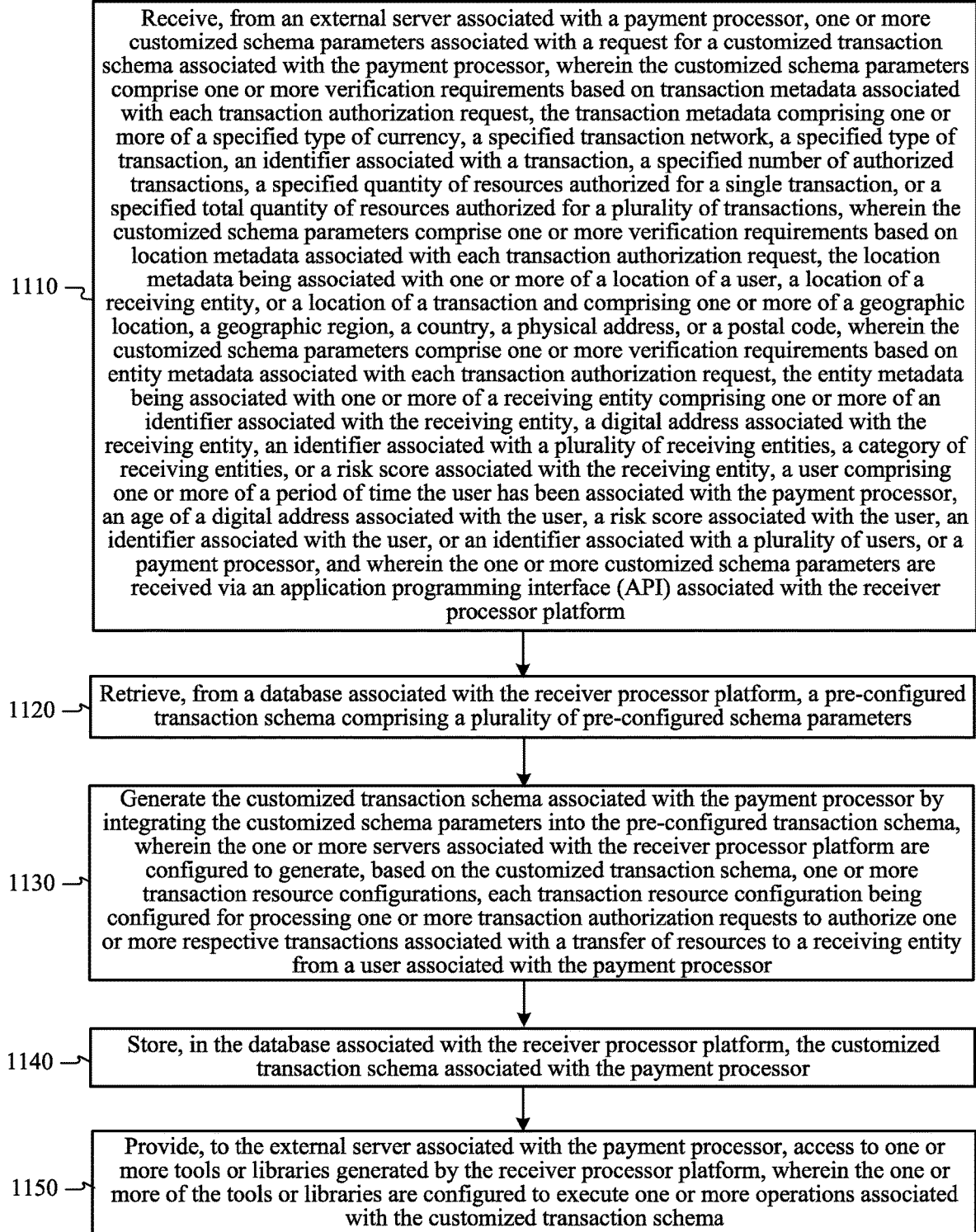
FIG. 11 illustrates an example method for serverless authorization stream access.

FIG. 11 illustrates an example method 1100 for serverless authorization stream access. The method may begin at step 1110, where the receiver processor 140 may receive, from an external server associated with a payment processor, one or more customized schema parameters associated with a request for a customized transaction schema associated with the payment processor, wherein the customized schema parameters comprise one or more verification requirements based on transaction metadata associated with each transaction authorization request, the transaction metadata comprising one or more of a specified type of currency, a specified transaction network, a specified type of transaction, an identifier associated with a transaction, a specified number of authorized transactions, a specified quantity of resources authorized for a single transaction, or a specified total quantity of resources authorized for a plurality of transactions, wherein the customized schema parameters comprise one or more verification requirements based on location metadata associated with each transaction authorization request, the location metadata being associated with one or more of a location of a user, a location of a receiving entity, or a location of a transaction and comprising one or more of a geographic location, a geographic region, a country, a physical address, or a zip code, wherein the customized schema parameters comprise one or more verification requirements based on entity metadata associated with each transaction authorization request, the entity metadata being associated with one or more of a receiving entity comprising one or more of an identifier associated with the receiving entity, a digital address associated with the receiving entity, an identifier associated with a plurality of receiving entities, a category of receiving entities, or a risk score associated with the receiving entity, comprising one or more of a period of time the user has been associated with the payment processor, an age of a digital address associated with the user, a risk score associated with the user, an identifier associated with the user, or an identifier associated with a plurality of users, or a payment processor, and wherein the one or more customized schema parameters are received via an application programming interface (API) 140*a*) associated with the issuer processor platform. At step 1120, the receiver processor 140 may retrieve, from a database associated with the issuer processor platform, a pre-configured transaction schema comprising a plurality of pre-configured schema parameters. At step 1130, the receiver processor 140 may generate the customized transaction schema associated with the payment processor by integrating the customized schema parameters into the pre-configured transaction schema, wherein the one or more servers associated with the issuer processor platform are configured to generate, based on the customized transaction schema, one or more transaction resource configurations, each transaction resource configuration being configured for processing one or more transaction authorization requests to authorize one or more respective transactions associated with a transfer of resources to a receiving entity from a user associated with the payment processor. At step 1140, the receiver processor 140 may store, in the database associated with the issuer processor platform, the customized transaction schema associated with the payment processor. At step 1150, the receiver processor 140 may provide, to the external server associated with the payment processor, access to one or more tools or libraries generated by the issuer processor platform, wherein the one or more of the tools or libraries are configured to execute one or more operations associated with the customized transaction schema. Particular embodiments may repeat one or more steps of the method of FIG. 11, where appropriate. Although this disclosure describes and illustrates particular steps of the method of FIG. 11 as occurring in a particular order, this disclosure contemplates any suitable steps of the method of FIG. 11 occurring in any suitable order. Moreover, although this disclosure describes and illustrates an example method for serverless authorization stream access including the particular steps of the method of FIG. 11, this disclosure contemplates any suitable method for serverless authorization stream access including any suitable steps, which may include all, some, or none of the steps of the method of FIG. 11, where appropriate. Furthermore, although this disclosure describes and illustrates particular components, devices, or systems carrying out particular steps of the method of FIG. 11, this disclosure contemplates any suitable combination of any suitable components, devices, or systems carrying out any suitable steps of the method of FIG. 11.

Automatically Reconcile Partially Complete and Congruent Financial Records

In particular embodiments, the receiver processor 140 may reconcile data from multiple sources. The primary source may be the live data (e.g., transaction data) being streamed in real-time, and the secondary source may be the historical data (e.g., transaction data) aggregated and presented in bulk at a future time. In particular embodiments, the secondary source may serve as a form of ground-truth, taking precedence over the primary source in cases of poor congruence and incompleteness. However, the secondary source may not be solely relied upon when conducting business (e.g., processing transactions), as decisions may need to be made using the real-time data (e.g., the primary source) that is immediately available. Due to the partial completeness and congruency of the two data sources, reconciliation may be required to identify any improper decisions made using the real-time data and remediate properly. In particular embodiment, the receiver processor 140 may determine non-congruent data entries across the two sources, business decisions that result from the originally improper entry from the primary source, and remediations that are necessary as a result of the final proper entry from the secondary source. The receiver processor 140 may further substantiate the original entry from the primary source with more complete information that is only available via the secondary source. In particular embodiments, the reconciliation logic to identify these cases may allow for the utility to be realized. Incorrect reconciliation may potentially result in false positive remediations and downstream repercussions. As a result, the receiver processor 140 may leverage robust reconciliation logic itself for reconciling data from multiple sources. Although this disclosure describes reconciling particular data sources by particular processors in a particular manner, this disclosure contemplates reconciling any suitable data source by any suitable processor in any suitable manner.

In particular embodiments, the receiver processor 140 may store, in a payment transaction database associated with the receiver processor 140, a set of first transaction entries comprising real-time transaction data. Each first transaction entry may be associated with one of a plurality of privacy payment transactions for a specified time period. Each privacy payment transaction may be associated with a transfer of funds to a receiving entity, via a privacy payment account of a user, from a funding account of the user that is decoupled from the privacy payment account. In particular embodiments, the receiver processor 140 may then receive, from an external server, one or more network reporting files comprising historical transaction data associated with one or more of the plurality of privacy payment transactions for the specified time period. The receiver processor 140 may identify, from the set of first transaction entries and a set of second transaction entries derived from the historical transaction data, one or more identical pairs of a first transaction entry and a second transaction entry. In particular embodiments, for each identical pair, the first transaction entry and second transaction entry may be excluded from a remaining set of first transaction entries and a remaining set of second transaction entries, respectively. The receiver processor 140 may then identify, for each of one or more matching cycles, from the remaining set of first transaction entries and the remaining set of second transaction entries, one or more matching pairs of a first transaction entry and a second transaction entry. In particular embodiments, each matching pair may be identified based on a determination that a confidence metric for the matching pair is greater than a confidence threshold associated with the matching cycle. For each matching pair, the first transaction entry and second transaction entry may be excluded from the remaining set of first transaction entries and the remaining set of second transaction entries, respectively. In particular embodiments, the receiver processor 140 may further analyze, subsequent to the one or more matching cycles, the remaining set of first transaction entries and the remaining set of second transaction entries to identify a set of incongruous transaction entries and determine one or more remediations for one or more of the incongruous transaction entries.

In particular embodiments, privacy payment transactions may be based on privacy communication strings, privacy exchange account/card numbers, privacy transaction account/card numbers, or privacy payment account/card numbers which are tagged to a specific server, vendor, provider or merchant, as opposed to being tagged to just a merchant category code (MCC) like in known systems. As such, merchants that store card or account number for later authorization may be not storing the consumer's actual account or card number. Different from a traditional bank account, a privacy payment account (e.g., VBAN) may decouple the concept of stored value balance from publicly routable account numbers. With a privacy payment account, a consumer may have one or more root accounts storing value balances that are air gapped from all financial interchange networks and clearing houses. More information on privacy payment transactions may be found in U.S. patent application Ser. No. 15/261,368, filed 9 Sep. 2016, which is incorporated by reference.

In particular embodiments, each privacy payment account may comprise a transaction resource configuration for privacy payment transactions associated with a receiving entity and the user for the privacy payment account. For one or more of the privacy payment accounts, one or more of the plurality of privacy payment transactions may be authorized based on metadata associated with the respective privacy payment transaction satisfying one or more parameters of the transaction resource configuration of the privacy payment account. In particular embodiments, for one or more of the privacy payment accounts, the transaction resource configuration of the respective privacy payment account may be generated based on a customized transaction schema associated with a payment processor. As an example and not by way of limitation, the payment processor may be an enterprise client of the receiver processor 140. The payment processor may be associated with the account processor 120 and may issue VBANs and cards associated with VBANs to account holders 105. The customized transaction schema may be generated based on one or more customized schema parameters received from the payment processor.

In particular embodiments, the one or more network reporting files may be associated with a transaction network associated with the external server. As an example and not by way of limitation, the transaction network may be the payment network 135, e.g., VISA™ or MASTERCARD™. Correspondingly, the historical transaction data may comprise one or more transaction datasets for the specified time period (e.g., a day or a week). In particular embodiments, the transaction datasets may comprise one or more of transaction data associated with each of a plurality of users (e.g., account holders 105), transaction data associated with a payment processor (e.g., an enterprise that issues accounts/cards to account holders 105), transaction data associated with the transaction network associated with the external server, transaction data associated with the payment processor and the transaction network, or transaction data associated with the receiver processor 140. In particular embodiments, the historical transaction data may further comprise one or more total values for one or more of the transaction datasets and/or fee data associated with one or more of the transaction datasets. As an example and not by way of limitation, the fee data may be associated with one or more of transaction fees, transaction network fees, or international service assessments (ISA).

In particular embodiments, the network reporting files may comprise a report specific to a network provider containing information regarding cardholder activity on a broad level. This report may be a retrospective and batched report. In particular embodiments, the cardholder activity may comprise information about transactions as well as totals for reconciliation. The cardholder activity may also include international transactions (e.g., currency, conversion rate, amount, country code, etc.). The cardholder activity may be chronological regardless of transaction status (i.e., may have it in primary account number order if desired).

In particular embodiments, the cardholder activity may comprise the following detailed transaction information. The cardholder activity may comprise cardholder number, which may be a primary account number (PAN), e.g., up to 21 characters. The cardholder activity may comprise a plastic number, which may indicate the card used for transaction if there are multiple cards per primary account number. As an example and not by way of limitation, the primary account number may be associated with a root account storing value balance whereas these multiple cards correspond to VBANs associated with the root account. The cardholder activity may also comprise transaction type (e.g., 2-3 characters), tied to settlement process code or transaction type code. The cardholder activity may also comprise debit information, which may indicate amount if transaction is a debit (e.g., deposit), amounts not followed by rejection which are settled transactions, and additional possible values which are a mix of rejected and accepted. In particular embodiments, the cardholder activity may comprise credit information, which may indicate the amount of a transaction that is a credit (e.g., withdrawal), amounts not followed by rejection which are settled transactions, and additional possible values which are a mix of rejected and accepted. The cardholder activity may also comprise fees, which may indicate the additional charges with this transaction. The cardholder activity may comprise a date and time that a network provider received the payment transaction request, which may be used to uniquely identify a transaction. The cardholder activity may comprise a terminal institution, e.g., an identifier (ID) number of the terminal-owning institution. The cardholder activity may also comprise the number assigned to the terminal institution by the network provider, which may be used to uniquely identify a transaction. The cardholder activity may comprise a sequence number assigned by the network provider, which may be used to uniquely identify a transaction. The cardholder activity may additionally comprise a code for exception transaction and a short description, which may be advice sent, advice received, or reversal reason code. When a transaction has a minus sign (negative amount), it may be a correction of another transaction and an exception reason may always print for these. The cardholder activity may comprise a code and short description for a rejected transaction and reject reasons and corresponding codes, terminal's local date and time of transaction, the ID number of the card-owning institution, actual ID of the terminal for this transaction, sequence number that the terminal gave to the transaction, program indicator.

In particular embodiments, the report specific to the network provider may additionally comprise issuer activity for interchange. The issuer activity for interchange may show all transactions by the cardholders of an institution at interchange-controlled terminals, substantiate fund movement between institution and interchange network (assisting reconciliation), show each transaction in same degree of detail as cardholder activity report (along with the detail service line information, summary totals, and statistical counts, etc.), and counterpart to reports provided by interchange. In particular embodiments, the reported totals of the issuer activity for interchange may comprise interchange totals and institution totals that are reported for the categories of previous suspense, previous institution suspense, issuer totals for interchange, institution issuer, today's suspense for interchange, and today's institution suspense. All these categories may be needed since cutoff for institution and interchange may not match exactly (e.g., time difference of a couple seconds may push cutoffs).

In particular embodiments, the report specific to the network provider may additionally comprise institution activity summary, which may be utilized to verify the correctness of the ingestion of the individual entries that compromise this total. The institution activity summary may summarize totals in cardholder activity report and the terminal activity report. Net position here may be carried over to daily totals recap report. The report specific to the network provider may additionally comprise processor activity summary. The processor activity summary may list the final settlement position for each institution on the institution activity summary report. In the processor activity summary, there may be one line of detail per institution and the adjust column may be net total adjustments for a particular processor/institution.

In particular embodiments, the report specific to the network provider may additionally comprise interchange activity summary. The interchange activity summary may summarize totals produced from issuer activity for interchange report and acquirer activity for interchange report. The interchange activity summary may also have institution totals, interchange totals, and cutoff window difference, and also appear on daily totals recap report.

In particular embodiments, the report specific to the network provider may additionally comprise daily totals recap. The daily totals recap may receive multiple copies of this report but if there is only one institution behind a processor, only one copy may be produced. Each institution may receive its own copy of this report with institution number printed on top. In particular embodiments, the daily totals recap may comprise interchange activity. The interchange activity may comprise totals for each interchange network and include both computed totals and window difference at institution cutoff and interchange cutoff. The daily totals recap may comprise on-us activity, which is provided if the network provider drives ATMs. If the network provider drives its own ATMs or intercept processors, the on-us activity may be not reported.

In particular embodiments, the daily totals recap may comprise terminal and cardholder activity, which may include terminal totals, service line totals, and suspense totals. The terminal and cardholder activity may provide totals for non-cash media by commodity type. Total terminal business day may not include totals for purchase transactions. In particular embodiments, the daily totals recap may comprise electronic funds transfer (EFT) suspense account reconciliation, which may comprise totals to identify and reconcile total suspense amount and net change to suspense amount. The EFT suspense account reconciliation may comprise previous suspense, which indicates total mounts from transaction suspense activity on yesterday's report brought forward to today's report (e.g., yesterday's credit is today's debit). The EFT suspense account reconciliation may additionally comprise posting totals, which indicates an amount of transaction activity that occurred during the institution's current business day. The EFT suspense account reconciliation may additionally comprise today's suspense, which indicates an amount of transaction activity occurring since the institution's last cutoff. The EFT suspense account reconciliation may additionally comprise automated funds movement entry, which indicates total amount of funds moved by the network provider for the institution. In particular embodiments, there may be four types of lines of the automated funds movement entry. One type of line may be automated funds movement entry which indicates full dollar amounts of funds to be moved minus surcharge/adjustment. Another type of line may be automated funds movement entry which indicates surcharge feeds to be separately moved for the sponsoring institution. Another type of line may be automated funds movement entry which indicates surcharge fees to be separately moved for the merchant. Another type of line may be automated funds movement entry, which indicates adjustment monetary amount to be separately moved.

In particular embodiments, the daily totals recap may comprise suspect fraud exception items report, token activation activity comprising information about activity regarding using digital wallet payments, and financial and management accounting committee (FMAC) exception by institution.

In particular embodiments, the network reporting files may comprise gateway files. Gateway files may be similar to each other. A noticeable difference may be that some payment networks 135 (e.g., MASTERCARD™) may use issuer detail for interchange fees whereas some other payment networks 135 (e.g., VISA™) may use interchange fee report.

In particular embodiments, the gateway files may comprise cardholder activity, which may include information related to each transaction. The gateway files may also comprise issuer detail such as interchange fees. In particular embodiments, interchange fees may be opposite in polarity from the transaction type (e.g., debit transaction has interchange credit fee). Unless otherwise noted, all positive amounts listed may be considered debit amounts. A net positive amount may be debited from (drawn out of) the account by the third party (e.g., a network provider); a net negative amount may be credited to (placed into) the account. For particular payment networks 135, the gateway files may also comprise an interchange fee report, which may include interchange fees. Similarly, interchange fees may be opposite in polarity from the transaction type (e.g., debit transaction has interchange credit fee). The gateway files may further comprise international service assessment (ISA) fee report which may comprise international service assessment fee assessed by domestic banks for using foreign bank cards. Interchange fees may be the same in polarity from the transaction type (e.g., debit transaction has ISA debit fee).

Figure 12A:
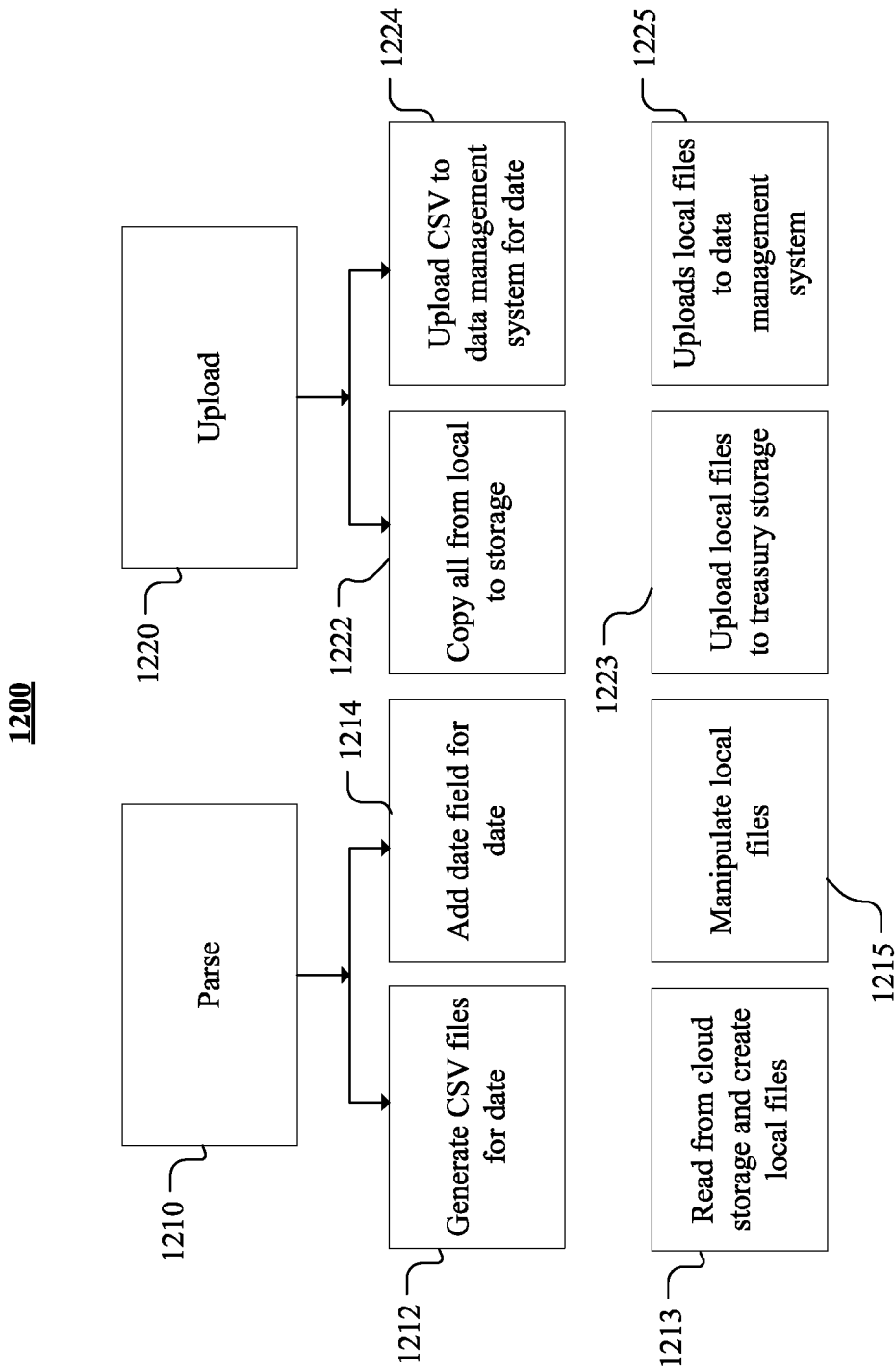
FIGS. 12A-12B illustrate an example workflow for reconciling partially complete and congruent financial records.
Figure 12B:
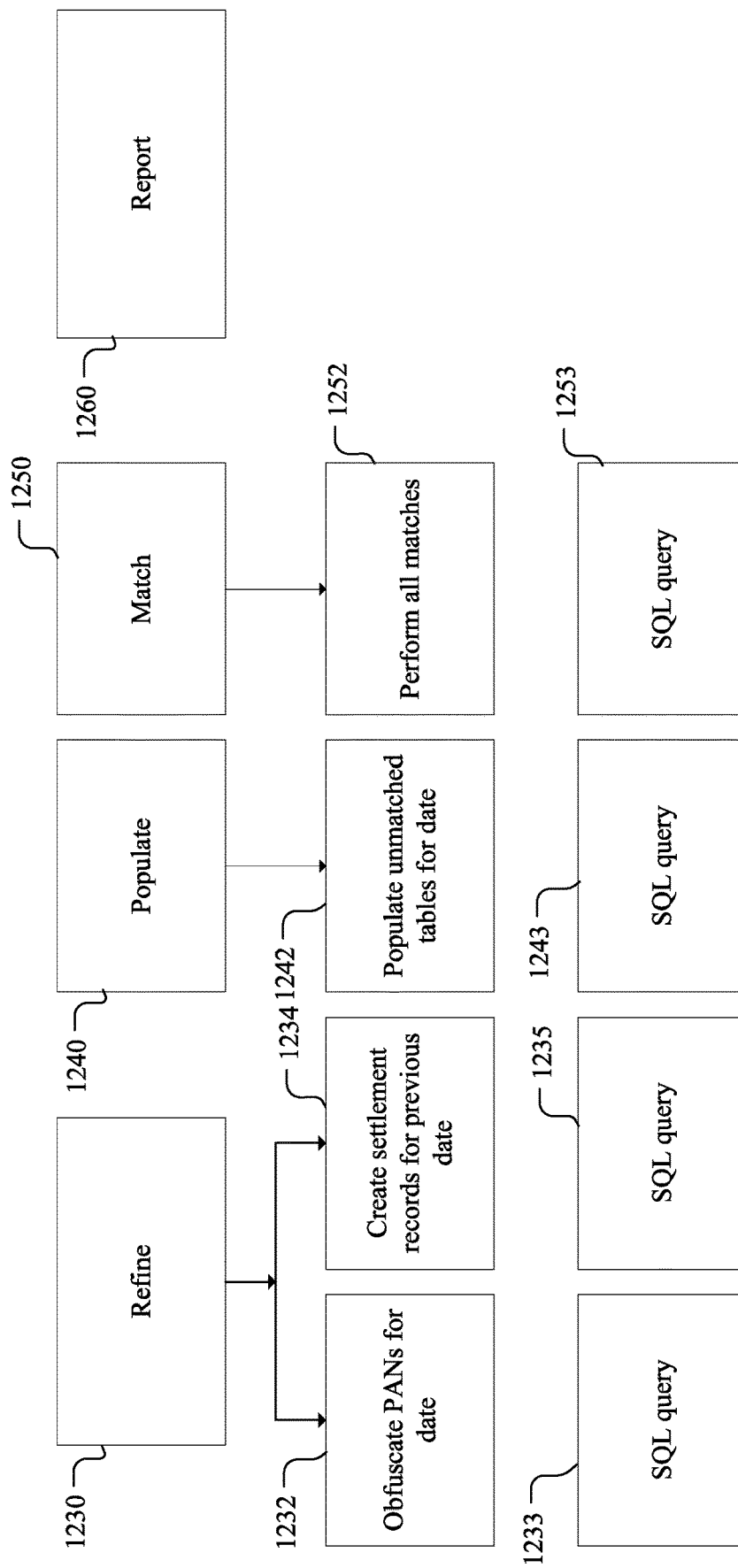

FIGS. 12A-12B illustrate an example workflow 1200 for reconciling partially complete and congruent financial records. In particular embodiments, the receiver processor 140 may first ingest the network reporting files, e.g., report files specific to the network provider and gateway text files. In particular embodiments, deriving the set of second transaction entries from the historical transaction data may comprise parsing the historical transaction data to generate one or more unrefined datasets, processing the one or more unrefined datasets to generate one or more refined datasets, and generating the set of second transaction entries based on the one or more refined datasets. At step 1210, the receiver processor 140 may parse the text files and output original and untouched fields to CSV and SQL database. In particular embodiments, the payment transaction database may comprise one or more of the CSV database or SQL database. In particular embodiments, CSV may be a more casual and human-readable format where a user can quickly open and rudimentarily search through the document for sanity checking and analysis. There may not be much more work than adding to the SQL database and step 1210 may help with debugging during the testing phases. Existing CSV file output (e.g., gateway files associated with payment networks 135) may be utilized by the accounting team. In particular embodiments, non-refined SQL may be the main table to be used for further refinement of data and translation into fields usable for reporting and analysis.

In particular embodiments, parsing the text files may be a direct ingestion of the files and the values may be completely untouched/non-refined from the text files (i.e., no refinement or translations). The receiver processor 140 may keep these values untyped (i.e., strings) to maintain as much consistency with the original files as possible. Each document may be split into multiple CSV/tables due to multiple report types existing in each overall document. In particular embodiments, the receiver processor 140 may be able to restart SQL insertion at a given point. As an example and not by way of limitation, the receiver processor 140 may be able to accept a parameter referring to the last successfully inserted entity (e.g., transaction hash, summary entry, etc.) and restart insertion from that point. This may reduce the need to check for reinsertion attempts in the database and duplicate management. The receiver processor 140 may have this as a separate mechanism that simply reads from the CSV to insert into the database.

The parsing may comprise generating CSV files for date 1212 and adding date field for date 1214. In particular embodiments, generating CSV files for date 1212 may comprise reading from cloud storage and creating local files 1213. Adding date field for date 1214 may comprise manipulating local files 1215. At step 1220, the receiver processor 140 may upload the parsed data. The upload may comprise copying all from the local to storage 1222 and uploading CSV files to a data management system for date 1224. In particular embodiments, copying all from the local to storage 1222 may comprise uploading local files to a treasury store 1223. Uploading CSV files to a data management system for date 1224 may comprise uploading local files to the data management system 1225.

In particular embodiments, processing the one or more unrefined datasets to generate the one or more refined datasets may comprise obfuscating one or more primary account numbers associated with the unrefined datasets. Additionally, processing the one or more unrefined datasets to generate the one or more refined datasets may comprise creating a set of settlement records for a plurality of privacy payment transactions for a previous specified time period. At step 1230, the receiver processor 140 may refine the uploaded CSV files, which may comprise obfuscating PANs for date 1232 and creating settlement records for previous date 1234. The receiver processor 140 may insert the refined data into a separate database. In particular embodiments, obfuscating PANs for date 1232 may be based on SQL query 1233. Creating settlement records for previous date 1234 may be based on SQL query 1235. When refining non-refined data, the receiver processor 140 may use non-refined dataset to generate the refined data or perform these actions in a separate data structure during the processing. Using non-refined database to generate refined database may create better ownership of responsibilities for the script/job (i.e., one job to handle parsing and one job to handle refining) and may be also more fault tolerant (i.e., issues in this step 1230 may not affect the parsing step 1210). In particular embodiments, the receiver processor 140 may use a separate data structure during the parsing step 1210 to make it simpler due to all information being extant in the parsing step 1210 and avoid the need to reconstruct data structures by ingesting from the non-refined database. Additionally, it may be faster to perform translations and sums in the same step. If transformations of the data are sufficiently thin, this step 1230 may be completely skipped in lieu of running the transformations and refinement in the reports themselves. If this happens, type-enforcement and other data quality errors may need to be handled by the reports. The receiver processor 140 may need alerting for enforcement of types and unexpected values.

At step 1240, the receiver processor 140 may populate the refined data, which may comprise populating unmatched tables for date 1242. Populating unmatched tables for date 1242 may be based on SQL query 1243. At step 1250, the receiver processor 140 may match the data from the primary source (i.e., the set of first transaction entries) and secondary source (i.e., the set of second transaction entries), which may comprise performing all matches 1252. Performing all matches 1252 may be based on SQL query 1253. In particular embodiments, one or more of the matching pairs may be each identified based on transaction criteria associated with one or more of the corresponding privacy payment transaction, the user, the receiving entity, the privacy payment account, or a transaction network associated with the external server. As an example and not by way of limitation, the transaction criteria may comprise one or more of a transaction identifier, a transaction value, a transaction timestamp, a user identifier, a receiving entity identifier, a privacy payment account identifier, or a transaction network identifier. Identifying matching pairs based on transaction criteria associated with one or more of the corresponding privacy payment transaction, the user, the receiving entity, the privacy payment account, or a transaction network associated with the external server may be an effective solution for addressing the technical challenge of identifying matching pairs between the real-time transaction data and the historical transaction data as such transaction criteria can provide reliable measurement for evaluating the correspondence between the two data sources. Furthermore, there may be a tiered (ordered) list of criteria for matching, approached in a descending order of confidence for the matching process. Thus, the matching process may provide additional information about the specific ordering/criteria if needed.

In particular embodiments, for each of one or more of the incongruous transaction entries, the one or more remediations may comprise one or more of correcting one or more incorrect data field entries, supplementing one or more missing data field entries with data field entries from a different incongruous transaction entry, or generating a missing transaction entry matching the incongruous transaction entry. One or more of the incorrect data field entries, missing data field entries, or missing transaction entries may be associated with one or more of an improper interpretation of transaction data, an improper processing of transaction data, or one or more incomplete data field entries in the transaction data.

In particular embodiments, the receiver processor 140 may process the one or more remediations to generate one or more remediated transaction entries. The receiver processor 140 may further generate a set of reconciled transaction entries based on the identified identical pairs, the identified matching pairs, and the remediated transaction entries. As an example and not by way of limitation, generating the set of reconciled transaction entries may be associated with one or more of settlement reconciliation, funding reconciliation, or accounting reconciliation. As a result, the embodiments disclosed herein may have a technical advantage of effectively identifying and remediating improper decisions made using real-time transaction data as the reconcile logic may identify these cases based on the analysis of partial completeness and congruency of both the real-time transaction data and historical transaction data.

At step 1260, the receiver processor 140 may report the reconciliation results. In particular embodiments, the receiver processor 140 may first create reports using the refined database. The receiver processor 140 may generate one or more customized reports associated with a payment processor based on the set of reconciled transaction entries. In particular embodiments, the one or more customized reports may be configured to monitor, for one or more privacy payment accounts, one or more metrics associated with account balances, funding requests, requested transactions, authorized transactions, and declined transactions. The reports may comprise summary reports to financial institutions as well as the traditional transactions reconciliation. Usually, the refined data may be enough to compare with the internal database of the receiver processor 140 and may be able to directly insert the results into the reports. If this data is not enough, the receiver processor 140 may consider tradeoffs between having the report draw directly from the refined data versus having the report perform additional logic. The receiver processor 140 may then save reports to a treasury storage for future lookback. The receiver processor 140 may further send the completed reports to relevant entities, which may be separate from report creation. In particular embodiments, sending the completed reports may have a thin layer only to SFTP, email, or the receiver processor 140 may send files in other formats. During the sending of the completed reports, it may be simple to alert in the workflow 1200 or other scheduling mechanisms when job fails.

In particular embodiments, the workflow 1200 may have the following requirements. As an example and not by way of limitation, the receiver processor 140 may run the workflow 1200 at 10 am. If it fails, the general service level agreement (SLA) may be by the end of the business day (e.g., end of the business day on weekdays or Monday on weekends). The workflow 1200 may be dependent on the past day. If yesterday's instance failed or hasn't been scheduled, the receiver processor 140 may not run today's instance. In particular embodiments, the receiver processor 140 may split the pipeline script of the workflow 1200 into separate, discrete files for each intended, encapsulated purpose for the subtasks in the collection of all the tasks needed to be run. In particular embodiments, the script may write the parsed CSV files locally, which then get uploaded to both the treasury storage and the data management system. Alternatively, the script may write the parsed CSV files into memory without local storage, but these files may be optionally deleted after completion of the pipeline. In particular embodiments, the script may write the report files to both the cloud storage and an external storage. Alternatively, only external storage may be necessary, but in the meantime, the API 140*a* may hit the cloud storage.

In particular embodiments, the receiver processor 140 may use alternative measures if either the reconciliation or the remediation cannot be handled via the workflow 1200 (e.g., parsing issues, database server issues, etc.). As an example and not by way of limitation, the receiver processor 140 may involve manual handling of the errors while using the workflow 1200 as a stopgap. In particular embodiments, these alternative measures may comprise expected SLA for external reporting and expected SLA for remediations. As an example and not by way of limitation, if the workflow 1200 is designed with an expected SLA of T+1 day, manual intervention may push the return time.

In particular embodiments, the reconciliation workflow 1200 may have most of the parts automated. From the top, the receiver processor 140 may schedule kicking off a docker instance to handle pulling a network reporting file from SFTP to the treasury storage, reading and parsing the file in the treasury storage, and then writing the entries to the tables in the data management system as well as the CSV files to the treasury storage. In particular embodiments, the reconciliation matching may mostly be handled via SQL query, with the non-matching entries being collected and stored. These non-matching entries as well as explicit FMAC exception entries may be handled manually. In particular embodiments, the receiver processor 140 may determine, for one or more of the incongruous transaction entries, that no remediation has been identified. Accordingly, the receiver processor 140 may further generate, for each of the one or more of the incongruous transaction entries with no identified remediation, a flag indicating that manual reconciliation is required. As an example and not by way of limitation, much (i.e., all if personally identifiable information is not a consideration) of the network information may be provided to a manual intervener at this step to provide context about the transaction, and heuristics may be included in the matching step to better provide preliminary analyses as to what may be the issue (e.g., fuzzy matching missed by a few cents but not just one cent). At this step, the manual interventionist may approve the actions for the entries (e.g., submitting synthetic records into core for missing transactions, approving refunds). This may be handled by providing UI views similar to the workflow 1200 (i.e., clearing queue in admin).

Figure 13:
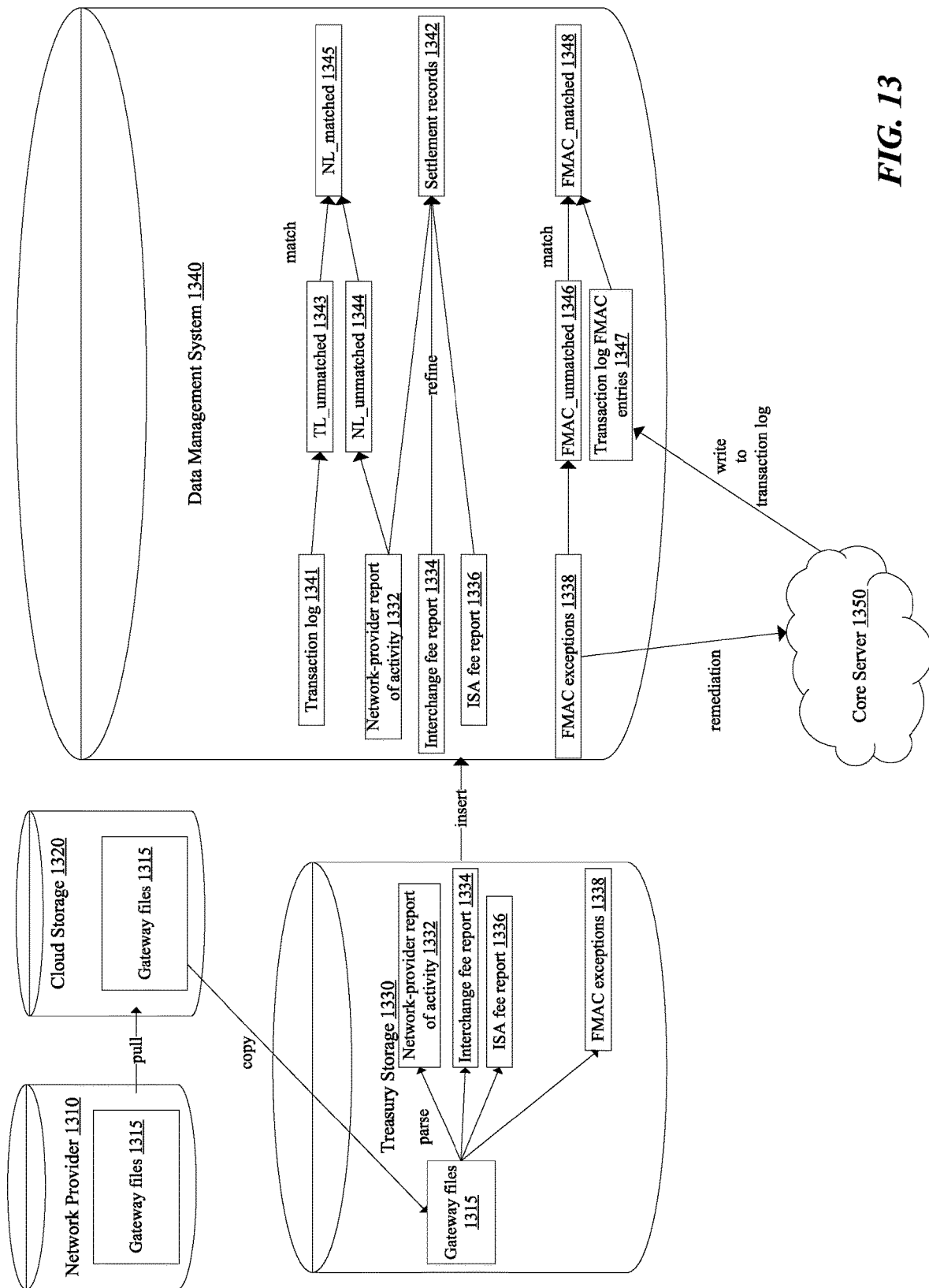
FIG. 13 illustrates an example flow diagram for reconciling partially complete and congruent financial records.

FIG. 13 illustrates an example flow diagram for reconciling partially complete and congruent financial records. In particular embodiments, a network provider 1310 may store gateway files 1315 associated with the network provider. The gateway files 1315 may be associated with a particular date and the format may be text. A cloud storage 1320 may pull gateway files 1015 from the network provider 1310 to the cloud storage 1320. The cloud storage 1320 may be associated with the receiver processor 140. In particular embodiments, the cloud storage 1320 may store daily network reporting files such as gateway files 1315.

In particular embodiments, a treasury storage 1330 may then copy the gateway files 1315 from the cloud storage 1320. The treasury storage 1330 may be also associated with the receiver processor 140. In particular embodiments, the treasury storage 1330 may comprise intermediate and reporting files. The schemas for the treasury storage 1330 may comprise one or more of network-provider report of cardholder transaction, network-provider report of issuer activity for interchange, network-provider report of token authorization activity, network-provider report of FMAC exception, gateway cardholder activity, gateway ISA fee from payment networks 135, gateway interchange fee from payment networks 135, or gateway issuer detail from payment networks 135 (i.e., settlement transaction interchange fees). For network-provider report of cardholder transaction, network-provider report of issuer activity for interchange, network-provider report of FMAC exception, gateway cardholder activity, the schema may comprise a unique identifier determined based on hash (e.g., switch date, switch time, switch terminal, switch sequence, and line index) and processing timestamp. For network-provider report of token authorization activity, the schema may comprise a unique identifier determined based on hash (e.g., funding pan, switch date, switch time, activity type, and line index) and processing timestamp. For gateway ISA fee from payment networks 135 and gateway interchange fee from payment networks 135, the schema may comprise a unique identifier determined based on hash (e.g., primary account number, local date, local time, sequence number, and line index) and processing timestamp. For gateway issuer detail from payment networks 135, the schema may comprise a unique identifier determined based on hash (e.g., switch date, switch time, switch terminal, acquirer reference number, and line index) and processing timestamp.

In particular embodiments, the treasury storage 1330 may then parse the gateway files to generate network-provider report of activity 1332 (e.g., in CSV format) associated with the network provider 1310, an interchange fee report 1334 (e.g., in CSV format), ISA fee report 1336 (e.g., in csv format), network-provider report of financial and management accounting committee (FMAC) exceptions 1338. The treasury storage 1330 may insert the parsed gateway files to a data management system 1340.

In particular embodiments, the data management system 1340 may comprise the raw fields directly parsed from the network reporting files, e.g., the network-provider report of activity 1332, interchange fee report 1334, ISA fee report 1336, and network-provider report of FMAC exceptions 1338. The only type validations that occurred may be implicit and for fields needed for control-total validations (i.e., credit, debit, fee, memo, and amounts). In particular embodiments, the data management system 1340 may comprise internal transaction log 1341, which may be replicated time to time (e.g., on an hourly basis). The data management system 1340 may refine the network-provider report of activity 1332, interchange fee report 1334, and ISA fee report 1336 to generate settlement records 1342. The settlement records 1342 may comprise the typed fields translated from raw fields, including linkage to transaction log 1341 entries.

In particular embodiments, the data management system 1340 may determine unmatched transaction log data (TL unmatched) 1343 from the transaction log 1341. The unmatched transaction log data 1343 may comprise the partial list of transaction log 1341 entries that do not yet exist in settlement records 1342 as a linkage. The unmatched transaction log data 1342 combined with the transaction log entries in settlement records 1342 may equate to the entire set of transaction log entries in transaction log 1341 (outside of backfilling). In particular embodiments, the data management system 1340 may determine unmatched network log data (NL unmatched) 1344 from the network-provider report of activity 1332. The data management system 1340 may then match the unmatched transaction log data 1342 and the unmatched network log data 1344 to generate the matched network log data (NL_matched) 1345.

In particular embodiments, the data management system 1340 may determine unmatched FMAC data (FMAC_unmatched) 1346 from the FMAC exceptions. The data management system 1340 may further provide the FMAC exceptions 1338 to the core server 1350 of the receiver processor 140 remediation. The remediation may comprise creating synthetic entries. After remediation, the core server 1350 may write the results to transaction log to generate transaction log FMAC entries 1347. The data management system 1340 may then match unmatched FMAC data 1346 and the transaction log FMAC entries 1347 to generate the matched FMAC data 1348.

The following may be an example process for reconciling financial records for a particular report date D. To begin with, the set of network reporting files may be copied from cloud storage 1320 to treasury storage 1330 at path D/recon/fis/file.txt. The network reporting files from the treasury storage 1330 may be then parsed into CSVs, uploaded to the treasury storage 1330 at path D/recon/fis/file.csv. The data management system 1340 may check if date D exists in the treasury internal raw data. If date D exists, the data management system 1340 may mark the old entries invalid by setting "is invalidated=FALSE" for all the date D rows in the treasury internal raw data. For each of the newly invalidated entries, the data management system 1340 may find its corresponding entry in the settlement records 1342, remove its row in the settlement records 1342, and reinsert the entry associated with the transaction log identifier into the unmatched transaction log data 1343. The data management system 1340 may then insert entries from CSV files to the treasury internal raw data. The data management system 1340 may then add new entries into the settlement records 1342 by cleaning the text from the treasury internal raw data into typed fields and linking the ISA fees and interchange to the settlement records. In particular embodiments, the data management system 1340 may pull newer entries from replicated transaction log 1341 into unmatched transaction log 1343. This may be performed by finding the highest index for transaction log identifier in the settlement records 1342 and unmatched transaction log 1343 and adding the transaction log 1341 entries with higher identifier values. The data management system 1340 may further match against unmatched transaction log 1343. On successful matches, the data management system 1340 may update transaction log identifiers, set "is_matched=TRUE", and remove entries in unmatched transaction log 1343.

In particular embodiments, the receiver processor 140 may implement a testing and alerting plan to ensure effective reconciliation of partially complete and congruent financial records and that future changes do not introduce regressions. The plan may be based on ingestion, parsing, refining, creation, and sending. The ingestion may comprise unit tests, integration tests, and alerting. For unit tests, a secure file transfer protocol, e.g., SFTP (SSH file transfer protocol), may be accessed and the treasury storage 1330 may be writable. For integration tests, the receiver processor 140 may set up a fake SFTP port that mimics the server of a network provider 1310 and perform the file pull from there, write to the treasury storage 1330, and clean up created files regardless of failure or not. The receiver processor 140 may generate alerting based on following rules. If SFTP cannot be accessed, there may be a failure alert. If a file does not exist in SFTP, there may be a failure alert. If multiple files exist and are duplicates, there may be a warning alert. If multiple files exist and are not duplicates, there may be a failure alert. If the treasury storage 1330 is not writeable, there may be a failure alert.

In particular embodiments, the parsing of the plan may similarly comprise unit tests, integration tests, and alerting. For unit tests, the receiver processor 140 may verify correct CSV output as compared to "expected" given raw, anonymized network reporting files for each file portion indicated in the file anatomy section and for each field in the file portions that are actively used by the existing reconciliation pipeline. The receiver processor 140 may additionally verify incomplete documents result in errors, verify erroneous fields result in errors, and verify extraneous fields result in errors. For integration tests, the receiver processor 140 may compare sample runs to files created by the currently existing parsing structure. The parsing structure may not currently output any intermediate files or write to any databases, but there may be current work to support this. The intermediate information may be restricted to only the portions that are used by the existing reconcile pipeline, which may be a subset of the information retrieved by the parsing mechanism. In particular embodiments, the receiver processor 140 may generate alerting based on following rules. If the treasury storage 1330 cannot be accessed, there may be a failure alert. If the network reporting file does not exist, there may be a failure alert. If the treasury storage 1330 for CSV cannot be accessed or written to, there may be a failure alert. If the SQL database cannot be accessed, there may be a failure alert. If a document fails any of the unit test qualities, there may be a failure alert. If the total number of transactions is a large deviation from the past number of transactions, there may be a warning alert. If SQL row insertion fails, there may be a failure alert. If transaction or entry insertion results in collision for the programmatically generated identifiers, there may be a failure alert.

Figure 14:
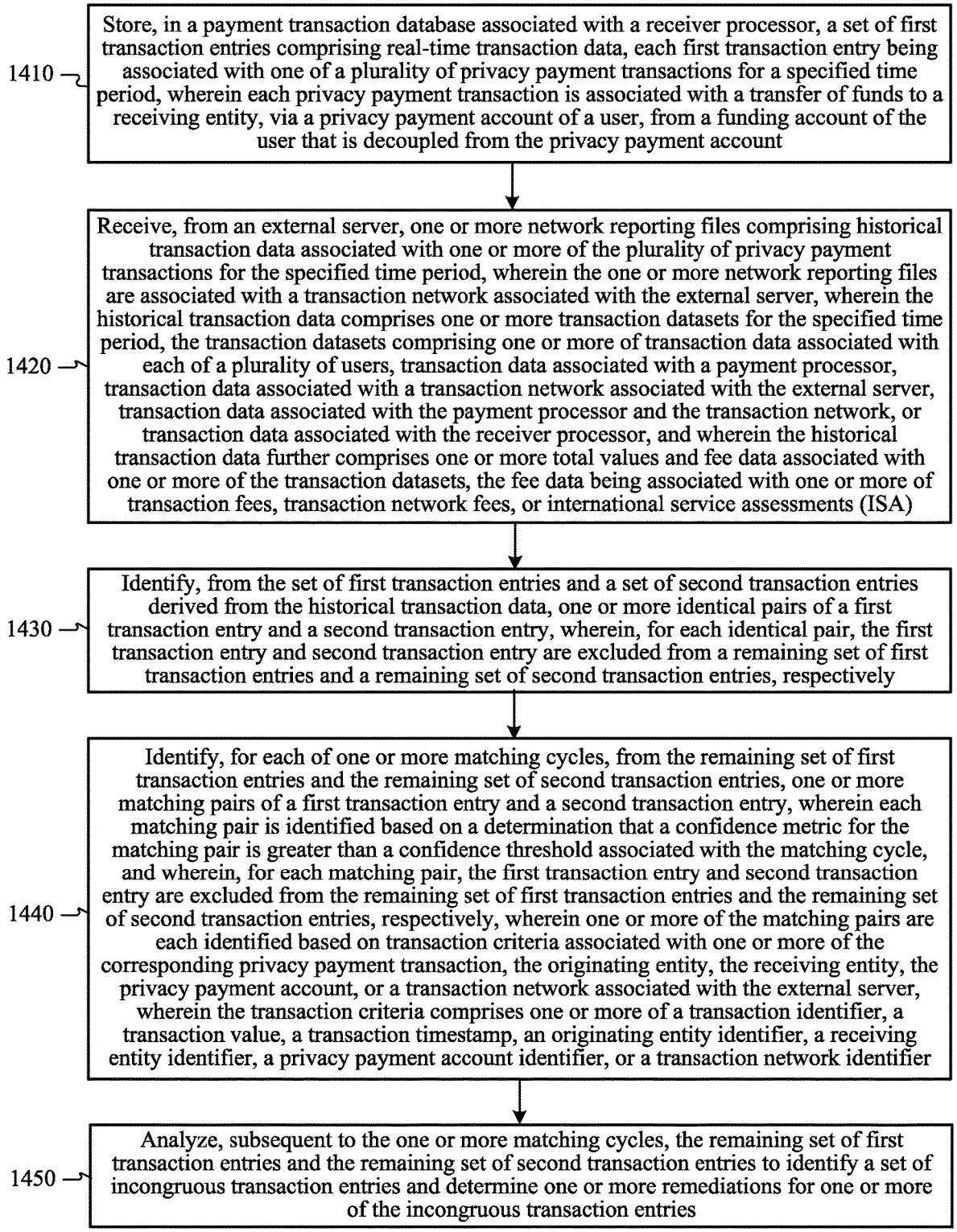
FIG. 14 illustrates an example method for reconciling financial records.

FIG. 14 illustrates an example method 1400 for reconciling financial records. The method may begin at step 1410, where the receiver processor 140 may store, in a payment transaction database associated with the receiver processor 140, a set of first transaction entries comprising real-time transaction data, each first transaction entry being associated with one of a plurality of privacy payment transactions for a specified time period, wherein each privacy payment transaction is associated with a transfer of funds to a receiving entity, via a privacy payment account of a user, from a funding account of the user that is decoupled from the privacy payment account. At step 1420, the receiver processor 140 may receive, from an external server, one or more network reporting files comprising historical transaction data associated with one or more of the plurality of privacy payment transactions for the specified time period, wherein the one or more network reporting files are associated with a transaction network associated with the external server, wherein the historical transaction data comprises one or more transaction datasets for the specified time period, the transaction datasets comprising one or more of transaction data associated with each of a plurality of users, transaction data associated with a payment processor, transaction data associated with a transaction network associated with the external server, transaction data associated with the payment processor and the transaction network, or transaction data associated with the issuer processor, and wherein the historical transaction data further comprises one or more total values and fee data associated with one or more of the transaction datasets, the fee data being associated with one or more of transaction fees, transaction network fees, or international service assessments (ISA). At step 1430, the receiver processor 140 may identify, from the set of first transaction entries and a set of second transaction entries derived from the historical transaction data, one or more identical pairs of a first transaction entry and a second transaction entry, wherein, for each identical pair, the first transaction entry and second transaction entry are excluded from a remaining set of first transaction entries and a remaining set of second transaction entries, respectively. At step 1440, the receiver processor 140 may identify, for each of one or more matching cycles, from the remaining set of first transaction entries and the remaining set of second transaction entries, one or more matching pairs of a first transaction entry and a second transaction entry, wherein each matching pair is identified based on a determination that a confidence metric for the matching pair is greater than a confidence threshold associated with the matching cycle, and wherein, for each matching pair, the first transaction entry and second transaction entry are excluded from the remaining set of first transaction entries and the remaining set of second transaction entries, respectively, wherein one or more of the matching pairs are each identified based on transaction criteria associated with one or more of the corresponding privacy payment transaction, the user, the receiving entity, the privacy payment account, or a transaction network associated with the external server, wherein the transaction criteria comprises one or more of a transaction identifier, a transaction value, a transaction timestamp, a user identifier, a receiving entity identifier, a privacy payment account identifier, or a transaction network identifier. At step 1450, the receiver processor 140 may analyze, subsequent to the one or more matching cycles, the remaining set of first transaction entries and the remaining set of second transaction entries to identify a set of incongruous transaction entries and determine one or more remediations for one or more of the incongruous transaction entries. Particular embodiments may repeat one or more steps of the method of FIG. 14, where appropriate. Although this disclosure describes and illustrates particular steps of the method of FIG. 14 as occurring in a particular order, this disclosure contemplates any suitable steps of the method of FIG. 14 occurring in any suitable order. Moreover, although this disclosure describes and illustrates an example method for reconciling financial records including the particular steps of the method of FIG. 14, this disclosure contemplates any suitable method for reconciling financial records including any suitable steps, which may include all, some, or none of the steps of the method of FIG. 14, where appropriate. Furthermore, although this disclosure describes and illustrates particular components, devices, or systems carrying out particular steps of the method of FIG. 14, this disclosure contemplates any suitable combination of any suitable components, devices, or systems carrying out any suitable steps of the method of FIG. 14.

Systems and Methods

Figure 15:
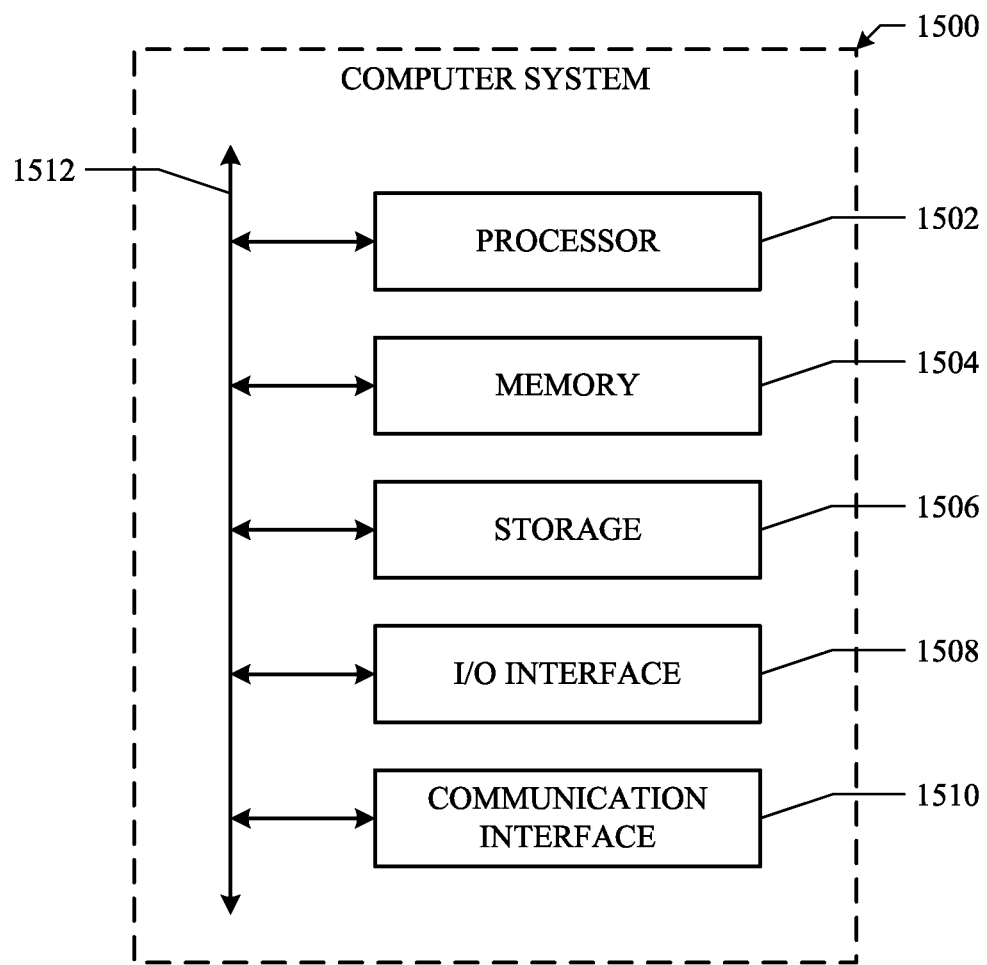
FIG. 15 illustrates an example computer system.

FIG. 15 illustrates an example computer system 1500. In particular embodiments, one or more computer systems 1500 perform one or more steps of one or more methods described or illustrated herein. In particular embodiments, one or more computer systems 1500 provide functionality described or illustrated herein. In particular embodiments, software running on one or more computer systems 1500 performs one or more steps of one or more methods described or illustrated herein or provides functionality described or illustrated herein. Particular embodiments include one or more portions of one or more computer systems 1500. Herein, reference to a computer system may encompass a computing device, and vice versa, where appropriate. Moreover, reference to a computer system may encompass one or more computer systems, where appropriate.

This disclosure contemplates any suitable number of computer systems 1500. This disclosure contemplates computer system 1500 taking any suitable physical form. As example and not by way of limitation, computer system 1500 may be an embedded computer system, a system-on-chip (SOC), a single-board computer system (SBC) (such as, for example, a computer-on-module (COM) or system-on-module (SOM)), a desktop computer system, a laptop or notebook computer system, an interactive kiosk, a mainframe, a mesh of computer systems, a mobile telephone, a personal digital assistant (PDA), a server, a tablet computer system, or a combination of two or more of these. Where appropriate, computer system 1500 may include one or more computer systems 1500; be unitary or distributed; span multiple locations; span multiple machines; span multiple data centers; or reside in a cloud, which may include one or more cloud components in one or more networks. Where appropriate, one or more computer systems 1500 may perform without substantial spatial or temporal limitation one or more steps of one or more methods described or illustrated herein. As an example and not by way of limitation, one or more computer systems 1500 may perform in real time or in batch mode one or more steps of one or more methods described or illustrated herein. One or more computer systems 1500 may perform at different times or at different locations one or more steps of one or more methods described or illustrated herein, where appropriate.

In particular embodiments, computer system 1500 includes a processor 1502, memory 1504, storage 1506, an input/output (I/O) interface 1508, a communication interface 1510, and a bus 1512. Although this disclosure describes and illustrates a particular computer system having a particular number of particular components in a particular arrangement, this disclosure contemplates any suitable computer system having any suitable number of any suitable components in any suitable arrangement.

In particular embodiments, processor 1502 includes hardware for executing instructions, such as those making up a computer program. As an example and not by way of limitation, to execute instructions, processor 1502 may retrieve (or fetch) the instructions from an internal register, an internal cache, memory 1504, or storage 1506; decode and execute them; and then write one or more results to an internal register, an internal cache, memory 1504, or storage 1506. In particular embodiments, processor 1502 may include one or more internal caches for data, instructions, or addresses. This disclosure contemplates processor 1502 including any suitable number of any suitable internal caches, where appropriate. As an example and not by way of limitation, processor 1502 may include one or more instruction caches, one or more data caches, and one or more translation lookaside buffers (TLBs). Instructions in the instruction caches may be copies of instructions in memory 1504 or storage 1506, and the instruction caches may speed up retrieval of those instructions by processor 1502. Data in the data caches may be copies of data in memory 1504 or storage 1506 for instructions executing at processor 1502 to operate on; the results of previous instructions executed at processor 1502 for access by subsequent instructions executing at processor 1502 or for writing to memory 1504 or storage 1506; or other suitable data. The data caches may speed up read or write operations by processor 1502. The TLBs may speed up virtual-address translation for processor 1502. In particular embodiments, processor 1502 may include one or more internal registers for data, instructions, or addresses. This disclosure contemplates processor 1502 including any suitable number of any suitable internal registers, where appropriate. Where appropriate, processor 1502 may include one or more arithmetic logic units (ALUs); be a multi-core processor; or include one or more processors 1502. Although this disclosure describes and illustrates a particular processor, this disclosure contemplates any suitable processor.

In particular embodiments, memory 1504 includes main memory for storing instructions for processor 1502 to execute or data for processor 1502 to operate on. As an example and not by way of limitation, computer system 1500 may load instructions from storage 1506 or another source (such as, for example, another computer system 1500) to memory 1504. Processor 1502 may then load the instructions from memory 1504 to an internal register or internal cache. To execute the instructions, processor 1502 may retrieve the instructions from the internal register or internal cache and decode them. During or after execution of the instructions, processor 1502 may write one or more results (which may be intermediate or final results) to the internal register or internal cache. Processor 1502 may then write one or more of those results to memory 1504. In particular embodiments, processor 1502 executes only instructions in one or more internal registers or internal caches or in memory 1504 (as opposed to storage 1506 or elsewhere) and operates only on data in one or more internal registers or internal caches or in memory 1504 (as opposed to storage 1506 or elsewhere). One or more memory buses (which may each include an address bus and a data bus) may couple processor 1502 to memory 1504. Bus 1512 may include one or more memory buses, as described below. In particular embodiments, one or more memory management units (MMUs) reside between processor 1502 and memory 1504 and facilitate accesses to memory 1504 requested by processor 1502. In particular embodiments, memory 1504 includes random access memory (RAM). This RAM may be volatile memory, where appropriate. Where appropriate, this RAM may be dynamic RAM (DRAM) or static RAM (SRAM). Moreover, where appropriate, this RAM may be single-ported or multi-ported RAM. This disclosure contemplates any suitable RAM. Memory 1504 may include one or more memories 1504, where appropriate. Although this disclosure describes and illustrates particular memory, this disclosure contemplates any suitable memory.

In particular embodiments, storage 1506 includes mass storage for data or instructions. As an example and not by way of limitation, storage 1506 may include a hard disk drive (HDD), a floppy disk drive, flash memory, an optical disc, a magneto-optical disc, magnetic tape, or a Universal Serial Bus (USB) drive or a combination of two or more of these. Storage 1506 may include removable or non-removable (or fixed) media, where appropriate. Storage 1506 may be internal or external to computer system 1500, where appropriate. In particular embodiments, storage 1506 is non-volatile, solid-state memory. In particular embodiments, storage 1506 includes read-only memory (ROM). Where appropriate, this ROM may be mask-programmed ROM, programmable ROM (PROM), erasable PROM (EPROM), electrically erasable PROM (EEPROM), electrically alterable ROM (EAROM), or flash memory or a combination of two or more of these. This disclosure contemplates mass storage 1506 taking any suitable physical form. Storage 1506 may include one or more storage control units facilitating communication between processor 1502 and storage 1506, where appropriate. Where appropriate, storage 1506 may include one or more storages 1506. Although this disclosure describes and illustrates particular storage, this disclosure contemplates any suitable storage.

In particular embodiments, I/O interface 1508 includes hardware, software, or both, providing one or more interfaces for communication between computer system 1500 and one or more I/O devices. Computer system 1500 may include one or more of these I/O devices, where appropriate. One or more of these I/O devices may enable communication between a person and computer system 1500. As an example and not by way of limitation, an I/O device may include a keyboard, keypad, microphone, monitor, mouse, printer, scanner, speaker, still camera, stylus, tablet, touch screen, trackball, video camera, another suitable I/O device or a combination of two or more of these. An I/O device may include one or more sensors. This disclosure contemplates any suitable I/O devices and any suitable I/O interfaces 1508 for them. Where appropriate, I/O interface 1508 may include one or more device or software drivers enabling processor 1502 to drive one or more of these I/O devices. I/O interface 1508 may include one or more I/O interfaces 1508, where appropriate. Although this disclosure describes and illustrates a particular I/O interface, this disclosure contemplates any suitable I/O interface.

In particular embodiments, communication interface 1510 includes hardware, software, or both providing one or more interfaces for communication (such as, for example, packet-based communication) between computer system 1500 and one or more other computer systems 1500 or one or more networks. As an example and not by way of limitation, communication interface 1510 may include a network interface controller (NIC) or network adapter for communicating with an Ethernet or other wire-based network or a wireless NIC (WNIC) or wireless adapter for communicating with a wireless network, such as a WI-FI network. This disclosure contemplates any suitable network and any suitable communication interface 1510 for it. As an example and not by way of limitation, computer system 1500 may communicate with an ad hoc network, a personal area network (PAN), a local area network (LAN), a wide area network (WAN), a metropolitan area network (MAN), or one or more portions of the Internet or a combination of two or more of these. One or more portions of one or more of these networks may be wired or wireless. As an example and not by way of limitation, computer system 1500 may communicate with a wireless PAN (WPAN) (such as, for example, a BLUETOOTH WPAN), a WI-FI network, a WI-MAX network, a cellular telephone network (such as, for example, a Global System for Mobile Communications (GSM) network), other suitable wireless networks or any combination thereof. Computer system 1500 may include any suitable communication interface 1510 for any of these networks, where appropriate. Communication interface 1510 may include one or more communication interfaces 1510, where appropriate. Although this disclosure describes and illustrates a particular communication interface, this disclosure contemplates any suitable communication interface.

In particular embodiments, bus 1512 includes hardware, software, or both coupling components of computer system 1500 to each other. As an example and not by way of limitation, bus 1512 may include an Accelerated Graphics Port (AGP) or other graphics bus, an Enhanced Industry Standard Architecture (EISA) bus, a front-side bus (FSB), a HYPERTRANSPORT (HT) interconnect, an Industry Standard Architecture (ISA) bus, an INFINIBAND interconnect, a low-pin-count (LPC) bus, a memory bus, a Micro Channel Architecture (MCA) bus, a Peripheral Component Interconnect (PCI) bus, a PCI-Express (PCIe) bus, a serial advanced technology attachment (SATA) bus, a Video Electronics Standards Association local (VLB) bus, or another suitable bus or a combination of two or more of these. Bus 1512 may include one or more buses 1512, where appropriate. Although this disclosure describes and illustrates a particular bus, this disclosure contemplates any suitable bus or interconnect.

Herein, a computer-readable non-transitory storage medium or media may include one or more semiconductor-based or other integrated circuits (ICs) (such, as for example, field-programmable gate arrays (FPGAs) or application-specific ICs (ASICs)), hard disk drives (HDDs), hybrid hard drives (HHDs), optical discs, optical disc drives (ODDs), magneto-optical discs, magneto-optical drives, floppy diskettes, floppy disk drives (FDDs), magnetic tapes, solid-state drives (SSDs), RAM-drives, SECURE DIGITAL cards or drives, any other suitable computer-readable non-transitory storage media, or any suitable combination of two or more of these, where appropriate. A computer-readable non-transitory storage medium may be volatile, non-volatile, or a combination of volatile and non-volatile, where appropriate.

MISCELLANEOUS

Herein, "or" is inclusive and not exclusive, unless expressly indicated otherwise or indicated otherwise by context. Therefore, herein, "A or B" means "A, B, or both," unless expressly indicated otherwise or indicated otherwise by context. Moreover, "and" is both joint and several, unless expressly indicated otherwise or indicated otherwise by context. Therefore, herein, "A and B" means "A and B, jointly or severally," unless expressly indicated otherwise or indicated otherwise by context.

It should be also noted that although this disclosure refers to VBAN throughout, this disclosure contemplates any suitable type of VBAN.

The scope of this disclosure encompasses all changes, substitutions, variations, alterations, and modifications to the example embodiments described or illustrated herein that a person having ordinary skill in the art would comprehend. The scope of this disclosure is not limited to the example embodiments described or illustrated herein. Moreover, although this disclosure describes and illustrates respective embodiments herein as including particular components, elements, feature, functions, operations, or steps, any of these embodiments may include any combination or permutation of any of the components, elements, features, functions, operations, or steps described or illustrated anywhere herein that a person having ordinary skill in the art would comprehend. Furthermore, reference in the appended claims to an apparatus or system or a component of an apparatus or system being adapted to, arranged to, capable of, configured to, enabled to, operable to, or operative to perform a particular function encompasses that apparatus, system, component, whether or not it or that particular function is activated, turned on, or unlocked, as long as that apparatus, system, or component is so adapted, arranged, capable, configured, enabled, operable, or operative. Additionally, although this disclosure describes or illustrates particular embodiments as providing particular advantages, particular embodiments may provide none, some, or all of these advantages.

What is claimed is:

1. A method comprising, by one or more servers associated with a receiver processor platform:
  receiving, by the receiver processor platform, from a server of a payment processor, via an assisted code deployment API provided by the receiver processor platform, a request by the payment processor for the receiver processor platform to launch an authorization system utilizing a customized authorization stream access (ASA) transaction schema based on customized authorization source code, wherein the customized ASA transaction schema and customized authorization source code are unique to the payment processor, wherein the request comprises a plurality of custom source code snippets generated by the payment processor associated with a plurality of customized schema parameters for the customized ASA transaction schema based on the customized authorization source code, wherein the customized ASA transaction schema based on the customized authorization source code enables the payment processor to issue a plurality of virtual bank accounts (VBANs) to one or more users associated with the payment processor, and wherein the customized ASA transaction schema based on the customized authorization source code is configured to generate, by the receiver processor platform, for each VBAN issued by the payment processor, a transaction resource configuration based on the customized ASA transaction schema based on the customized authorization source code, and authorize, for each VBAN, transaction authorization requests based on the corresponding transaction resource configuration, each transaction authorization request being associated with a request to transfer resources to a receiving entity from the user associated with the payment processor and the VBAN;

retrieving, by the receiver processor platform, from a database associated with the receiver processor platform, a pre-configured ASA transaction schema comprising a plurality of source code modules and source code functions based on a plurality of pre-configured schema parameters;

generating, by the receiver processor platform, the customized authorization source code unique to the payment processor by integrating the plurality of custom source code snippets associated with the plurality of customized schema parameters into the plurality of source code modules and source code functions of the pre-configured ASA transaction schema to generate the customized authorization source code unique to the payment processor;

generating, by the receiver processor platform, the customized ASA transaction schema unique to the payment processor based on the customized authorization source code;

launching, by the receiver processor platform, the authorization system utilizing the customized ASA transaction schema based on the customized authorization source code in a system working environment of the receiver processor platform;

activating, by the receiver processor platform, via the database associated with the receiver processor platform, the customized ASA transaction schema unique to the payment processor based on the customized authorization source code, wherein activating the customized ASA transaction schema enables the payment processor to issue the plurality of VBANs;

receiving, from a third-party server, a transaction authorization request to authorize a first transaction associated with a first VBAN, wherein the first VBAN is issued by the payment processor based on the customized ASA transaction schema unique to the payment processor;

determining, for the first VBAN, based on a corresponding first transaction resource configuration generated by the receiver processor platform based on the customized ASA transaction schema based on the customized authorization source code, whether one or more authorization parameters of the first transaction resource configuration corresponding to the first VBAN are satisfied; and transmitting, to the third-party server, responsive to determining whether the one or more authorization parameters of the first transaction resource configuration are satisfied, a transaction authorization response indicating whether the first transaction is authorized.

2. The method of claim 1, wherein the transaction authorization response further comprises one or more of a transaction token, a resource balance value of a virtual bank account (VBAN) associated with the first entity, an available resource balance value of a VBAN associated with the first entity, or a result of one or more verification requirements based on one or more of the customized schema parameters.

3. The method of claim 2, wherein the one or more verification requirements are associated with one or more of an account status of the VBAN associated with the first entity, an authorization status of the first receiving entity, or a frequency status of the first transaction based on one or more second transactions associated with the first user over a specified period of time.

4. The method of claim 1, wherein the customized schema parameters comprise one or more verification requirements based on transaction metadata associated with each transaction authorization request.

5. The method of claim 4, wherein the transaction metadata comprises one or more of a specified type of currency, a specified transaction network, a specified type of transaction, an identifier associated with a transaction, a specified number of authorized transactions, a specified quantity of resources authorized for a single transaction, or a specified total quantity of resources authorized for a plurality of transactions.

6. The method of claim 1, wherein the customized schema parameters comprise one or more verification requirements based on location metadata associated with each transaction authorization request.

7. The method of claim 6, wherein the location metadata is associated with one or more of a location of a user, a location of a receiving entity, or a location of a transaction.

8. The method of claim 7, wherein the location metadata comprises one or more of a geographic location, a geographic region, a country, a physical address, or a postal code.

9. The method of claim 1, wherein the customized schema parameters comprise one or more verification requirements based on entity metadata associated with each transaction authorization request.

10. The method of claim 9, wherein the entity metadata is associated with one or more of a receiving entity, a user, or a payment processor.

11. The method of claim 9, wherein the entity metadata associated with the receiving entity comprises one or more of an identifier associated with the receiving entity, a digital address associated with the receiving entity, an identifier associated with a plurality of receiving entities, a category of receiving entities, or a risk score associated with the receiving entity.

12. The method of claim 9, wherein the entity metadata associated with the user comprises one or more of a period of time the user has been associated with the payment processor, an age of a digital address associated with the user, a risk score associated with the user, an identifier associated with the user, or an identifier associated with a plurality of users.

13. The method of claim 12, wherein the risk score associated with the user is based on a risk model for determining a likelihood that a transaction is fraudulent.

14. The method of claim 13, wherein the risk score associated with the user is further based on historical risk scores associated with the user for a specified period of time.

15. The method of claim 1, further comprising:
providing, to the server of the payment processor, access to one or more tools or libraries generated by the receiver processor platform, wherein the one or more of the tools or libraries are configured to execute one or more operations associated with the customized ASA transaction schema.

16. The method of claim 15, wherein the one or more operations comprise one or more of generating VBANs associated with users, linking external resource accounts to VBANs associated with users, generating reports associated with VBANs and transactions associated with VBANs, modifying an automated processing of repeated transaction authorization requests, or applying one or more risk models for determining a likelihood that a transaction is fraudulent, wherein one or more of the risk models are based on one or more machine-learning models trained on historical transaction data.

17. The method of claim 1, wherein the transaction authorization request to authorize the first transaction is associated with a transfer of resources to a first receiving entity from a first user, wherein the first transaction resource configuration is decoupled from an external resource account associated with the first user and the first VBAN, wherein the first transaction being authorized causes a stored value balance associated with the external resource account to be reduced based on the transfer of resources associated with the first transaction.

18. The method of claim 1, further comprising:
accessing a set of first transaction entries comprising real-time transaction data, each first transaction entry being associated with one of a plurality of transactions for a specified time period, wherein one or more of the plurality of transactions are authorized based on a first transaction resource configuration generated based on a first customized ASA transaction schema;
accessing one or more network reporting files comprising historical transaction data associated with one or more of the transactions associated with the real-time transaction data for the specified time period in the set of first transaction entries;
identifying, from the set of first transaction entries and a set of second transaction entries derived from the historical transaction data, one or more identical pairs of a first transaction entry and a second transaction entry, wherein, for each identical pair, the first transaction entry and second transaction entry are excluded from a remaining set of first transaction entries and a remaining set of second transaction entries, respectively;
identifying, for each of one or more matching cycles, from the remaining set of first transaction entries and the remaining set of second transaction entries, one or more matching pairs of a first transaction entry and a second transaction entry, wherein each matching pair is identified based on a determination that a confidence metric for the matching pair is greater than a confidence threshold associated with the matching cycle, and wherein, for each matching pair, the first transaction entry and second transaction are excluded from the remaining set of first transaction entries and the remaining set of second transaction entries, respectively; and
analyzing, subsequent to the one or more matching cycles, the remaining set of first transaction entries and the remaining set of second transaction entries to identify a set of incongruous transaction entries and determine one or more remediations for one or more of the incongruous transaction entries.

19. One or more computer-readable non-transitory storage media embodying software that is operable when executed to:
receive, by the receiver processor platform, from a server of a payment processor, via an assisted code deployment API provided by the receiver processor platform, a request by the payment processor for the receiver processor platform to launch an authorization system utilizing a customized authorization stream access (ASA) transaction schema based on customized authorization source code, wherein the customized ASA transaction schema and customized authorization source code are unique to the payment processor, wherein the request comprises a plurality of custom source code snippets generated by the payment processor associated with a plurality of customized schema parameters for the customized ASA transaction schema based on the customized authorization source code, wherein the customized ASA transaction schema based on the customized authorization source code enables the payment processor to issue a plurality of virtual bank accounts (VBANs) to one or more users associated with the payment processor, and wherein the customized ASA transaction schema based on the customized authorization source code is configured to generate, by the receiver processor platform, for each VBAN issued by the payment processor, a transaction resource configuration based on the customized ASA transaction schema based on the customized authorization source code, and authorize, for each VBAN, transaction authorization requests based on the corresponding transaction resource configuration, each transaction authorization request being associated with a request to transfer resources to a receiving entity from the user associated with the payment processor and the VBAN;
retrieve, by the receiver processor platform, from a database associated with the receiver processor platform, a pre-configured ASA transaction schema comprising a plurality of source code modules and source code functions based on a plurality of pre-configured schema parameters;
generate, by the receiver processor platform, the customized authorization source code unique to the payment processor by integrating the plurality of custom source code snippets associated with the plurality of customized schema parameters into the plurality of source code modules and source code functions of the pre-configured ASA transaction schema to generate the customized authorization source code unique to the payment processor;

generate, by the receiver processor platform, the customized ASA transaction schema unique to the payment processor based on the customized authorization source code;
launch, by the receiver processor platform, the authorization system utilizing the customized ASA transaction schema based on the customized authorization source code in a system working environment of the receiver processor platform;
activate, by the receiver processor platform, via the database associated with the receiver processor platform, the customized ASA transaction schema unique to the payment processor based on the customized authorization source code, wherein activating the customized ASA transaction schema enables the payment processor to issue the plurality of VBANs;
receive, from a third-party server, a transaction authorization request to authorize a first transaction associated with a first VBAN, wherein the first VBAN is issued by the payment processor based on the customized ASA transaction schema unique to the payment processor;
determine, for the first VBAN, based on a corresponding first transaction resource configuration generated by the receiver processor platform based on the customized ASA transaction schema based on the customized authorization source code, whether one or more authorization parameters of the first transaction resource configuration corresponding to the first VBAN are satisfied; and
transmit, to the third-party server, responsive to determining whether the one or more authorization parameters of the first transaction resource configuration are satisfied, a transaction authorization response indicating whether the first transaction is authorized.

20. A receiver processor comprising: one or more processors; and a non-transitory memory coupled to the processors comprising instructions executable by the processors, the processors operable when executing the instructions to:
receive, by the receiver processor platform, from a server of a payment processor, via an assisted code deployment API provided by the receiver processor platform, a request by the payment processor for the receiver processor platform to launch an authorization system utilizing a customized authorization stream access (ASA) transaction schema based on customized authorization source code, wherein the customized ASA transaction schema and customized authorization source code are unique to the payment processor, wherein the request comprises a plurality of custom source code snippets generated by the payment processor associated with a plurality of customized schema parameters for the customized ASA transaction schema based on the customized authorization source code, wherein the customized ASA transaction schema based on the customized authorization source code enables the payment processor to issue a plurality of virtual bank accounts (VBANs) to one or more users associated with the payment processor, and wherein the customized ASA transaction schema based on the customized authorization source code is configured to generate, by the receiver processor platform, for each VBAN issued by the payment processor, a transaction resource configuration based on the customized ASA transaction schema based on the customized authorization source code, and authorize, for each VBAN, transaction authorization requests based on the corresponding transaction resource configuration, each transaction authorization request being associated with a request to transfer resources to a receiving entity from the user associated with the payment processor and the VBAN;
retrieve, by the receiver processor platform, from a database associated with the receiver processor platform, a pre-configured ASA transaction schema comprising a plurality of source code modules and source code functions based on a plurality of pre-configured schema parameters;
generate, by the receiver processor platform, the customized authorization source code unique to the payment processor by integrating the plurality of custom source code snippets associated with the plurality of customized schema parameters into the plurality of source code modules and source code functions of the pre-configured ASA transaction schema to generate the customized authorization source code unique to the payment processor;
generate, by the receiver processor platform, the customized ASA transaction schema unique to the payment processor based on the customized authorization source code;
launch, by the receiver processor platform, the authorization system utilizing the customized ASA transaction schema based on the customized authorization source code in a system working environment of the receiver processor platform;
activate, by the receiver processor platform, via the database associated with the receiver processor platform, the customized ASA transaction schema unique to the payment processor based on the customized authorization source code, wherein activating the customized ASA transaction schema enables the payment processor to issue the plurality of VBANs;
receive, from a third-party server, a transaction authorization request to authorize a first transaction associated with a first VBAN, wherein the first VBAN is issued by the payment processor based on the customized ASA transaction schema unique to the payment processor;
determine, for the first VBAN, based on a corresponding first transaction resource configuration generated by the receiver processor platform based on the customized ASA transaction schema based on the customized authorization source code, whether one or more authorization parameters of the first transaction resource configuration corresponding to the first VBAN are satisfied; and
transmit, to the third-party server, responsive to determining whether the one or more authorization parameters of the first transaction resource configuration are satisfied, a transaction authorization response indicating whether the first transaction is authorized.

* * * * *